(12) United States Patent
Takada et al.

(10) Patent No.: US 7,809,981 B2
(45) Date of Patent: Oct. 5, 2010

(54) STORAGE SYSTEM AND CONTROL METHOD OF STORAGE SYSTEM

(75) Inventors: Masanori Takada, Yokohama (JP); Shuji Nakamura, Machida (JP); Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 451 days.

(21) Appl. No.: 12/007,461

(22) Filed: Jan. 10, 2008

(65) Prior Publication Data

US 2009/0006890 A1    Jan. 1, 2009

(30) Foreign Application Priority Data

Jun. 26, 2007   (JP) ............................... 2007-167470

(51) Int. Cl.
*G06F 11/00* (2006.01)
(52) U.S. Cl. ........................................................ 714/9
(58) Field of Classification Search ............... 714/2–13, 714/15, 16, 23–27, 31, 37, 39, 42–44, 47, 714/54, 56
See application file for complete search history.

(56) References Cited

U.S. PATENT DOCUMENTS

| | | | | |
|---|---|---|---|---|
| 5,206,860 A * | 4/1993 | Brown et al. | ................ | 714/712 |
| 5,222,217 A * | 6/1993 | Blount et al. | ................ | 1/1 |
| 5,491,816 A * | 2/1996 | Matoba et al. | ................ | 714/2 |
| 5,615,329 A * | 3/1997 | Kern et al. | ................ | 714/6 |
| 5,619,644 A * | 4/1997 | Crockett et al. | ................ | 714/45 |
| 5,826,003 A * | 10/1998 | Matoba et al. | ................ | 714/7 |
| 6,003,114 A * | 12/1999 | Bachmat | ................ | 711/113 |
| 6,324,655 B1 * | 11/2001 | Matoba et al. | ................ | 714/7 |
| 6,594,785 B1 * | 7/2003 | Gilbertson et al. | ................ | 714/48 |
| 7,370,239 B2 * | 5/2008 | Apel et al. | ................ | 714/43 |
| 7,624,302 B2 * | 11/2009 | Michaelis et al. | ................ | 714/12 |
| 2006/0143381 A1 * | 6/2006 | Mori et al. | ................ | 711/114 |

OTHER PUBLICATIONS

"IBM System p5 570 Technical Overview and Introduction", Sep. 2006, Component 3.1.7, pp. i-x and 1-82.

* cited by examiner

*Primary Examiner*—Nadeem Iqbal
(74) *Attorney, Agent, or Firm*—Volpe and Koenig, P.C.

(57) ABSTRACT

Provided is a storage system superior in fault tolerance. This storage system is composed of a controller having a plurality of processors and other units. When an error occurs in any one of the components in the controller, the storage system cuts off an I/O path of the controller, specifies the failed component in the cutoff status, and invalidates such failed component. Further, after invalidating the failed component, the storage system determines whether it is operable only with the normal components, cancels (releases) the cutoff of the I/O path when it determines that it is operable, and resumes operation by rebooting itself.

20 Claims, 48 Drawing Sheets

FIG.7

ERROR STATUS REGISTER 214

| ERROR | STATUS |
|---|---|
| PROCESSOR CORE INTERNAL ERROR | N |
| L1 CACHE ERROR | N |
| L2 CACHE ERROR (UNCORRECTABLE) | N |
| L2 CACHE ERROR (CORRECTABLE) | N |

ERROR COMPONENT MANAGEMENT TABLE 233

| COMPONENT NAME | STATUS |
|---|---|
| PROCESSOR P1 | N |
| PROCESSOR CORE C1 | N |
| PROCESSOR CORE C2 | N |
| PROCESSOR P2 | N |
| PROCESSOR CORE C3 | N |
| PROCESSOR CORE C4 | N |
| MEMORY MODULE M1 | Y |
| MEMORY MODULE M2 | N |
| COMMON SITE | N |

2331 2332

ERROR STATUS REGISTER 241

| ERROR | STATUS |
|---|---|
| FSB A ERROR | N |
| FSB B ERROR | N |
| MEMORY MODULE M1 ERROR (UNCORRECTABLE) | Y |
| MEMORY MODULE M1 ERROR (CORRECTABLE) | N |
| MEMORY MODULE M2 ERROR (UNCORRECTABLE) | N |
| MEMORY MODULE M2 ERROR (CORRECTABLE) | N |
| INTERNAL ERROR | N |

FIG.10

COMPONENT ENABLE REGISTER 242

2421         2422

| COMPONENT | ENABLE |
|---|---|
| FSB A | Y |
| FSB B | Y |
| MEMORY MODULE M1 | N |
| MEMORY MODULE M2 | Y |

FIG.32

ROUTING TABLE 63

| PHYSICAL DEVICE NUMBER (PDEV#) 631 | CONTROLLER IDENTIFIER 632 |
|---|---|
| 0 | A |
| 2 | B |
| 3 | B |
| : | : |

FIG.35

VOLUME ALLOCATION TABLE 723

| VOLUME NUMBER (LDEV#/PDEV#) | CONTROLLER IDENTIFIER | FAILOVER CONTROLLER IDENTIFIER |
|---|---|---|
| LDEV #0 | A | B |
| LDEV #1 | B | A |
| ⋮ | ⋮ | ⋮ |
| PDEV #0 | B | A |
| PDEV #1 | A | B |
| PDEV #2 | A | B |
| ⋮ | ⋮ | ⋮ |

FAILOVER VOLUME STORAGE TABLE 724

| VOLUME NUMBER (LDEV#/PDEV#) | FAILOVER SOURCE CONTROLLER IDENTIFIER | FAILOVER DESTINATION CONTROLLER IDENTIFIER |
|---|---|---|
| LDEV #0 | A | B |
| PDEV #1 | A | B |
| PDEV #2 | A | B |
| : | : | : |

LOAD RECORDING TABLE 725

| CONTROLLER IDENTIFIER | UTILIZATION |
|---|---|
| A | 70% |
| B | 20% |
| C | 50% |
| D | 40% |

7251, 7252

STORAGE SYSTEM AND CONTROL METHOD OF STORAGE SYSTEM

CROSS REFERENCES

This application relates to and claims priority from Japanese Patent Application No. 2007-167470, filed on Jun., 26, 2007, the entire disclosure of which is incorporated herein by reference.

BACKGROUND

1. Field of the Invention

The present invention relates to a storage system, and a control method of a storage system.

2. Description of the Related Art

A storage system is a device that provides data storage service to a host apparatus. A storage system is typically composed of a plurality of disk array devices comprised of hard disk drives or the like, and various disk controllers for controlling these disk array devices. The disk controllers comprise a processor for controlling the overall storage system, a host interface for connecting to the host apparatus, a disk interface for connecting to the disk array, and a cache memory for caching user data is further disposed between the interfaces of the foregoing components.

Since a storage system is generally used in mission critical businesses of banks, securities firms and the like, it is required of high reliability capable of preventing the loss of user data, and high availability capable of continuously providing the storage service to the host apparatus.

An error in a component configuring the storage system is something that may occur stochastically, and is therefore unavoidable. Thus, it is necessary to give sufficient consideration to fault tolerance from the perspective of system design.

"IBM System p5 570 Technical Overview and Introduction," September 2006, Component 3.1.7 discloses dynamic deallocation technology of a processor referred to as a "CPU guard" regarding a server computer. With this deallocation technology, when a error occurs in any one of a plurality of processors, the system configuration is reconstructed (deallocated) so that operation is carried out without using the failed processor, and only using the remaining processors.

More specifically, when a hardware error is detected, a diagnosis program is activated based on the reboot processing of the system. When the error occurred in the CPU or the L3 cache, such hardware component is removed from the system configuration.

With the deallocation technology described above, while the failed component is being specified, there is a possibility that the other normal components such as the cache memory, the host interface or the disk interface will be subject to unauthorized access due to the malfunction of the failed component, and, as a result, data stored in the cache memory may be overwritten and lost, or the host interface or the disk interface may transfer erroneous data.

SUMMARY

An object of the present invention is to provide a storage system having fault tolerance; that is, a storage system having high reliability capable of preventing the loss of user data, and high availability capable of continuously providing the storage service to the host apparatus even when an error occurs in a component in the storage system.

More specifically, an object of the present invention is to continue the operation of the storage system by using other normal components in the storage system while minimizing the range of influence of an error even when such an error occurs in a component configuring the storage system.

According to one aspect of the present invention, provided is a storage system for providing data storage service to a host apparatus. This comprises a host interface unit configured to be connectable to the host apparatus, a disk interface unit configured to be connectable to a disk array unit having a volume storing data formed therein, a cache memory unit connected respectively to the host interface unit and the disk interface unit and configured to cache the user data, a switch LSI connected respectively to the host interface unit, the disk interface unit, and the cache memory unit, and a controller having a plurality of processors and connected to the switch LSI.

The switch LSI cuts off an I/O path with the controller based on an error signal output when an error occurs at a component in the controller, and the controller, after performing prescribed error handling under the control of any one of the plurality of processors, commands the switch LSI to cancel the cutoff.

Further, according to one aspect of the present invention, provided is a control method of a storage system for providing data storage service to a host apparatus. This control method of a storage system comprises a step of performing, under control of each processor of at least one controller, the data storage service under the control of each of the processors, a step of detecting, under control of the switch LSI an error signal output when a error occurs at a component in the controller, a step of cutting off, under control of the switch LSI, an I/O path with the controller based on the detected error, a step of performing, under control of the controller, prescribed error handling while the I/O path is being cut off, and a step of commanding, under control of the controller, the switch LSI to cancel the cutoff.

Moreover, according to one aspect, the present invention can also be applied to various units comprising the storage system. More specifically, provided is a unit having a plurality of components composing a storage system for providing data storage service to a host apparatus. This unit comprises an error detection unit configured to detect the occurrence of an error in any one of the plurality of components, a cutoff processing unit configured to cut off an I/O path with an external unit based on the detected occurrence of error, a error specification unit configured to specify the failed component while the I/O path is being cut off, and a inactivated status setting unit configured to set the specified component to a inactivated status. The cutoff processing unit cancels the cutoff after the inactivated status is set.

According to the present invention, the range of influence of an error can be minimized even when such error occurs in a component composing the storage system, and, therefore, it is possible to realize a highly reliable storage system capable of preventing the loss of user data.

In addition, according to the present invention, the operation of the storage system can be continued by using other normal components in the storage system even when an error occurs in a component composing the storage system, and, therefore, it is possible to realize a highly available storage system.

DESCRIPTION OF DRAWINGS

FIG. 7 is a diagram showing an example of an error status register provided in the processor in the controller according to an embodiment of the present invention;

FIG. 10 is a diagram showing an example of a component activation register provided in the chipset in the controller according to an embodiment of the present invention;

FIG. 32 is a diagram showing an example of a routing table of the disk I/F unit according to an embodiment of the present invention;

FIG. 35 is a diagram explaining the contents of a volume allocation table of the cache memory unit according to an embodiment of the present invention;

FIG. 36 is a diagram explaining the contents of a failover volume storage area of the cache memory unit according to an embodiment of the present invention;

FIG. 45 is a diagram showing an example of a load recording table of the cache memory unit according to an embodiment of the present invention;

DETAILED DESCRIPTION

Embodiments of the present invention are now explained with reference to the attached drawings.

First Embodiment

This embodiment explains a storage system with superior tolerance for fault. Specifically, the storage system of this embodiment has a function which cuts off the I/O path of the controller when an error occurs in any component or component in a controller, specifies the failed component in the cut-off status, and invalidates the failed component. In addition, after invalidating the failed component, the storage system of this embodiment determines whether the storage system itself is operable only with the normal components (i.e., the non-failed components), cancels (releases) the cutoff of the I/O path when operable, and resumes operation by rebooting the controller. The cutoff/release of the I/O path of the controller is conducted by the switch LSI mediates the controller and other units based on an error detection signal.

Figure 1:
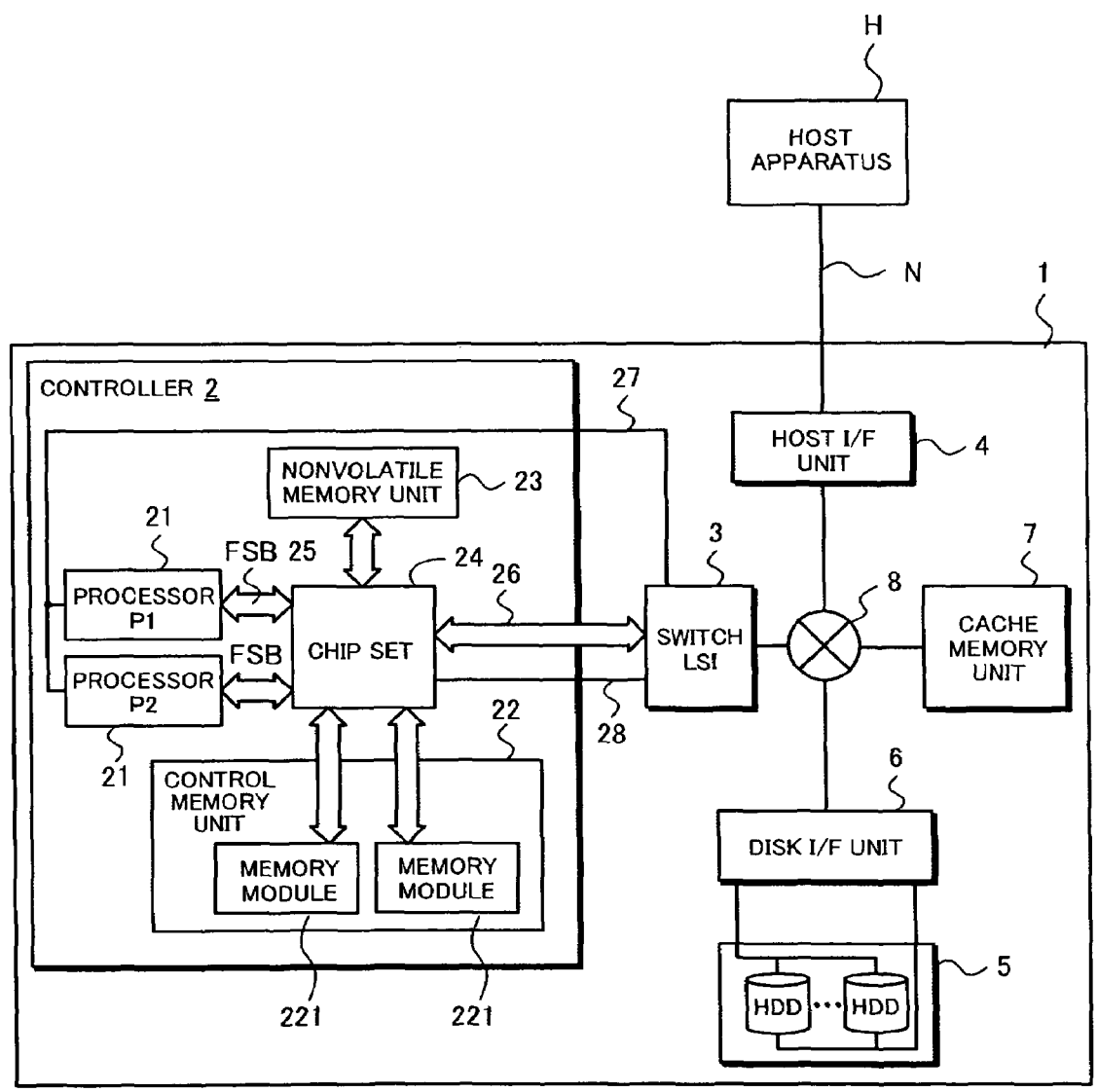
FIG. 1 is a diagram showing the configuration of a storage system according to an embodiment of the present invention.

FIG. 1 is a diagram showing a configuration of a storage system 1 according to an embodiment of the present invention. Referring to FIG. 1, the storage system 1 is operatively connected to a host apparatus H via a network N, and as a whole forms a computer system. The computer system, for instance, is structured as a business system of banks or a seat reservation system of airline companies.

The storage system 1 is a system for providing data storage service to the host apparatus H. The storage system 1 comprises a controller 2 and other units connected via a switch LSI 3; namely, a host interface 4, a disk array unit 5, a disk interface unit 6, and a cache memory unit 7. The switch LSI 3, the host interface 4, the disk array unit 5 and the cache memory unit 7 respectively connected via an internal network 8.

The controller 2 comprises a plurality of processors 21, a control memory unit 22, a nonvolatile memory unit 23 and a chipset 24, and governs the operation of the overall storage system 1.

The processor 21 executes various programs stored in the nonvolatile memory unit 23, and thereby realizes the data storage service of the storage system 1. In this example, two processors 21 are provided to the controller 2, and two processor cores 211 are further provided to the respective processors 21 (see FIG. 2). For the sake of convenience in the ensuing explanation, the processors 21 are indicated as processors P1 and P2 when it is necessary to differentiate such processors 21.

The respective processors 21 and the chipset 24 are connected via a front-side bus (FSB) 25 (likewise indicated as "FSB A" and "FSB B" when required). Further, the respective processors 21 are connected to the switch LSI 3 described later via a first error signal line 27. When the respective processors 21 detect its own error, they notify the switch LSI 3 via the first error signal line 27.

When an error occurs in the controller 2, the processor 21 (processor core 211) executes the error handling program 232 described later, specifies the failed component, and attempts to continue operation only with the normal components excluding the specified component.

Figure 2:
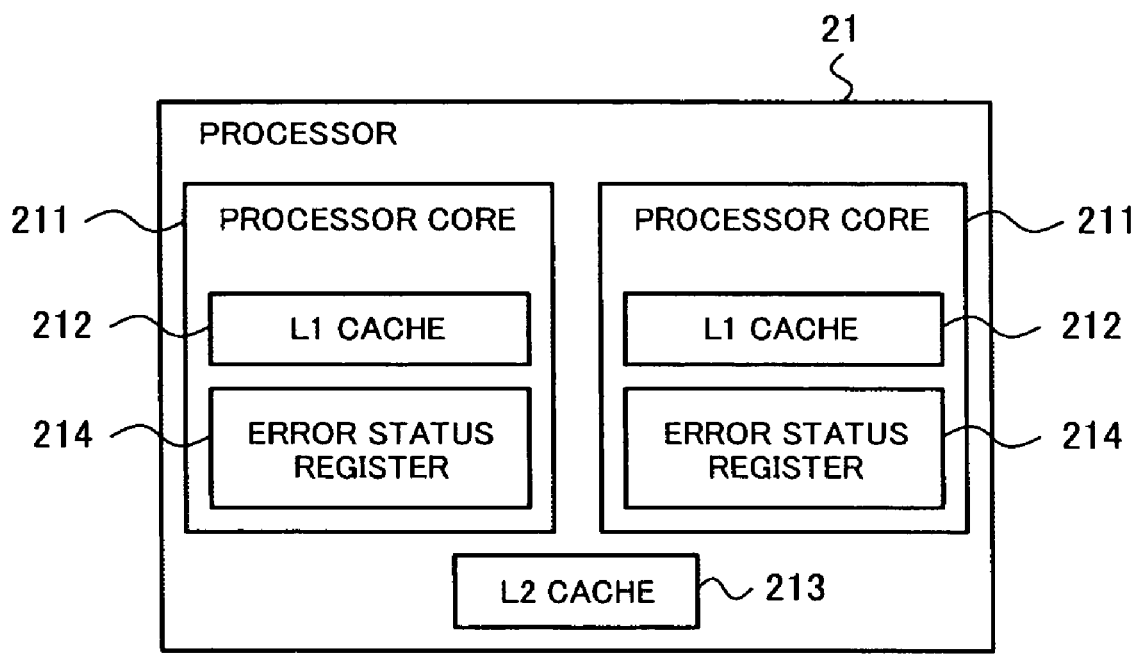
FIG. 2 is a diagram showing the schematic configuration of a processor in a controller according to an embodiment of the present invention.

FIG. 2 is a diagram showing a schematic configuration of the processor 21 according to an embodiment of the present invention. As shown in FIG. 2, the respective processors 21 have a plurality of processor cores 211, and the respective processor cores 211 can be processed in parallel. In this example, the respective processors 21 are configured to include two processor cores 211. Accordingly, the controller 2 has a total of four processor cores 211. Nevertheless, the processor 21 may also be of a single core structure. For the sake of convenience in the ensuing explanation, the respective processor cores 211 of the processor P1 will be indicated as processor cores C1 and C2 and the respective processing cores 211 of the processor P2 will be indicated as processing cores C3 and C4 when it is necessary to differentiate the processor cores 211.

The respective processor cores 211 are internally equipped with an L1 cache 212, and externally equipped with an L2 cache 213 to be shared by the respective processor cores 211 in the same processor 21. Further, in this embodiment, the respective processor cores 211 are configured by including an error status register 214. Contents of the error status register 214 are written into the nonvolatile memory unit 23 by the error handling program 232 to be executed upon the occurrence of an error.

Returning to FIG. 1, the control memory unit 22 is configured from a plurality of memory modules 221 (similarly indicated as "M1" and "M2" when it is necessary to differentiate the memory modules 221) as a volatile memory such as a DRAM. The respective memory modules 221 are connected to the chipset 24 via a data signal line. The memory module 221 stores control data associated with the user data stored in the cache memory unit 7, and other information such as system configuration information. Control data contains management information required for providing the data storage service of the storage system 1.

Although control data may be discontinuously stored in a storage area of the plurality of memory modules 221, these areas are managed as a memory so that the I/O processing program operation operated by the processor core 211 can recognize this as a single, consecutive memory space. Unless otherwise specified, let it be assumed that the control data to be stored in the memory module 221 in the following explanation is stored in a single memory space.

Figure 3:
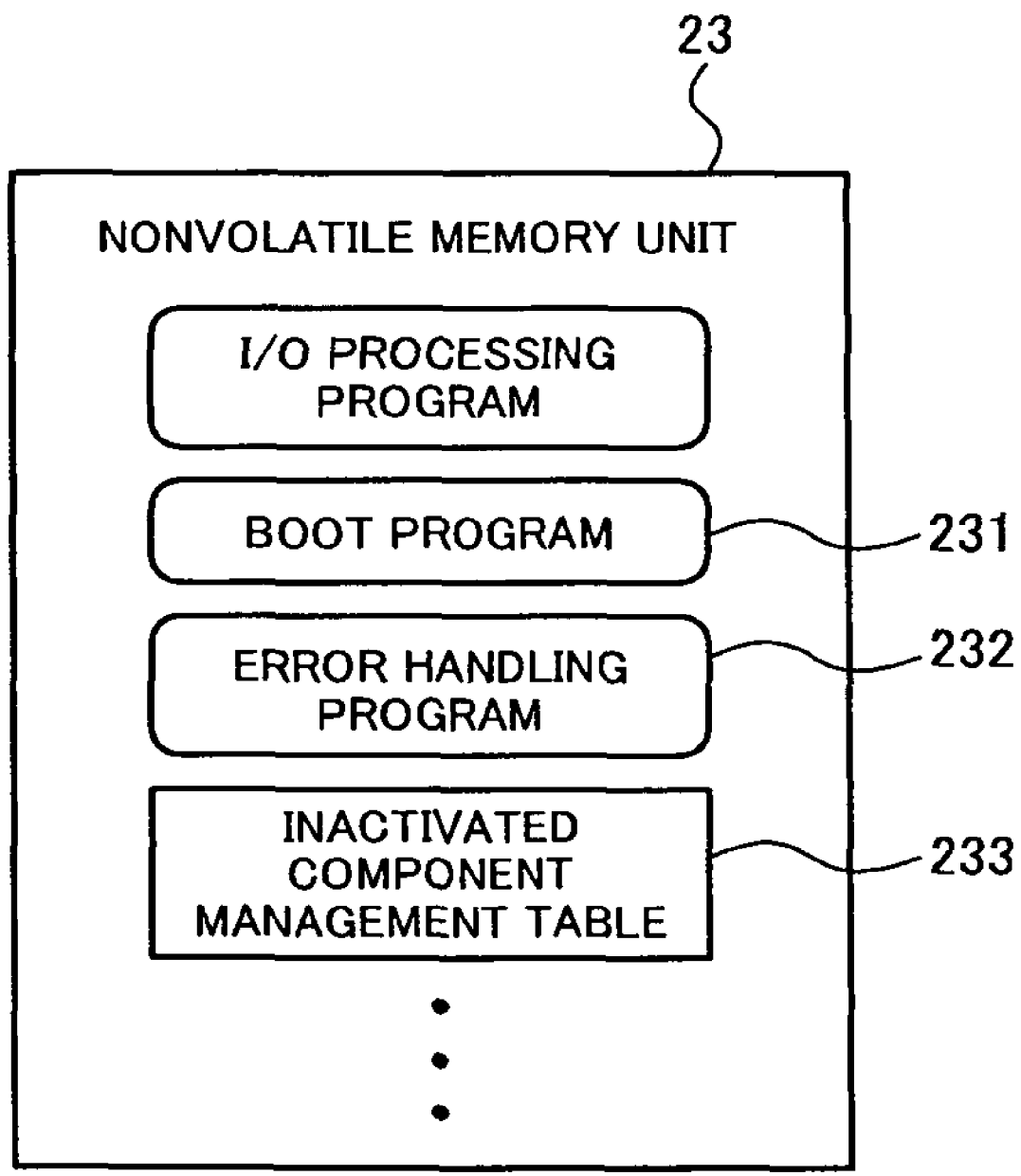
FIG. 3 is a diagram showing the contents of a nonvolatile memory unit in the controller according to an embodiment of the present invention.

The nonvolatile memory unit 23 is configured as a rewritable, nonvolatile memory such as a flash memory. The nonvolatile memory unit 23 stores various programs and various types of information. In this embodiment, as shown in FIG. 3, the nonvolatile memory unit 23 stores a boot program 231, an error handling program 232 and a inactivated component management table 233. The nonvolatile memory unit 23 additionally stores an I/O processing program for performing I/O processing to enable the storage system 1 to provide data storage service.

The boot program 231 is a program for performing initialization processing to make the I/O processing program executable when the power of the storage system 1 is turned on, or when the storage system 1 is reset during the occurrence of an error as explained in this embodiment. The error handling program 232 is called when some kind of error occurs in the controller 2, and is a program for performing necessary processing to continue providing the data storage service. The inactivated component management table 233 is a table for managing the inactivated status of the respective components in the controller 2. A component is defined with a level capable of specifying the occurrence of an error. The inactivated component management table 233 is updated by the error handling program 232.

Returning to FIG. 1, the chipset 24 functions as a bridge between the components connected in the controller 2. Further, the chipset 24 manages the status of activity/inactivity of the connected components. Moreover, the chipset 24 is connected to the switch LSI 3 via the address/data signal line 26. The exchange of data between the components in the controller 2 and the other units is conducted via the address/data signal line 26. In addition, the chipset 124 is connected to the switch LSI 3 via the second error signal line 28.

Although the controller 2 has two processors 21 in this embodiment, there is no particular limitation on the number of processors. Further, although the processor 21 also has two processor cores 211 in this embodiment, there is no particular limitation on the number of processor cores. Moreover, the memory module 221 and the nonvolatile memory unit 23 may also be provided in the required quantity and capacity. In addition, the data signal line and the error signal line connecting the respective components may be of various specifications.

Figure 4:
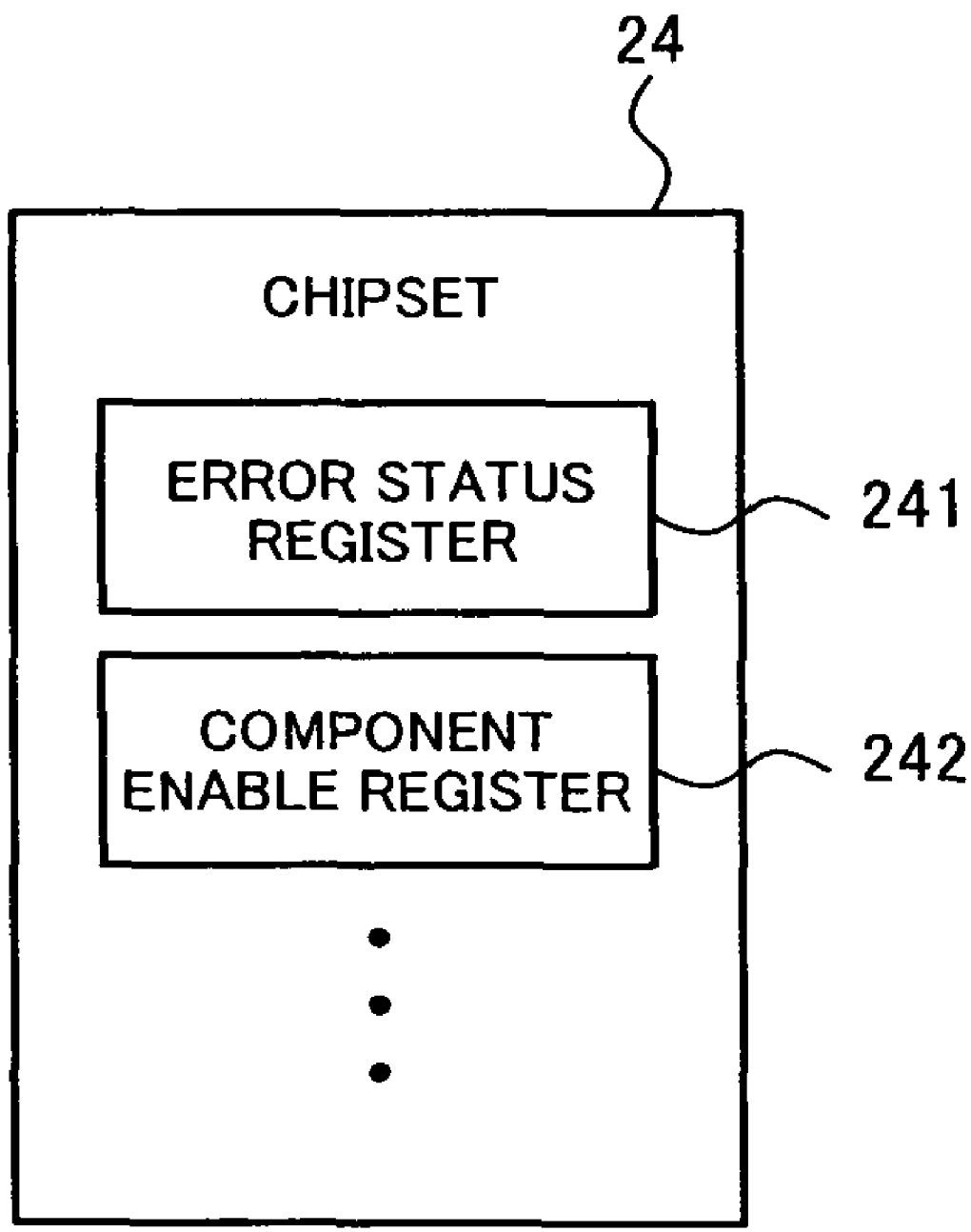
FIG. 4 is a diagram explaining a register provided in a chipset in the controller according to an embodiment of the present invention.

FIG. 4 is a diagram explaining the register provided in the chipset 24 according to an embodiment of the present invention. As shown in FIG. 4, the chipset 24 includes an error status register 241 and a component activation register 242. The error status register 241 records the error status in the components connected to the chipset 24. The component activation register 242 designates the component to be activated among the components connected to the chipset 24.

Figure 5:
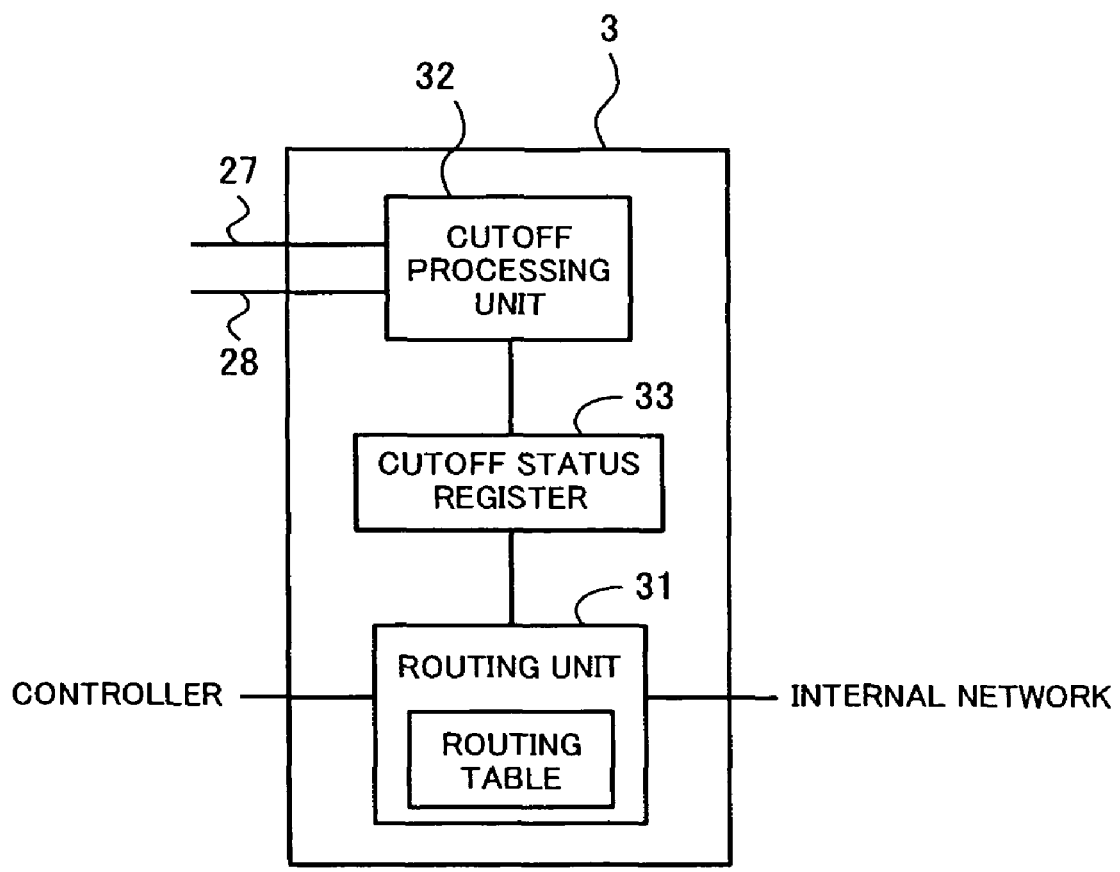
FIG. 5 is a diagram showing the configuration of a switch LSI according to an embodiment of the present invention.

FIG. 5 is a diagram showing the configuration of the switch LSI 3 according to an embodiment of the present invention. As shown in FIG. 5, the switch LSI 3 includes a routing unit 31, a cutoff processing unit 32, and a cutoff status register 33.

The routing unit 31 is connected to the chipset 24 of the controller 2 via the address/data signal line 26, and also connected the other units in the storage system 1 via the internal network 8. The routing unit 31 routes data unless the value of the cutoff status register 33 is "Y." In other words, the cutoff status register 33 has the two statuses of "Y" and "N." When the value of the cutoff status register 33 is "N," the routing unit 31 transfers the data received from the chipset 24 of the controller 2 to the other units in the storage system 1, and transfers the data received from the other units in the storage system 1 to the chipset 24 of the controller 2. The routing unit 31 typically performs a prescribed protocol translation upon transferring the received data.

When the cutoff processing unit 32 receives a chipset error signal sent from the chipset 24 via the processor error signal and/or the second error signal line 28 sent from any one of the processors via the first error signal line 27, it rewrites the value of the cutoff status register 33 from "N" to "Y." Further, when the cutoff processing unit 32 receives a blockage cancellation command via the routing unit 31 as described later, it rewrites the value of the cutoff status register 33 from "Y" to "N."

Figure 6:
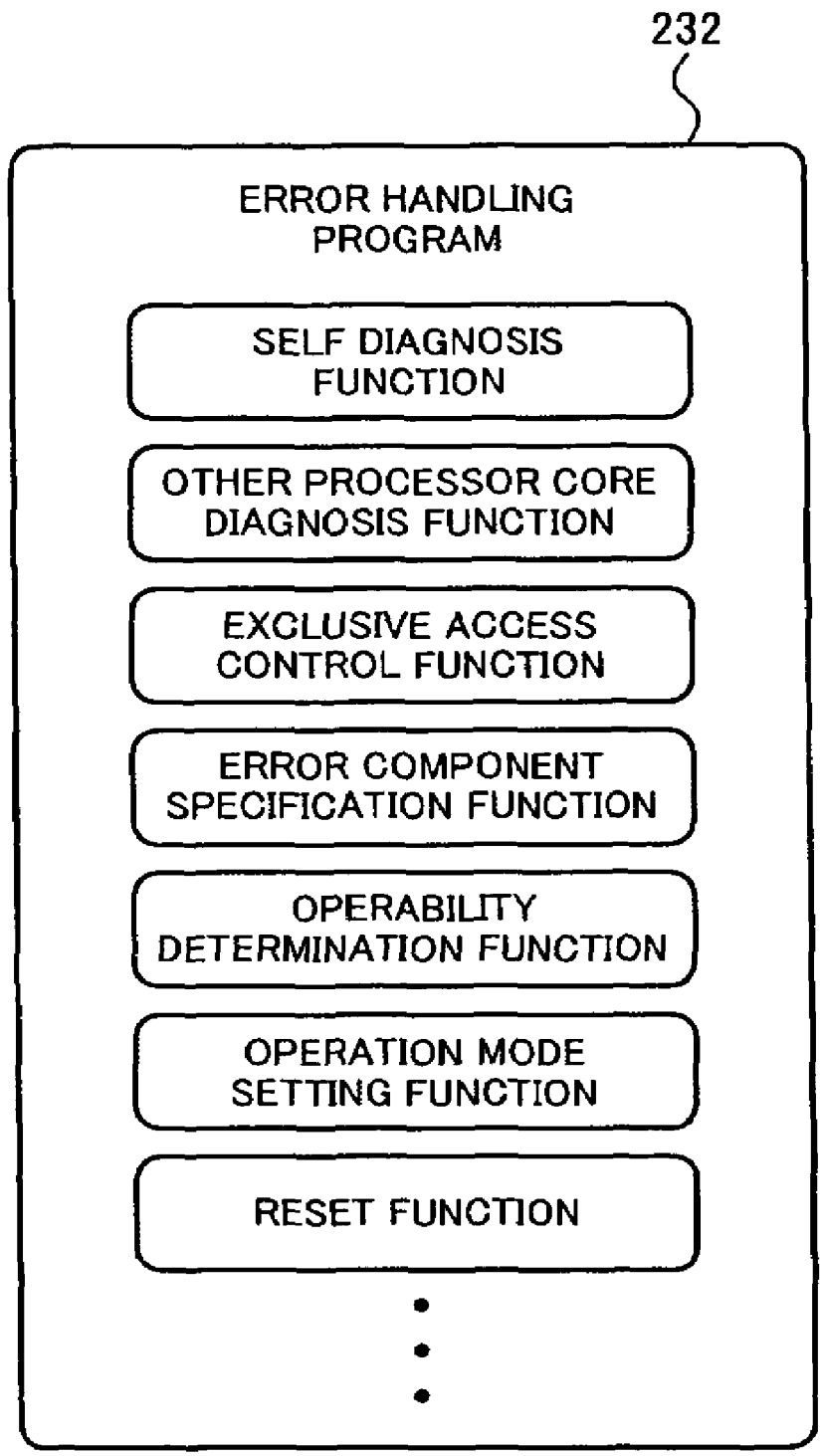
FIG. 6 lists the functions of an error handling program according to an embodiment of the present invention.

FIG. 6 shows the functions of the error handling program 232 according to an embodiment of the present invention. The error handling program 232, as described above, is called when an error occurs in the controller 11, and executed by the processor core 211.

As shown in FIG. 6, the error handling program 232 includes a self diagnosis function for diagnosing whether the processor core 211 itself is normally operable, another processor core diagnosis function for diagnosing whether the other processor cores 211 are normally operable, an exclusive access control function for performing exclusive access control with the other processor core 211, a failed component specification function for specifying the failed component, an operability determination function for determining whether the controller 2 is normally operable even when the failed component is removed, an operation mode setting function for setting the operation mode of the controller 2 so that the failed component will not be used, and a reset function for resetting the hardware.

FIG. 7 is a diagram showing an example of the error status register 214 provided to the processor 21 of the controller 2 according to an embodiment of the present invention. The error status register 214 shows the existence (status) of error in the respective components in the processor 21. Specifically, the error status register 214 records the status of occurrence of an error in the processor core 211, the L1 cache 212, and the L2 cache 213. Further, [the error status register 214] also shows the degree of error in the L2 cache 213.

Figure 8:
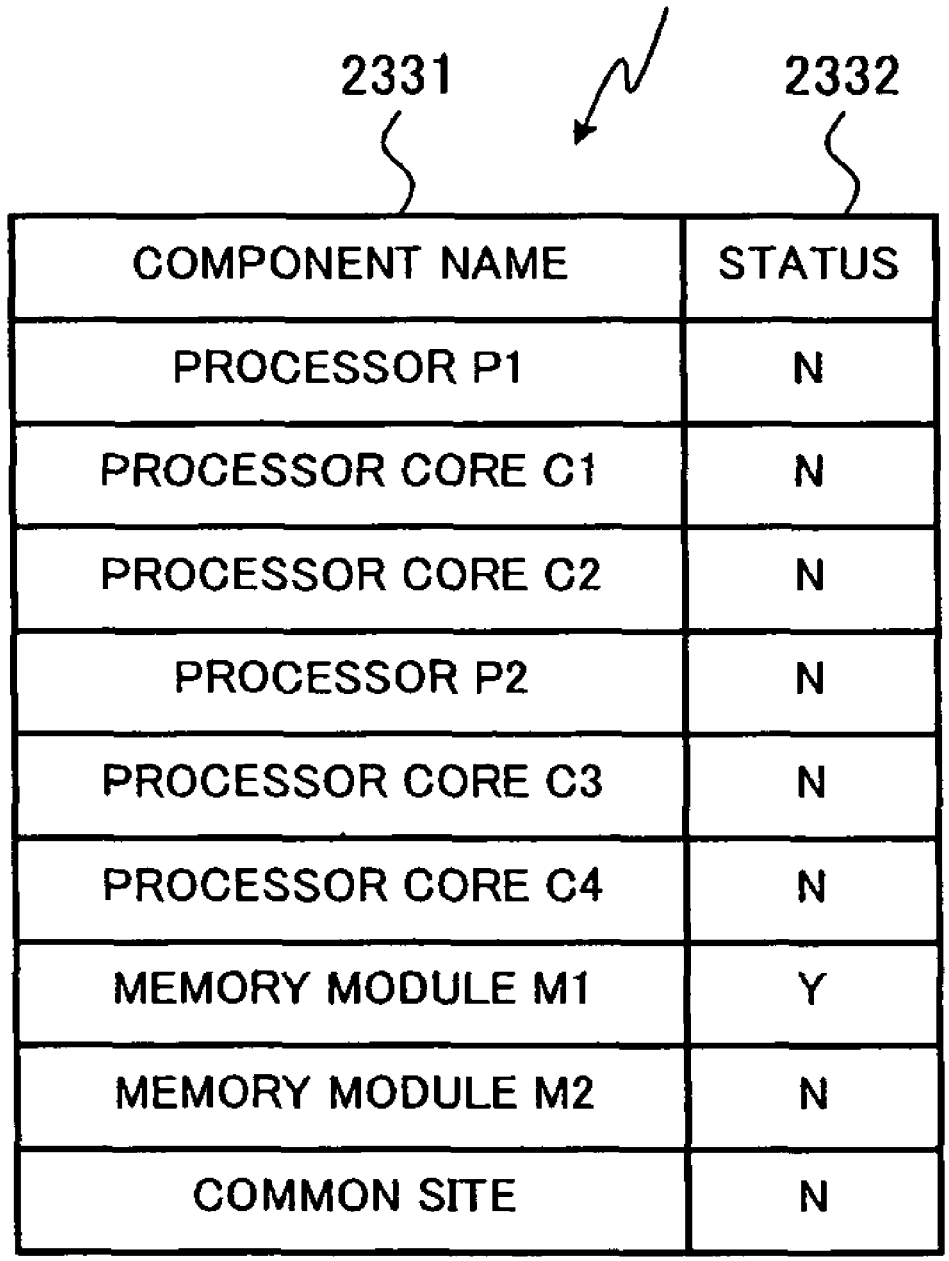
FIG. 8 is a diagram showing an example of an inactivated component management table stored in the nonvolatile memory unit in the controller according to an embodiment of the present invention.

FIG. 8 is a diagram showing an example of the inactivated component management table 233 stored in the nonvolatile memory unit 23 according to an embodiment of the present invention.

The inactivated component management table 233 is used for managing the inactivated status of the respective components in the controller 2. Each entry of the inactivated component management table 233 includes the component 2331 and the inactivated status 2332. The component 2331 is defined as the component itself (for instance, the processor 21) in the controller 2 or a portion of such component (for instance, the processor cores C1 to C4 or the memory modules M1 and M2). This is in correspondence to the level capable of specifying the occurrence of an error. Further, the component 2331 "common component," for instance, shows a component that is no redundantly configured such as the internal bus of the chipset 24. In the case when the component is of a inactivated status (in other words, an unusable status), the inactivated status becomes "Y," and in the case when the component is not of a inactivated status (in other words, a usable status), the inactivated status becomes "N." In this example, the inactivated component management table 233 shows that the memory module M1 is of an inactivated status.

Figure 9:
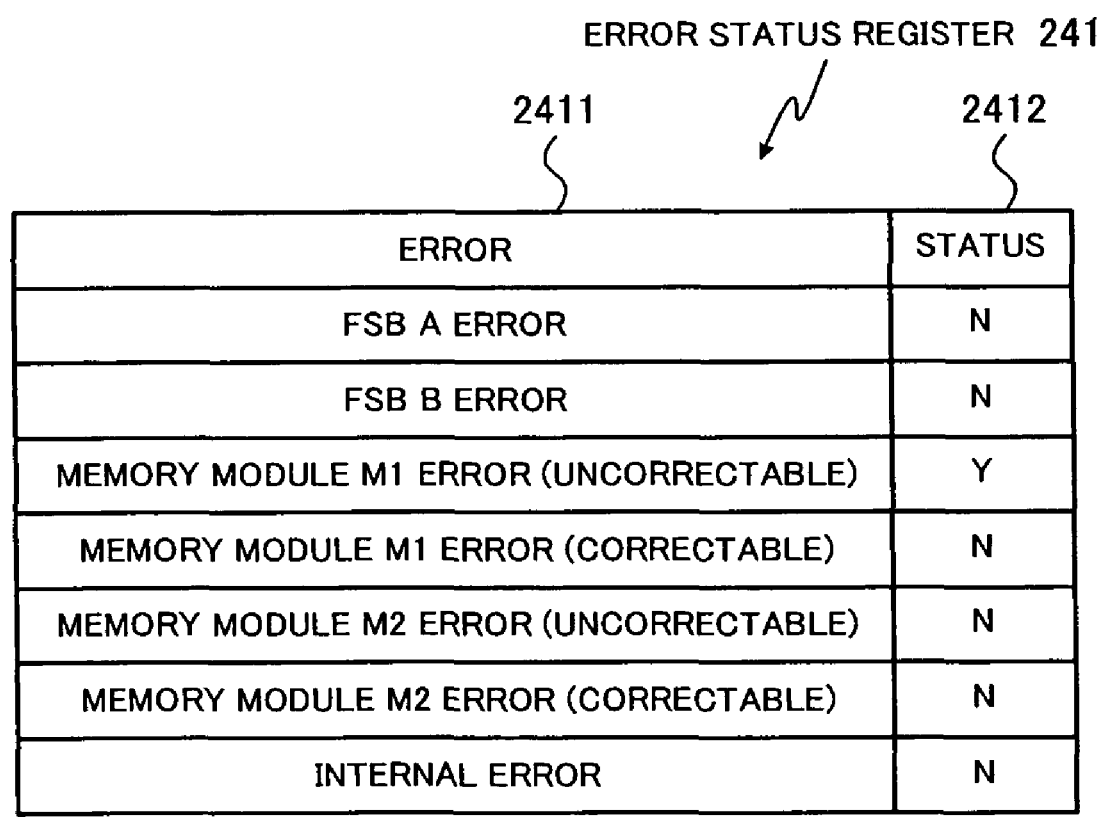
FIG. 9 is a diagram showing an example of an error status register provided in the chipset in the controller according to an embodiment of the present invention.

FIG. 9 is a diagram showing an example of the error status register 241 provided to the chipset 24 according to an embodiment of the present invention.

The error status register 241 in the chipset 24 records the status of an error arising chipset 22 and in the signal line connected thereto. The error status register 241 also shows the degree of error (in other words, whether the error is correctable) depending on the component. For example, a correctable error or an uncorrectable error is detected in the signal line connecting the memory modules M1 and M2. Specifically, the ECC (Error Correction Code) is used to determine whether the error is correctable. This example shows a case where an uncorrectable error has arisen in the memory module M1.

FIG. 10 is a diagram showing an example of the configuration of the component activation register 242 provided to the chipset 24 of the controller 2 according to an embodiment of the present invention. The component activation register 242 shows whether to use the hardware resources connected to the chipset 24; namely, FSB A and FSB B as well as the memory modules M1 and M2. In this example, the memory module M1 is invalidated, and is of an unusable status.

Figure 11:
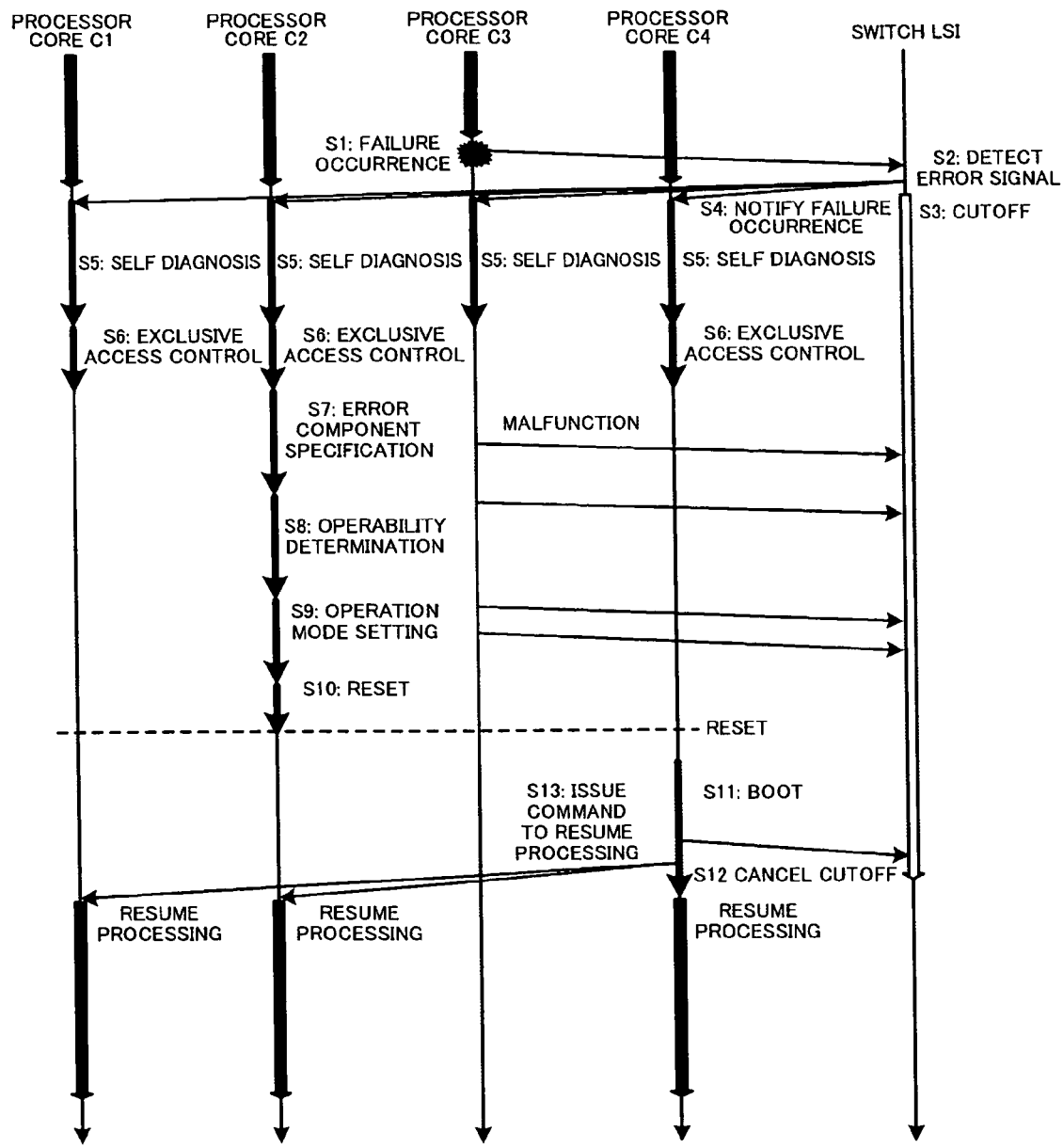
FIG. 11 is a sequence chart explaining the flow of processing when an error occurs in the storage system according to an embodiment of the present invention.

An operation example during the occurrence of an error in the storage system 1 configured as described above is now explained. FIG. 11 is a sequence chart explaining the flow of processing when an error occurs in the storage system 1 according to an embodiment of the present invention. More specifically, in FIG. 11, explained is the flow of processing from the time a error occurs in any one of the processor cores 211 in the controller 2, up to the time the non-failed processor core 211 resumes the I/O processing.

While the four processor cores C1 to C4 were normally performing I/O processing, let it be assumed that an error occurred in the processor core C3 (S1). This is a case where an error occurred in the processor core C3 itself, or in its internal L1 cache. When the processor core C3 detects an error, it sends a processor error signal to the switch LSI 3 via the first error signal line 27, and the switch LSI 3 detects the error signal (S2).

When the switch LSI 3 detects the error signal from the processor core C3 via the first error signal line 27, it immediately changes the value of the cutoff status register 33 to "Y." By this, the switch LSI 3 migrates to the access cutoff mode, and stops the routing of all data to be input (S3), and interrupts the processor cores C1 to 4 (S4). Thereby, during the access cutoff mode, even access is attempted to an external unit via the switch LSI 3 based on the malfunction of the failed processor C3, such access will be cut off.

When each of the processor cores C1 to C4 receives the interruption, it calls the error handling program 232 and executes prescribed error handling. In other words, each of the processor cores C1 to C4 foremost executes self diagnosis function to determine whether the processor core itself is normally operable (S5). Here, each of the processor cores C1 to C4 writes the contents of the error status register 214 obtained from the self diagnosis function into the nonvolatile memory unit 23 so that such contents can be referred to by the other processor cores. In this example, assume that the processor cores C1, C2, and C4 are determined to be normally operable. Further, the processor core C3 subject to a error and determined as not being normally operable is subject to the other processor core diagnosis function (not shown), and ends the execution of the error handling program 232.

Subsequently, the processor cores C1, C2, and C4 that determined themselves to be normally operable executes exclusive access control function in order to decide one processor core to continue the subsequent error handling (S6). Exclusive access control, for example, is conducted based on which processor core acquires the shared flag (right to exclude) first. Here, assume that the processor core C2 acquired the right to exclude. Subsequently, the processor cores C1 and C4 that could not acquire the right to exclude stop the execution of the error handling program 232.

The processor core C2 that acquired the right to exclude subsequently executes failed component specification function, and attempts to specify the component that may have failed in the controller 2 (S7). Specifically, the processor core C2 refers to the contents of the error status register of the respective processor cores C1 to C4 written into the nonvolatile memory unit 113, refers to the contents of the error status register in the chipset 24, and specifies the component subject to an error (hereinafter referred to as a "failed component"). Assume that an error occurred in the processor C3.

Subsequently, the processor core C2 executes operability determination function, and determines whether the controller 2 is still operable even in a setting of not using the specified failed component (in other words, the processor core C3) (S8). When the controller 2 is determined as operable, the processor core C2 executes operation mode setting function, and changes the setting of the chipset 24 to invalidate the failed component (S9). Then, in order to initialize the controller 2 itself, the processor core C2 issues hardware reset (S10). As a result of executing the hardware reset, one of the processor cores C1, C2, and C4 that is not invalidated executes a boot program (S11). In this example, let it be assumed that the processor core C4 executed the boot program.

The processor core C4 that executed the boot program confirms that the failed component is of an inactivated status, and thereafter commands the switch LSI 3 to cancel the access cutoff (S12). The processor core C4 commands the valid processor cores C1 and C2 to resume I/O processing, and it itself also resumes the I/O control processing (S13).

As described above, since the switch LSI 3 immediately stops the routing when an error is detected in the controller 2, even when access is made based on the malfunction of the failed component, such access can be reliably cut off.

The respective functions of the error handling program 232 to be executed by the processor 21 in the controller 2 are now explained. As described above, the processor 21 of this embodiment has two processor cores 211, and, therefore, in reality, the respective processor cores 211 execute the error handling program 232 in parallel. The error handling program 232 is called when an error is detected in any component in the controller 2.

Figure 12:
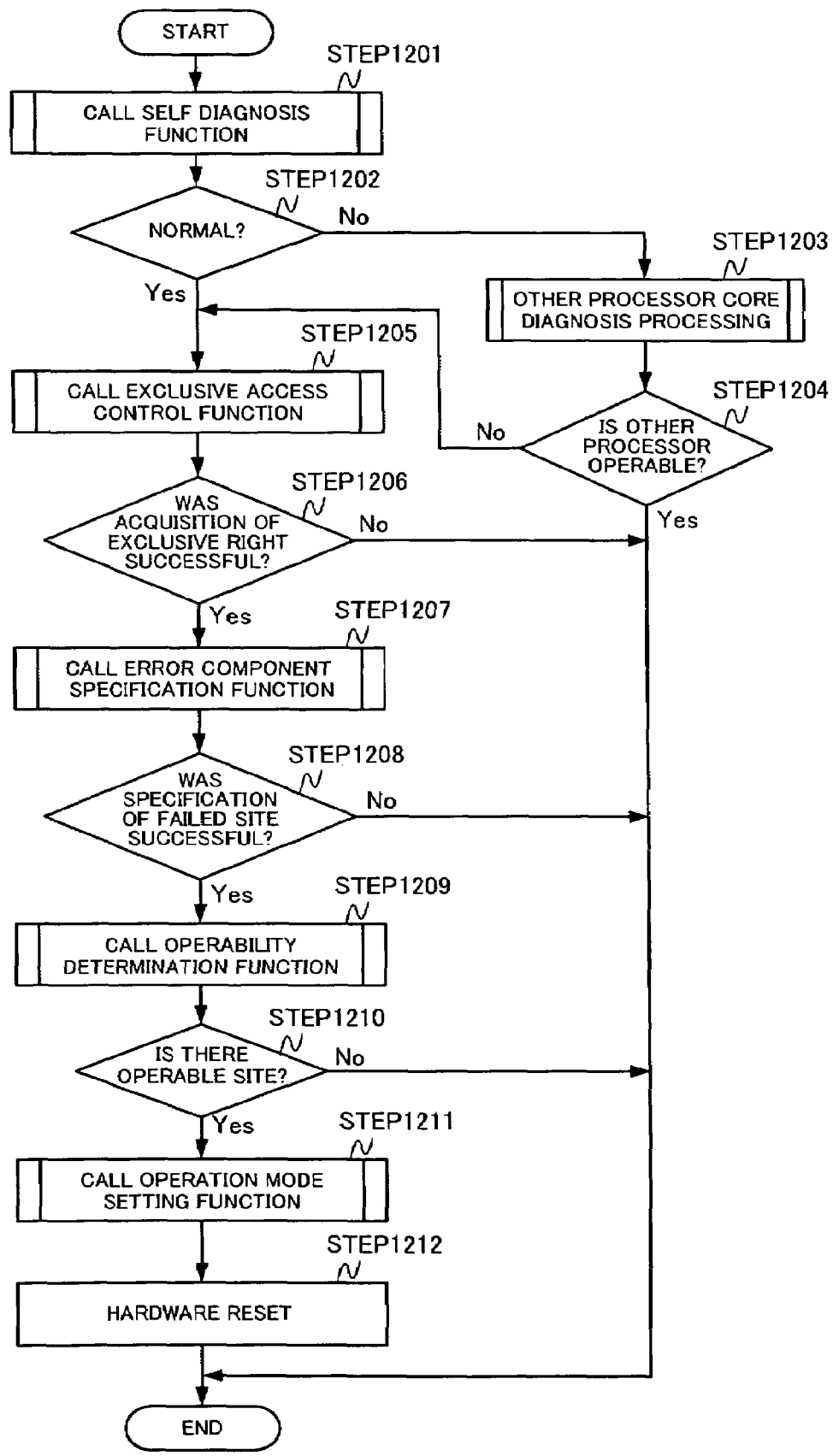
FIG. 12 is an overall flowchart explaining an error handling program according to an embodiment of the present invention.

FIG. 12 is an overall flowchart explaining the error handling program 232 according to an embodiment of the present invention. The error handling program 232 is executed by the respective processor cores 211 when an error is detected in any component in the controller 2.

The processor core 211 executing the error handling program 232 foremost executes self diagnosis function (STEP 1201), and determines whether the processor core 211 itself is normally operable (STEP 1202; Yes). When it is determined that the processor core 211 itself is not normally operable, the processor core 211 executes another processor core diagnosis function (STEP 1203), and determines whether any one of the other processor cores 211 is operable (STEP 1204). When any one of the other processor cores 211 is operable, the processor core ends the processing (STEP 1204; Yes). Contrarily, when all other processor cores 211 are inoperable, the processor core 211 attempts to continue operation to execute the failed component specification function described later (STEP 1204; No).

When the processor core 211 determines that it is normally operable at STEP 1202 or that all other processor cores 211 are inoperable at STEP 1204, it executes exclusive access control function (STEP 1205), and determines whether the processor core 211 itself succeeded in acquiring the right to exclude (STEP 1206).

When the processor core 211 that it itself succeeded in acquiring the right to exclude (STEP 1206; Yes), it subsequently executes failed component specification function (STEP 1207). Contrarily, when the processor core 211 was not able to acquire the right to exclude, since the subsequent processing will be succeeded by the other processor cores 211 that acquired the right to exclude, it itself ends the execution of the error handling program 232.

The processor 211 that acquired the right to exclude and executed the failed component specification function subsequently determines whether it was possible to specify the component in the controller 2 that was subject to an error (STEP 1208). When the processor core 211 was able to specify the failed component (STEP 1208; Yes), it executes operability determination function (STEP 1209), and determines whether an operable component exists in the controller 2 (STEP 1210). This is to determine, as a result of an operable component existing in the controller 2, whether it is possible to continue the storage service in the operation mode using only the operable component even in a status where an error occurred as described above.

When the processor core 211 determines that an operable component exists in the controller 2 (STEP 1210; Yes), it subsequently executes operation mode setting function (STEP 1211).

Then, the processor core 211 issues hardware reset (STEP 1212). By way of this, all processor cores 211 in the controller 2 are reset, and the boot program is called.

Figure 13:
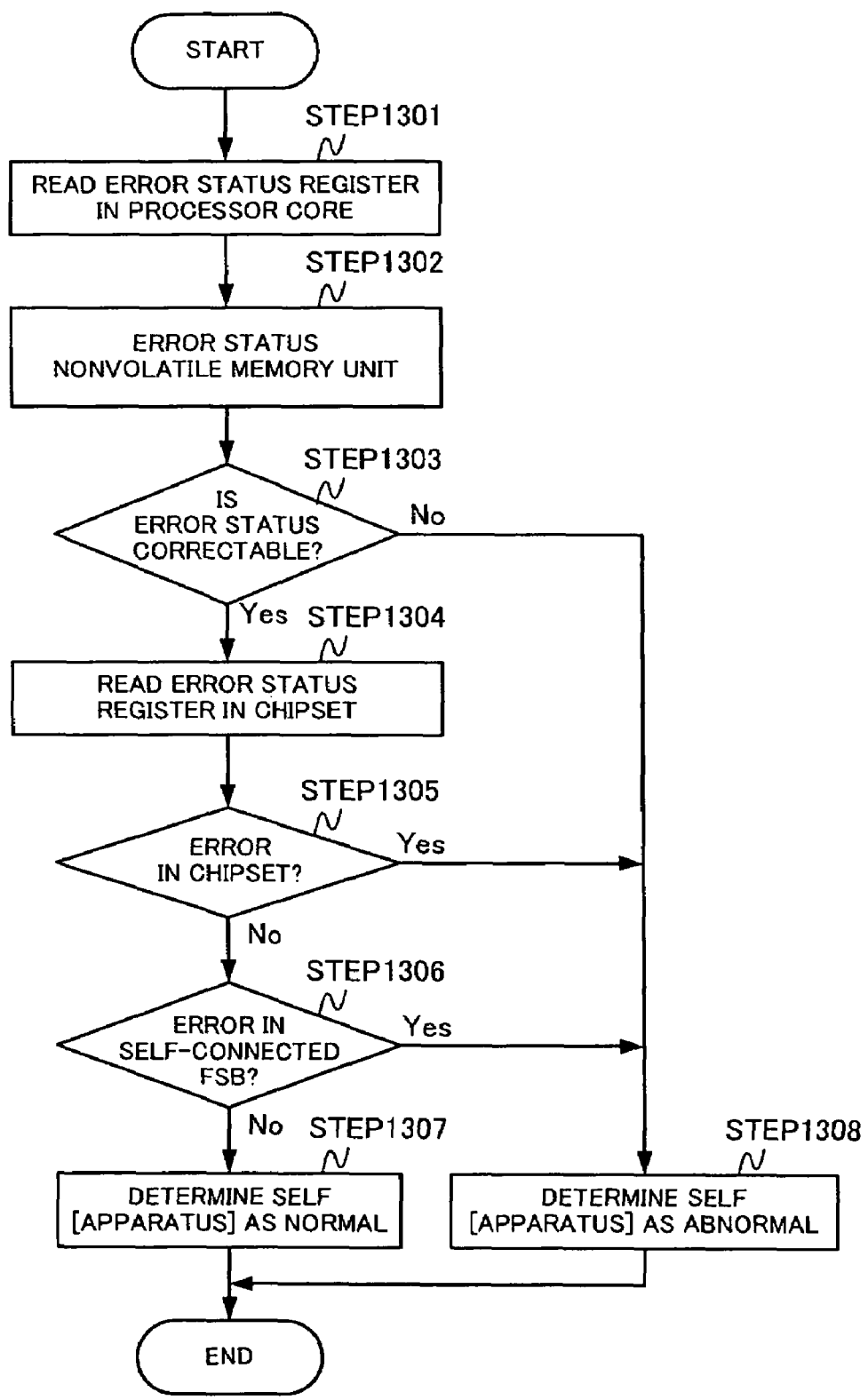
FIG. 13 is a flowchart explaining self diagnosis function in the error handling program according to an embodiment of the present invention.

FIG. 13 is a flowchart explaining the self diagnosis function in the error handling program 232 according to an embodiment of the present invention. In self diagnosis function, the processor core 211 that is executing this determines whether the processor core itself is normally operable, and writes the contents of the error status register 214 into the nonvolatile memory unit 23 so that the other processor cores 211 can refer to its contents of the error status register 214.

As shown in FIG. 13, the processor core 211 foremost reads its contents from the error status register 214 (STEP 1301), and writes such contents into the nonvolatile memory unit 23 (STEP 1302). Further, the processor core 211 determines whether an uncorrectable error is recorded in the error status register 214 (STEP 1303). When an uncorrectable error is recorded in the error status register 214, the processor core 211 determines that normal operation is not possible, and ends this function (STEP 1308).

When no error is recorded in the error status register 214, or only correctable errors are recorded therein, the processor core 211 subsequently reads the error status register 241 in the chipset 24 (STEP 1304). The processor core 211 determines whether an uncorrectable error is recorded in the error status register 241 (STEP 1305), and, when an uncorrectable error is recorded in the error status register 241, the processor core 211 similarly determines that normal operation is not possible, and ends this function (STEP 1308).

When no error is recorded in the error status register 241, or only correctable errors are recorded therein, the processor core 211 determines whether an error in the front-side bus (FSB) 25 that it itself is connected to is stored (STEP 1306). When an error in the FSB 25 is recorded (STEP 1306; Yes), [the processor core 211] similarly determines that normal operation is not possible, and ends this function (STEP 1308).

Contrarily, when an error in the FSB 25 is not recorded (STEP 1306; No), the processor core 211 determines that normal operation is possible, and ends this function (STEP 1307).

Figure 14:
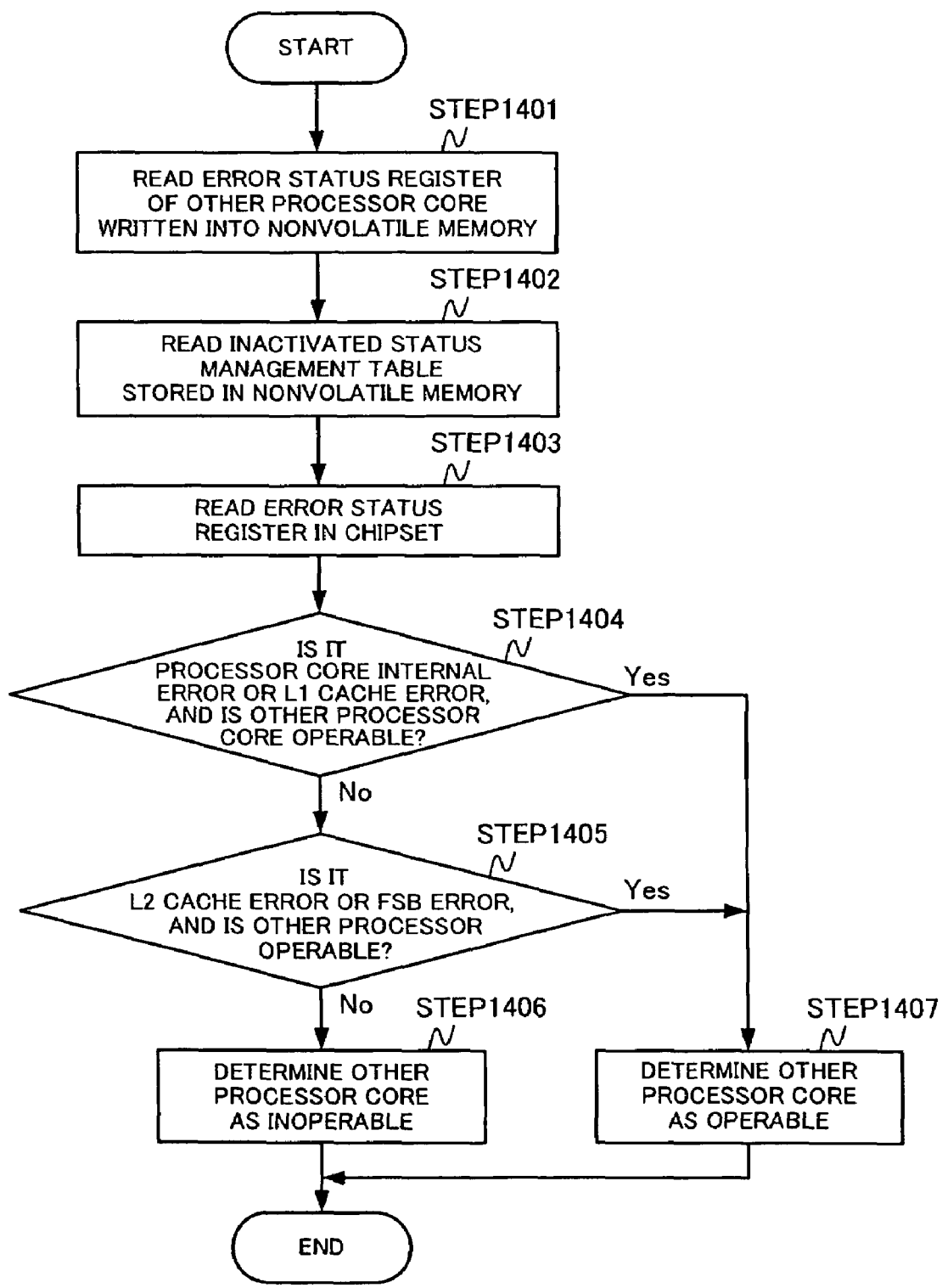
FIG. 14 is a flowchart explaining other processor core diagnosis function in the error handling program according to an embodiment of the present invention.

FIG. 14 is a flowchart explaining the other processor core diagnosis function in the error handling program 232 according to an embodiment of the present invention. In the other processor core diagnosis function, the processor core 211 determines whether any one of the other processor cores 211 can normally operate and perform error handling.

Specifically, as shown in FIG. 14, the processing 211 executing the error handling program reads the error status register 214 of the other processor core 211 written into the nonvolatile memory unit 23 (STEP 1401), and also reads the inactivated component management table 233 (STEP 1402). The processor core 211 thereafter reads the error status register 241 in the chipset 24 (STEP 1403).

The processor core 211 subsequently determines, based on the read error status register 214, the inactivated component management table 233 and the error status register 241, whether there is a processor core internal error or an L1 cache error, and whether there is at least one or more other processor cores 211 not of a inactivated status (STEP 1404). When there is a processor core internal error or an L1 cache error, and whether there is at least one or more other processor cores 211 not of a inactivated status (STEP 1404; Yes), the processor core 211 determines that another processor core 211 is operable (STEP 1407).

When there is no processor core internal error or an L1 cache error, or when there is no other processor core 211 that is not of a inactivated status, the processor core 211 further determines whether there is an L2 cache error or an FSB error, and whether there is at least one or more other processor cores 211 not of a inactivated status (STEP 1405). When there is an L2 cache error or an FSB error, and whether there is at least one or more other processor cores 211 not of a inactivated status, the processor core 211 similarly determines that another processor core 211 is operable (STEP 1407). Contrarily, when there is no an L2 cache error or an FSB error, or when there is no other processor core 211 that is not of a inactivated status, the processor core 211 determines that the other processor cores 211 are inoperable (STEP 1406).

Figure 15:
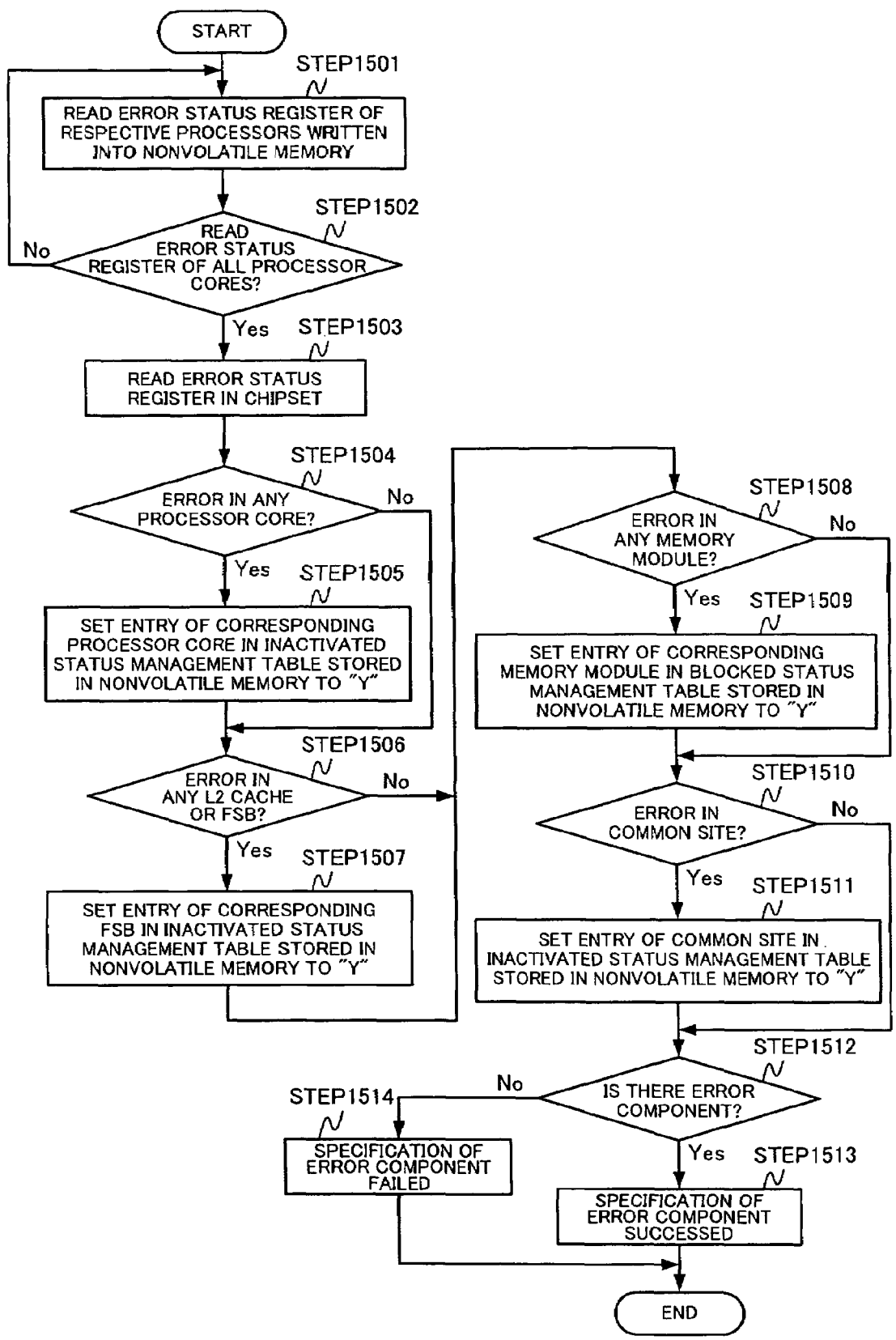
FIG. 15 is a flowchart explaining failed component specification function in the error handling program according to an embodiment of the present invention.

FIG. 15 is a flowchart explaining the failed component specification function in the error handling program 232 according to an embodiment of the present invention. In the failed component specification function, the processor core 211 specifies in which portion of the controller 2 the error occurred. The processor core 211 to execute the failed component specification function is only the processor core 211 that acquired the right to exclude in the exclusive access control function.

Specifically, as shown in FIG. 15, the processor core 211 reads the contents of the error status register 214 of the respective processor cores 211 written into the nonvolatile memory unit 23 during the self diagnosis function of the respective processor cores 211 (STEP 1501). The processor core 211 determines whether the contents in the error status register 214 of all processor core 211 have been read (STEP 1502), and repeats the foregoing read processing if all such contents have not yet been read.

The processor core 211 subsequently reads the contents of the error status register 241 in the chipset 24 (STEP 1503), and determines whether an error occurred in any one of the processor cores 211 (STEP 1504). When the processor core 211 determines that an error occurred in one of the processor cores 211 (STEP 1504; Yes), it sets "Y" in the entry of the corresponding processor 211 in the inactivated component management table 233 stored in the nonvolatile memory unit 2 (STEP 1505). Contrarily, when it is determined that no error has occurred in the processor core 211, the processor core 211 directly proceeds to the subsequent processing.

The processor core 211 determines whether an error has occurred in either the L2 cache or the FSB (STEP 1506). When it is determined that a error has occurred in either the L2 cache 213 or the FSB 25 (STEP 1506; Yes), it is determined that the processor 21 cannot be used, and the processor core 211 sets "Y" in the entry of the corresponding FSB 25 in the inactivated component management table 233 (STEP 1507).

Further, the processor core 211 determines whether an error has occurred in any one of the memory modules 221 (STEP 1508). When the processor core 211 determines that a error has occurred in one of the memory modules 221 (STEP 1508; Yes), it sets "Y" in the entry of the corresponding memory module 221 in the inactivated component management table 233 stored in the nonvolatile memory unit 23 (STEP 1508).

Moreover, the processor core 211 determines whether an error has occurred in a common component (STEP 1510). A common component, for instance, is a component that is not configured redundantly such as an internal bus in the chipset 24. When the processor core 211 determines that a error has occurred in the common component, it sets "Y" in the entry of the common component in the inactivated component management table 233 stored in the nonvolatile memory unit 23 (STEP 1511).

Then, the processor core 211 checks whether a inactivated status ("Y") is set in the respective components in the inactivated component management table 233 as a result of the foregoing processing (STEP 1512). When a inactivated status is set in any one of the components of the inactivated component management table 233, the failed component specification function is ended since the process succeeded in specifying a failed component (STEP 1513). Contrarily, when a inactivated status is not set in the inactivated component management table 233, this means that a failed component could not be specified even upon calling the error handling program 232. Accordingly, in this case, the processor core 211 determines that the error handling was not performed correctly, and ends the failed component specification function since the process failed in specifying the failed component (STEP 1514).

Thus, in the failed component specification function, the processor core 211 specifies a failed component based on the error status register 214 in all processor cores 211 and the error status register 241 in the chipset 24 of the controller 2, and rewrites the inactivated status of the inactivated component management table 233 so that the failed component will be inactivated.

Figure 16:
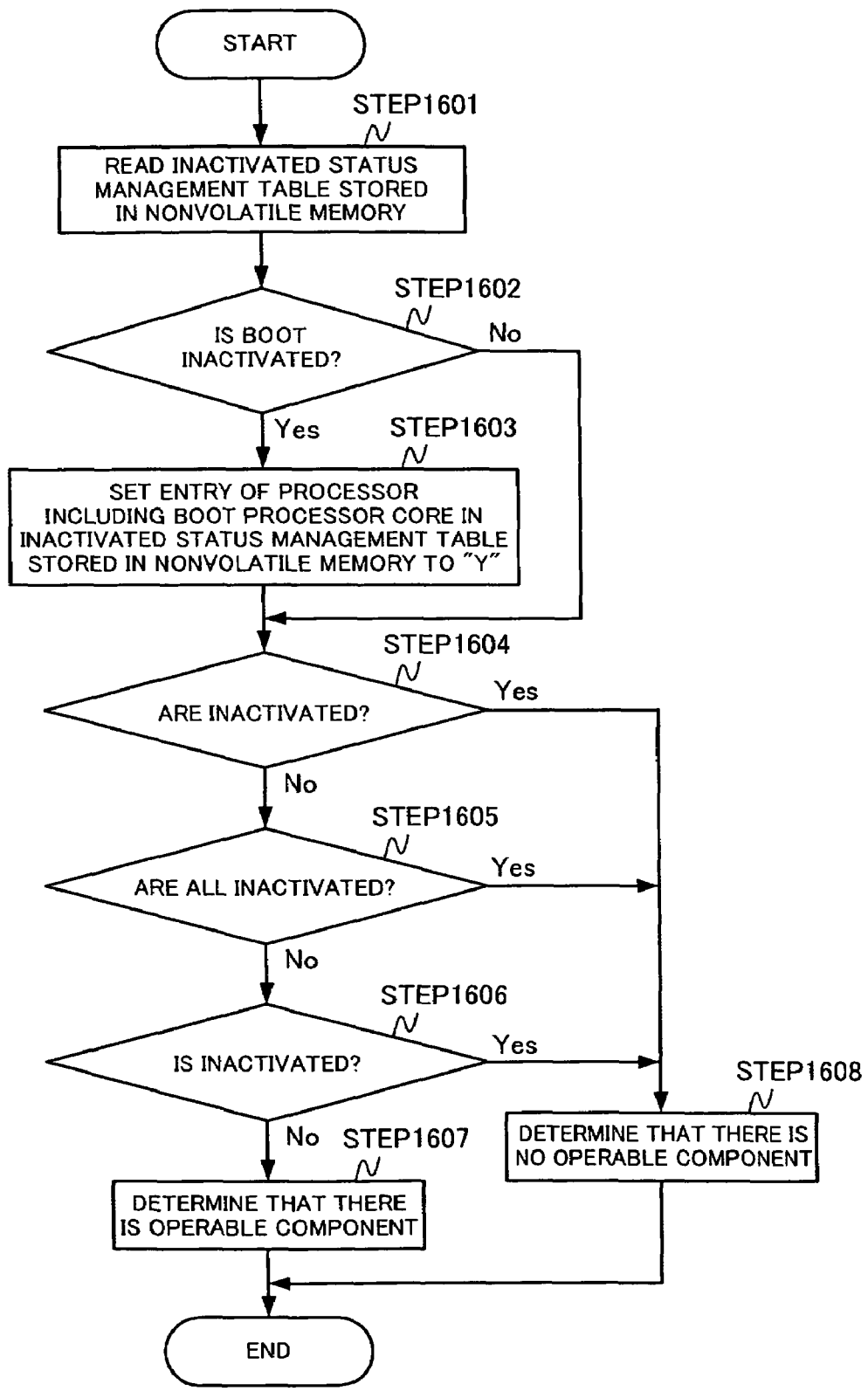
FIG. 16 is a flowchart explaining operability determination function in the error handling program according to an embodiment of the present invention.

FIG. 16 is a flowchart explaining the operability determination function in the error handling program 232 according to an embodiment of the present invention. In the operability determination function, the processor core 211 determines whether it is possible to operate the controller 2 with only the normal components in the controller 2.

As shown in FIG. 16, the processor core 211 reads the inactivated component management table 233 stored in the nonvolatile memory unit 23 (STEP 1601). Subsequently, the processor core 211 determines whether the boot processor core 211 is set to an inactivated status (STEP 1602). The boot processor core 211 is one predetermined processor core 21 in the processor 21. For example, he processor core C1 of the processor P1 and the processor core C3 of the processor P2 are set as boot processor cores. During the boot, either the processor core C1 or the processor core C3 will execute the boot program. Thus, if the processor core C1 is of an inactivated status, it is necessary to set the processor P1 to an inactivated status.

Accordingly, when the processor core 211 determines that the boot processor core 211 is set to an inactivated status (STEP 1602; Yes), it sets "Y" in the entry of the processing 21 containing the boot processor core 211 in the inactivated component management table 233 in order to guarantee that the processor 21 containing the failed processor core 211 will not execute the boot program (STEP 1603).

The processor core 211 then determines whether all processors 21 are of an inactivated status (STEP 1604). When it is determined that all processors 21 are of an inactivated status (STEP 1604; Yes), the processor core 211 determines that there are no operable components in the controller 2 (STEP 1608). Contrarily, when it is determined that no all processors 21 are of an inactivated status (STEP 1604; No), the processor core 211 subsequently determines whether all memory modules 221 are of an inactivated status (STEP 1605).

When it is determined that all memory modules 221 are of an inactivated status (STEP 1605; Yes), the processor core 211 similarly determines that there are no operable components in the controller 2 (STEP 1608). Contrarily, when it is determined that not all memory modules 221 are of an inactivated status (STEP 1605; No), the processor core 21 further determines whether the common component is of an inactivated status (STEP 1606).

When it is determined that the common component is of an inactivated status (STEP 1606; Yes), the processor core 211 determines that there are no operable components in the controller 2 (STEP 1608). Contrarily, when it is determined that the common component is not of an inactivated status (STEP 1604; No), the processor core 211 determines that there is an operable component (STEP 1607), and ends this operability determination function.

Figure 17:
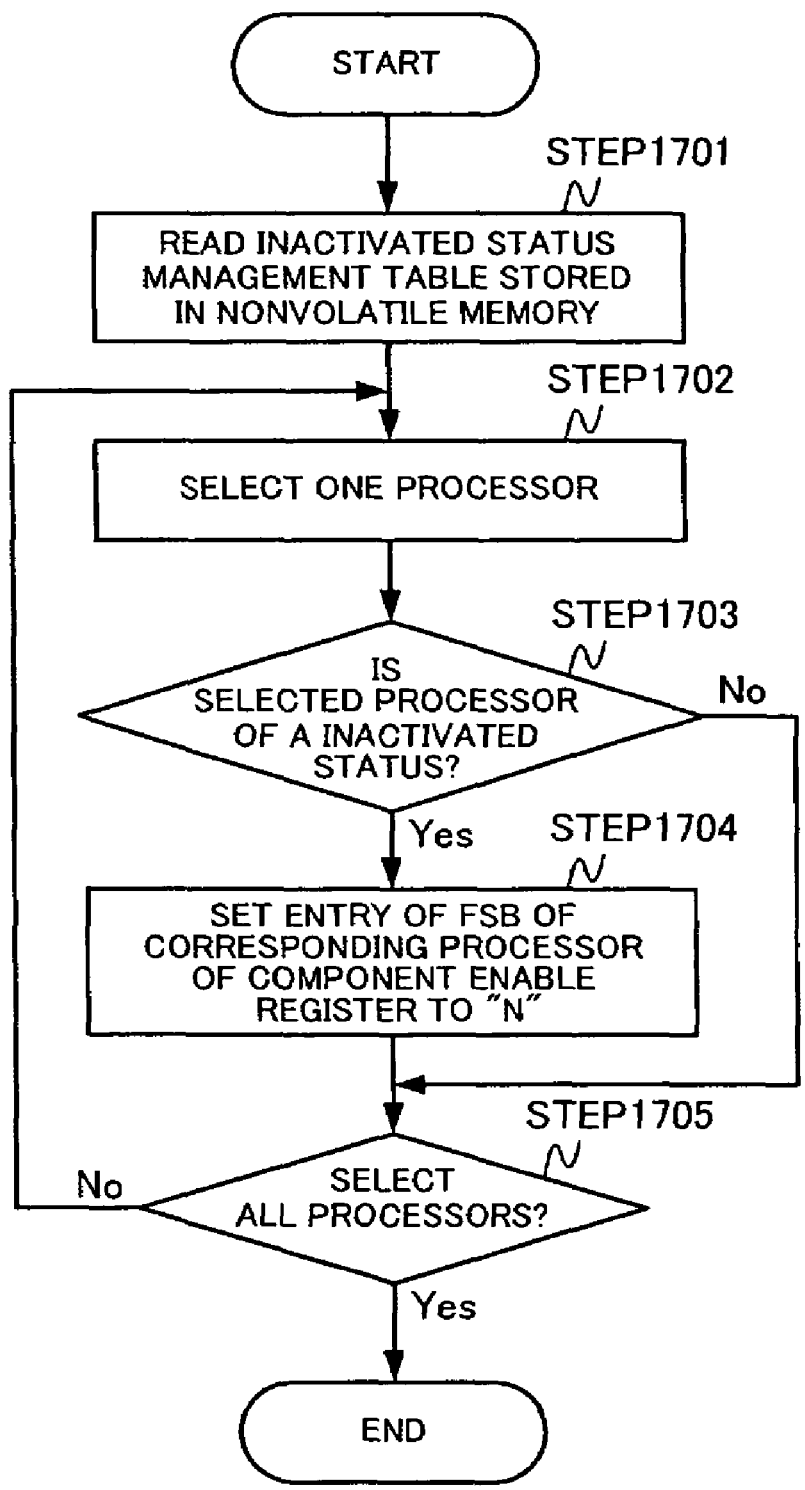
FIG. 17 is a flowchart explaining operation mode setting function in the error handling program according to an embodiment of the present invention.

FIG. 17 is a flowchart explaining the operation mode setting function in the error handling program 232 according to an embodiment of the present invention. In the operation mode setting function, the processor core 211 changes the setting of the component activation register 242 of the chipset 24 so that the controller 2 will not used the inactivated component.

Specifically, as shown in FIG. 17, the processor core 211 foremost reads the contents of the inactivated component management table 233 stored in the nonvolatile memory unit 23 (STEP 1701). Subsequently, the processor core 211 selects one processor 21 (STEP 1702), and determines whether the selected processor 21 is of a inactivated status (STEP 1703).

When the selected processor 21 is of a inactivated status (STEP 1703; Yes), the processor core 211 sets "N" in the entry of the FSB connected to the corresponding processor 21 in the component activation register 242 (STEP 1704). In other words, here, the selected processor 21 will not be used.

Subsequently, the processor core 211 determines whether all processors 21 have been selected (STEP 1705). When [the processor core 211] determines that no all processors 21 have been selected (STEP 1705; No), it selects the subsequent processor 21, and performs similar processing. If the selected processor 21 is not of a inactivated status (STEP 1703; No), the processor core 211 does not rewrite the component activation register 242, and determines whether all processors have been selected (STEP 1705).

Accordingly, when the processor 21 is of a inactivated status, since the FSB 25 connected to the processor 21 in the inactivated address of the component activation register 242 in the chipset 24 is invalidated, the processor 21 will not operate.

Figure 18:
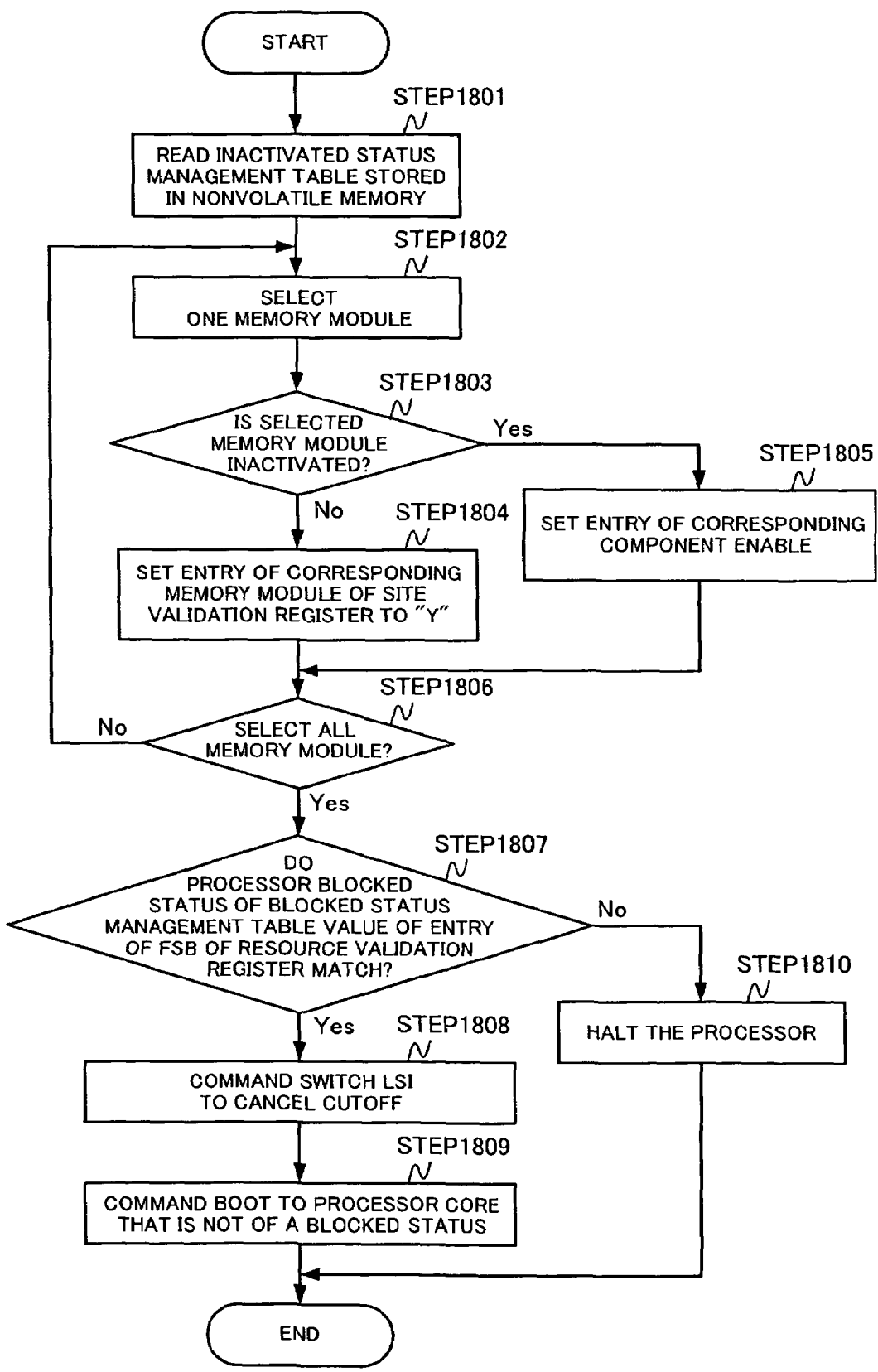
FIG. 18 is a flowchart explaining a boot program according to an embodiment of the present invention.

FIG. 18 is a flowchart explaining the boot program according to an embodiment of the present invention. A boot program is initially executed by the processor core 211 that executed the error program performing hardware reset. The processor core 211 to execute the boot program operates only the normal components in the controller 2, and, after confirming that the components to be inactivated are not operating, commands the switch LSI 3 to cancel the cutoff, and then boots another processor core 211.

Specifically, as shown in FIG. 18, the processor core 211 that started the execution of the boot program foremost reads the contents of the inactivated component management table 233 stored in the nonvolatile memory unit 23 (STEP 1801). Subsequently, the processor core 211 selects one memory module 221 (STEP 1802), refers to the read inactivated component management table 233, and determines whether the selected memory module 221 is of a inactivated status (STEP 1803). When the selected memory module 221 is not of a inactivated status, the processor core 211 sets "Y" in the entry of the corresponding memory module 221 of the component activation register 242 (STEP 1804). Contrarily, when the selected memory module 221 is of a inactivated status, the processor core 211 sets "N" in the entry of the corresponding memory module 221 of the component activation register 242

(STEP 1805). The processor core 211 determines whether all memory modules 221 have been selected (STEP 1806). When [processor core 211] determines that not all memory modules 221 have been selected (STEP 1806; No), it selects the subsequent memory module 221, and performs similar processing.

After checking all memory modules 221, the processor core 211 determines whether the processor inactivated status in the inactivated component management table 233 stored in the nonvolatile memory unit 23 and the FSB activation status in the component activation register 242 stored in the chipset 24 compatibly correspond to each other (STEP 1807). If the processor inactivated status in the inactivated component management table 233 stored in the nonvolatile memory unit 23 and the FSB activation status in the component activation register 242 stored in the chipset 24 do not coincide (STEP 1807; No), the processor core 211 stops the boot program since this means that the error handling was not performed correctly (STEP 1810).

If the processor inactivated status in the inactivated component management table 233 stored in the nonvolatile memory unit 23 and the FSB activation status in the component activation register 242 stored in the chipset 24 coincide (STEP 1807; Yes), the processor core 211 sends a cutoff release command to the switch LSI 3 (STEP 1808). Upon receiving this cutoff release command, the switch LSI 3 sets value of the cutoff status register 33 to "N," and resumes the routing that was stopped.

Subsequently, the processor core 211 commands the booting of a processor core that is not of a inactivated status in the inactivated component management table 233 (STEP 1809).

The setting of the component activation register 242 in the chipset 24 may be conducted at an arbitrary timing. For example, in the foregoing embodiment, the setting of activation/inactivation to the processor 21 is conducted during the operation mode setting function before the hardware reset, and the setting of the activation/inactivation to the memory module 221 is conducted during the boot processing after the hardware reset processing, but the present invention is not limited thereto.

Figure 19:
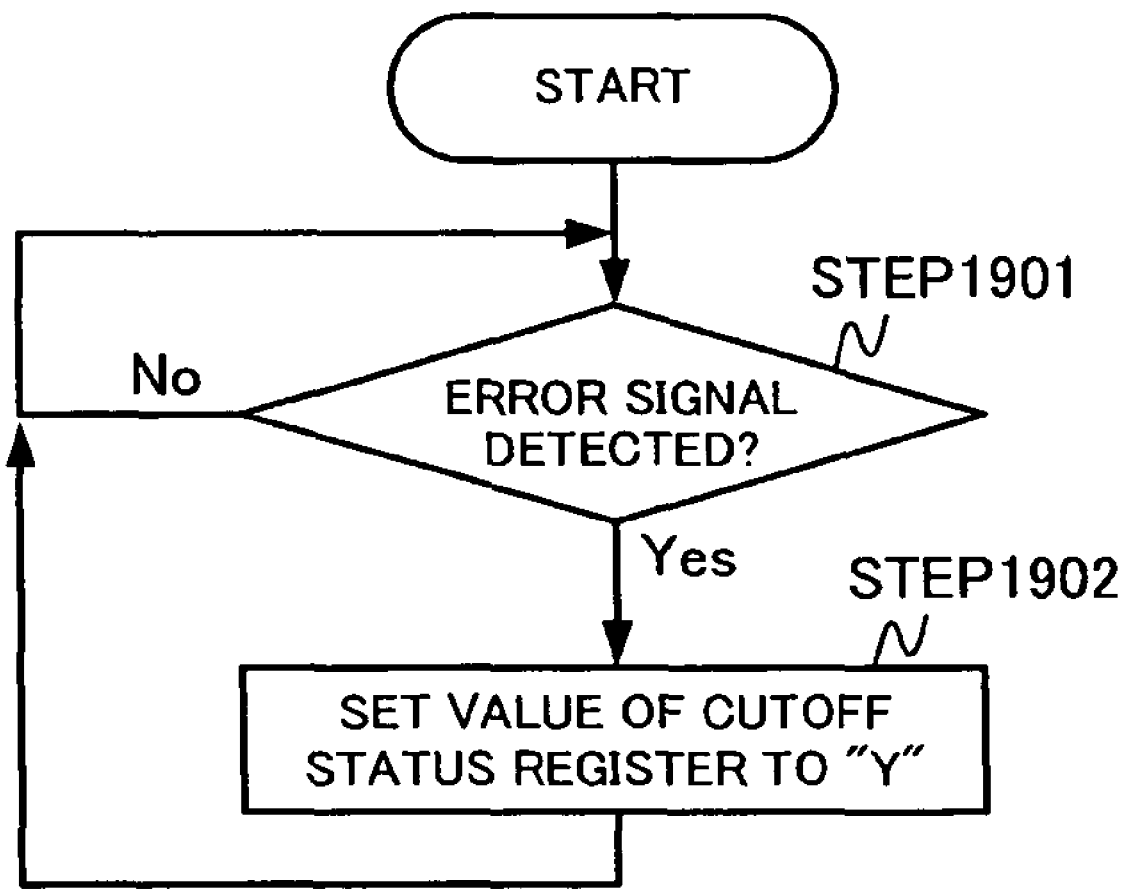
FIG. 19 is a flowchart explaining cutoff function of the switch LSI according to an embodiment of the present invention.

FIG. 19 is a flowchart explaining the cutoff processing of the switch LSI 3 according to an embodiment of the present invention.

Referring to FIG. 19, the switch LSI 3 is monitoring the first error signal line 27 and the second error signal line 28 during its operation (STEP 1901). When the switch LSI 3 detects an error signal in either the first error signal line 27 or the second error signal line 28 (STEP 1901; Yes), it immediately sets the value of the cutoff status register 33 to "Y." By this, since the switch LSI 3 will cut off all access at the point in time an error occurs in the controller 2, malfunction of the controller 2 will not influence the other units in the storage system 1.

Figure 20:
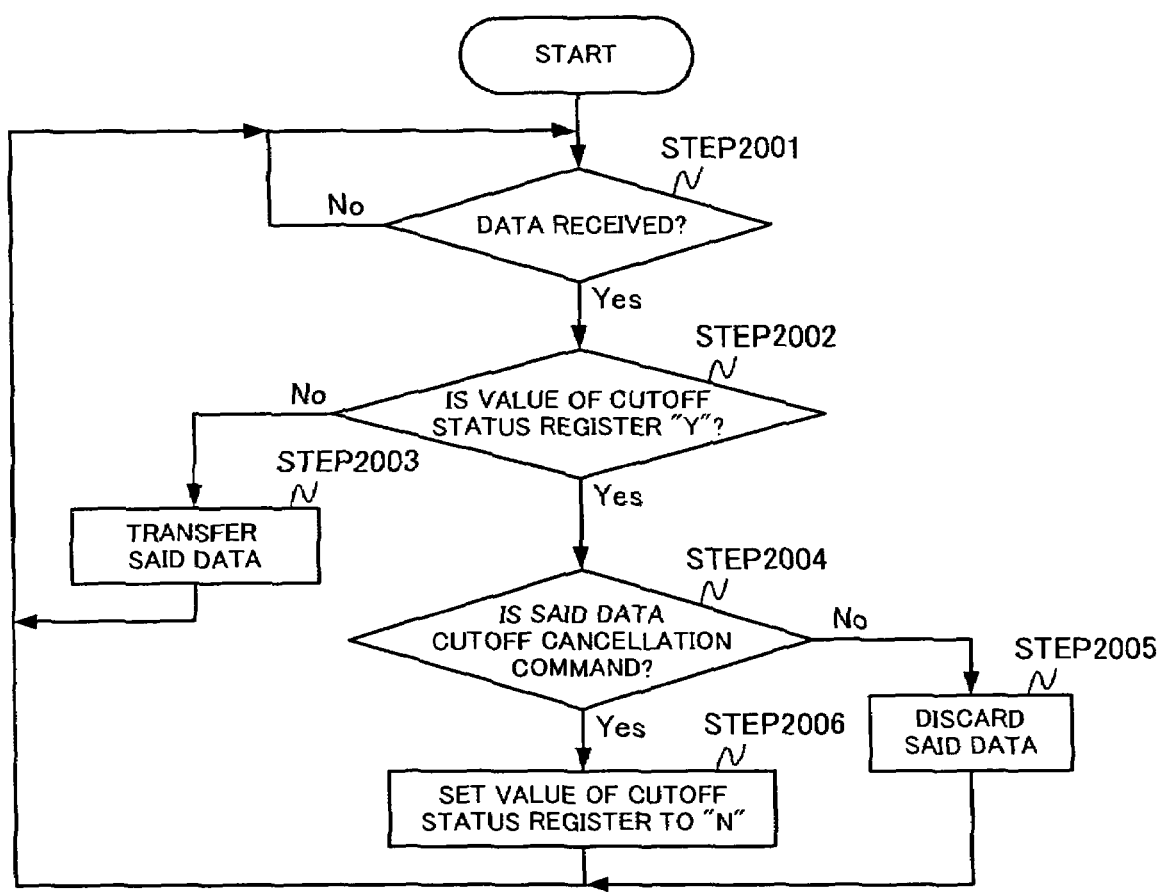
FIG. 20 is a flowchart explaining the operation of a routing unit of the switch LSI according to an embodiment of the present invention.

FIG. 20 is a flowchart explaining the operation of the routing unit 31 of the switch LSI 3 according to an embodiment of the present invention. FIG. 20 explains the processing in a case where the switch LSI 3 receives data from the processor 21 via the chipset 24.

Specifically, as shown in FIG. 20, when the switch LSI 3 receives data via the address/data line 26 (STEP 2001; Yes), it refers to the cutoff status register 33, and determines whether the value of the cutoff status register 33 is "Y" (STEP 2002). When the value of the cutoff status register 33 is "N," the switch LSI 3 sends the data to the internal network 8 in the storage system 1 according to the routing table (STEP 2003).

When the value of the cutoff status register 33 is "Y," the switch LSI 3 subsequently determines whether the data is a cutoff release command (STEP 2004). When the switch LSI 3 determines that the data is not a cutoff release command (STEP 2004; No), it discards the data (STEP 2005). This implies that the data entering the switch LSI 3 is cut off. Contrarily, when it is determined that the data is a cutoff release command (STEP 2004; Yes), the switch LSI 3 sets the value of the cutoff status register 33 to "N" (STEP 2006).

As described above, when an error occurs in the processor 21 of the controller 2, the switch LSI 3 cuts off all access until the controller 2 is re-operated with the remaining normal components. Thus, even when the failed processor 21 causes a malfunction, it is possible to prevent such malfunction from affecting the overall storage system 1. As a result, the reliability and availability of the storage system 1 can be improved.

Second Embodiment

The foregoing embodiment explained the error handling in a case where an error has occurred in any one of the components (components) in the controller 2. In this embodiment, a case is explained where an error has occurred in another unit in the storage system 1; for instance, in the cache memory unit 16.

Figure 21:
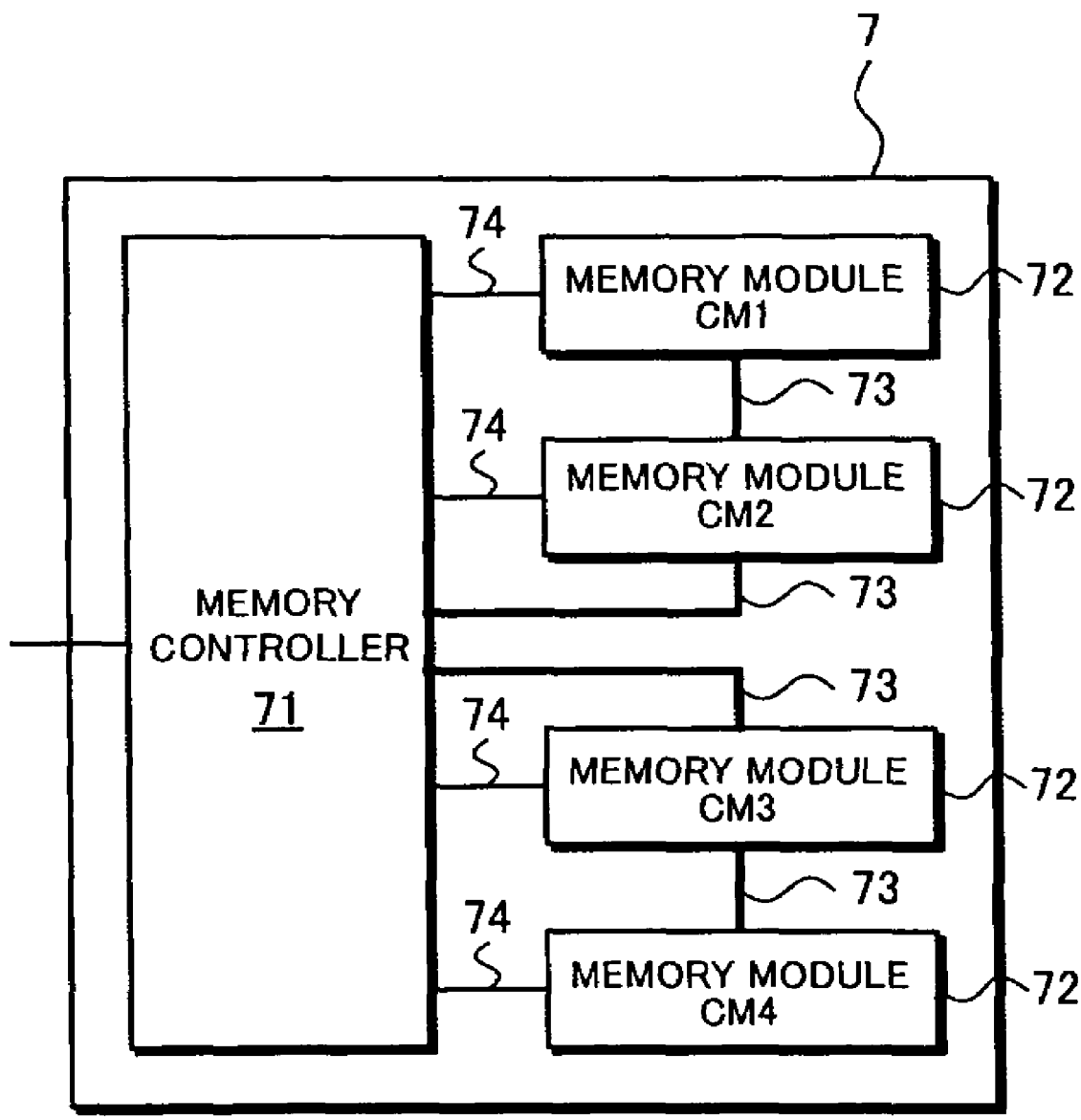
FIG. 21 is a diagram showing the configuration of a cache memory unit according to an embodiment of the present invention.

FIG. 21 is a diagram showing the configuration of the cache memory unit 7 according to an embodiment of the present invention. As shown in FIG. 21, the cache memory unit 7 comprises a memory controller 71, and a plurality of memory modules 72. The memory controller 71 receives an access request from another unit in the storage system 1, and performs control for accessing the appropriate memory module 162.

The memory controller 71 and the plurality of memory modules 72 are connected with the memory bus 73 and the control signal line 74. The memory bus 73 is used as the address and for transferring data to enable the memory controller 71 to access the data stored in the memory module 72. When an error occurs in the memory module 72 or the memory bus 73, the control signal line 74 is used for notifying the occurrence of such error or for transferring the error status information thereof. For the sake of convenience in the ensuing explanation, the memory modules 72 are indicated as memory modules CM1 and CM2 when it is necessary to differentiate such memory modules 72.

Figure 22:
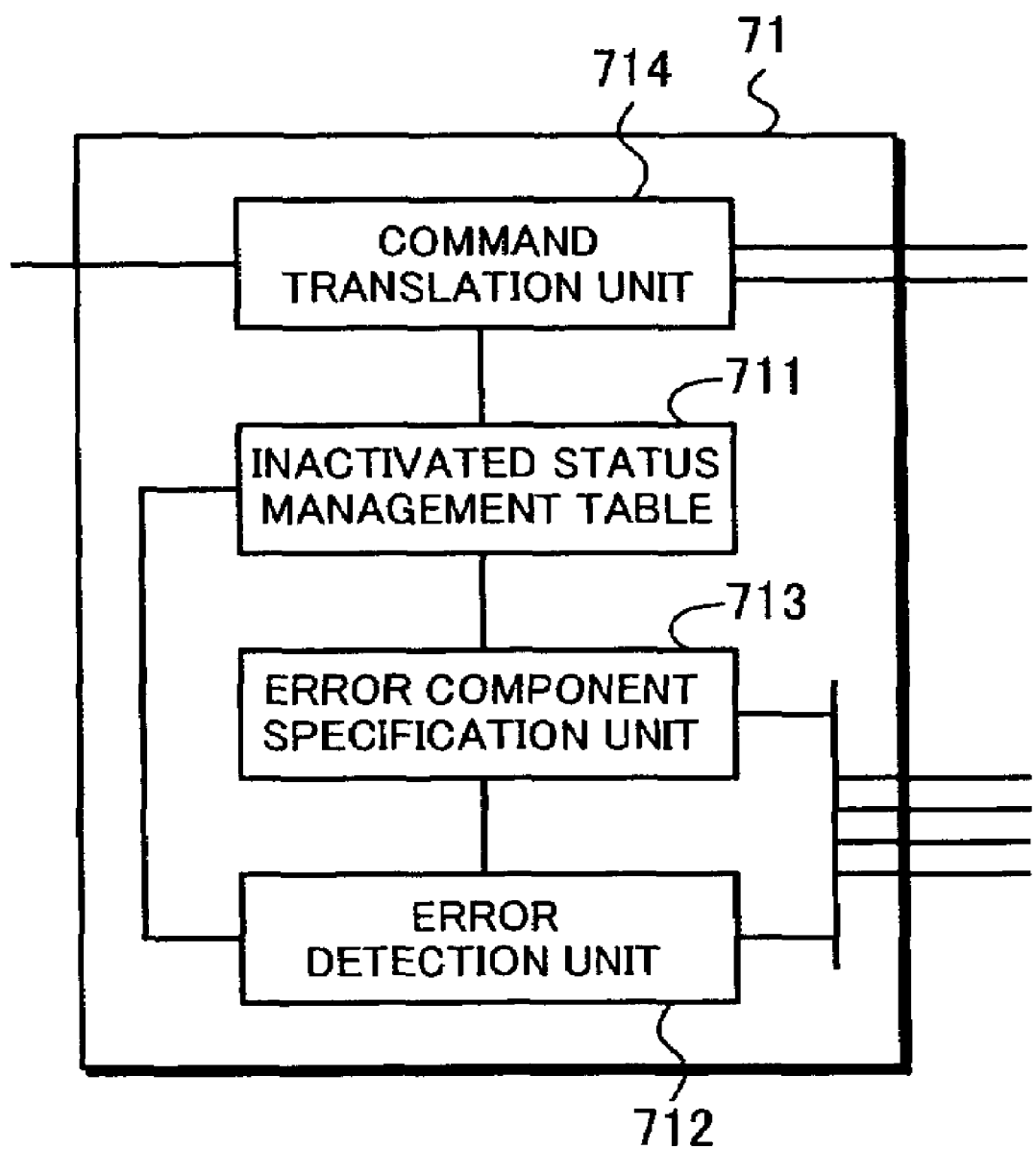
FIG. 22 is a diagram showing the configuration of a memory controller of the cache memory unit according to an embodiment of the present invention.

FIG. 22 is a diagram showing the configuration of the memory controller 71 in the cache memory unit 7 according to an embodiment of the present invention. As shown in FIG. 22, the memory controller 71 comprises a inactivated component management table 711, an error detection unit 712, a failed component specification unit 713, and a command translation unit 714.

The inactivated component management table 711 is a table for managing the inactivated status of the respective memory modules 72 in the cache memory unit 7, and manages whether access to the memory module 72 is permitted.

Figure 23:
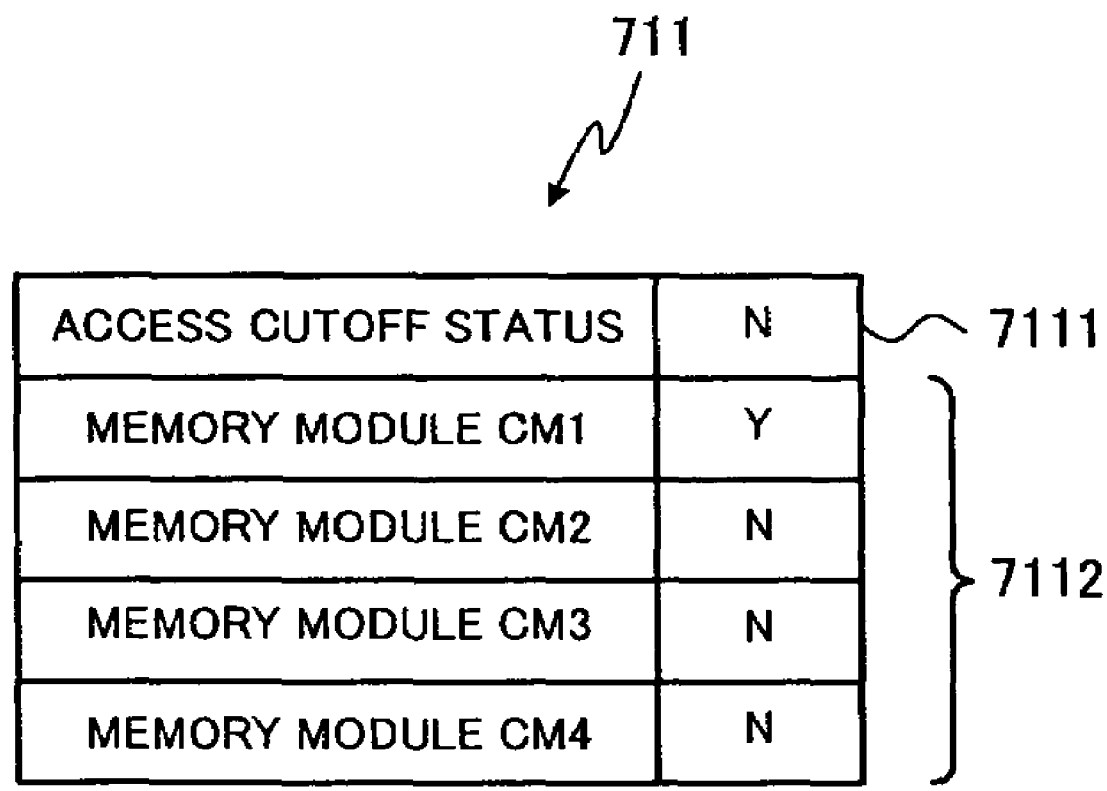
FIG. 23 is a diagram showing an example of an inactivated component management table of the cache memory unit according to an embodiment of the present invention.

FIG. 23 is a diagram showing an example of the inactivated component management table 711 of the cache memory unit 7 according to an embodiment of the present invention. As shown in FIG. 23, the blockage management table 711 includes an access cutoff status entry 7111 and a plurality of inactivated component entries 7112.

The cutoff status entry 7111 shows whether access to the memory module 72 is permitted. The cutoff status entry 7111 shows "Y" when the occurrence of an error was detected but it has not been specified as to which component was subject to the error. The inactivated component entry 7112 shows "Y"

when an error occurs in the respective memory modules 72 or the memory bus 73 connected thereto.

Returning to FIG. 22, the error detection unit 712 detects an error that occurred in the cache memory unit 7, and immediately sets "Y" in the access cutoff status entry 7111 of the inactivated component management table 711.

The failed component specification unit 713 is activated when the error detection unit 712 detects an error. The failed component specification unit 713 performs polling to the control signal line 714, diagnoses the status of the respective memory modules 72, and thereby specifies the failed component. Further, the failed component specification unit 713 performs inactivation processing so the specified failed component will not be used.

The command conversion unit 714 receives a command and user data from another unit in the storage system 1, and controls the access to the memory module 72 according to the access cutoff status entry 7111 of the inactivated component management table 711.

Figure 24:
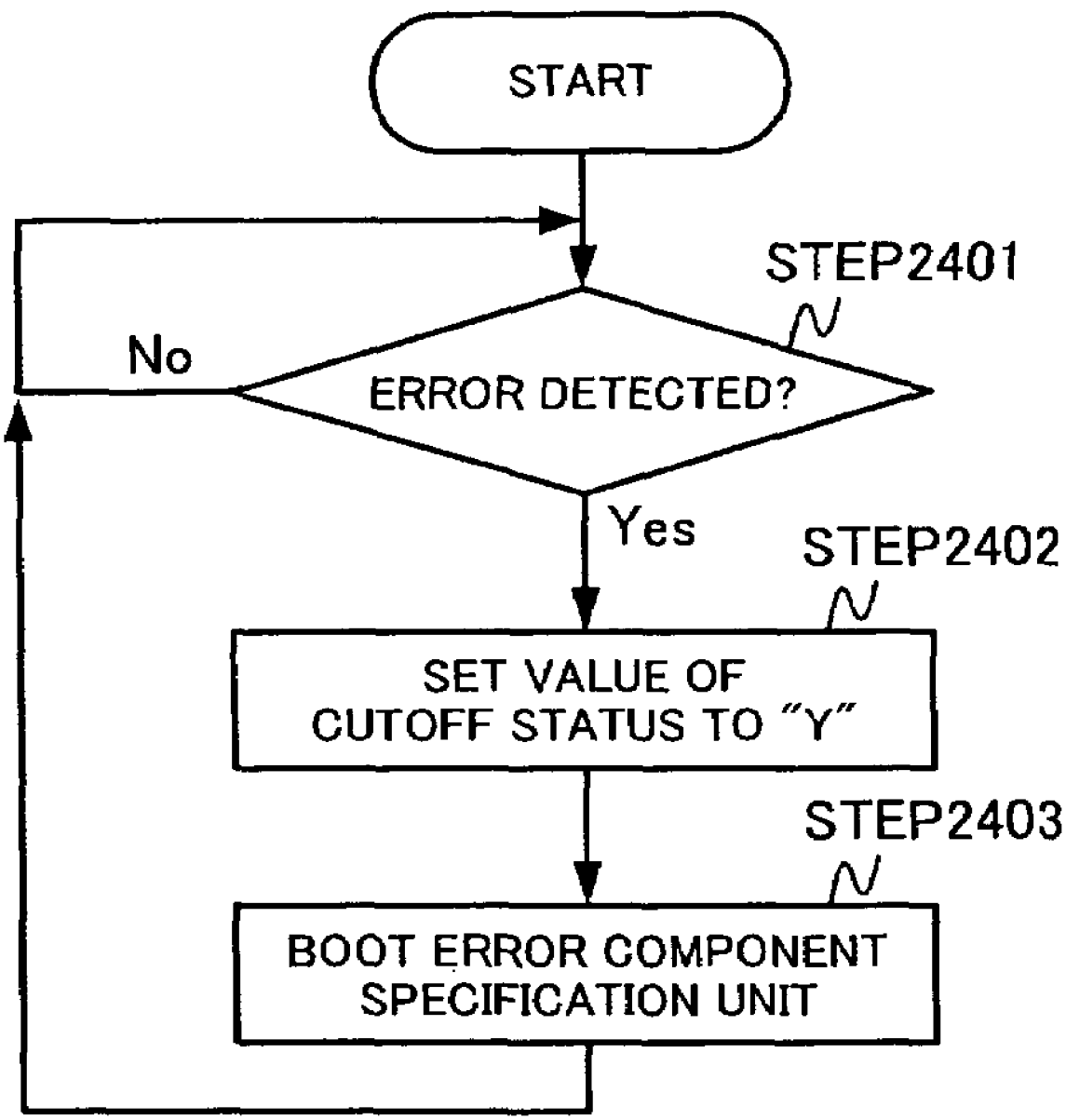
FIG. 24 is a flowchart explaining the operation of an error detection unit of the cache memory unit according to an embodiment of the present invention.

FIG. 24 is a flowchart explaining the operation of the error detection unit 712 in the cache memory unit 7 according to an embodiment of the present invention.

Specifically, the error detection unit 712 is monitoring the occurrence of an error in the cache memory unit 7 (STEP 2401). When the error detection unit 712 detects an error (STEP 2401; Yes), it sets the access cutoff status of the inactivated component management table 711 to "Y" (S2402). Subsequently, the error detection unit 712 boots the failed component specification unit 713 in order to specify the failed component (STEP 2403).

Accordingly, access to the memory module 72 is restricted until the failed component specification unit 713 specifies the failed component.

Figure 25:
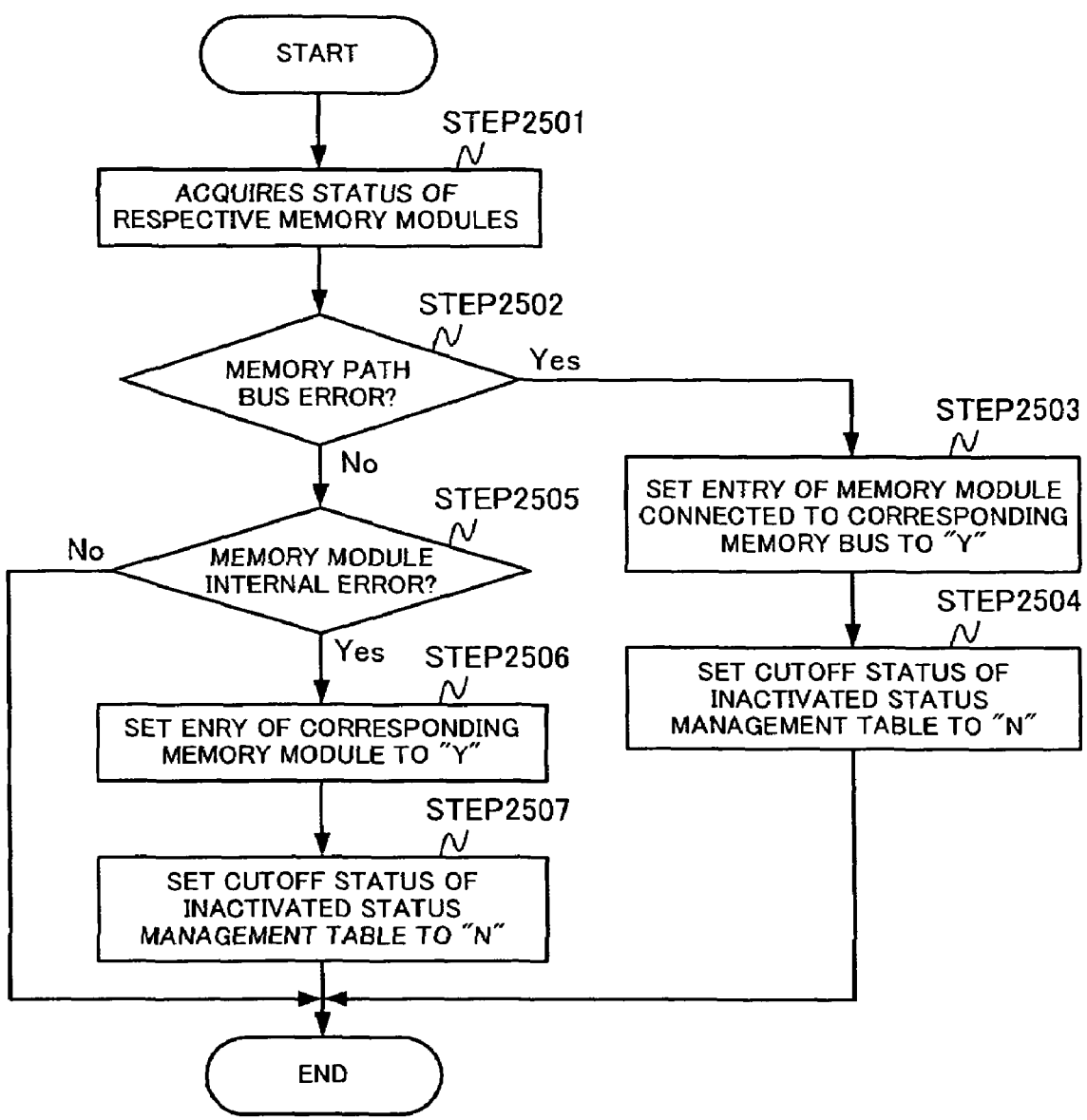
FIG. 25 is a flowchart explaining the operation of a failed component specification unit of the cache memory unit according to an embodiment of the present invention.

FIG. 25 is a flowchart explaining the operation of the failed component specification unit 713 in the cache memory unit 7 according to an embodiment of the present invention.

Specifically, as shown in FIG. 25, the failed component specification unit 713 foremost uses the control signal line 74 to acquire the status of the respective memory modules 72 (STEP 2501). When it is consequently determined that the error (error) is not in the memory bus 73 (STEP 2502; Yes), the failed component specification unit 713 sets "Y" in the entry of the memory module 72 connected to the memory bus 73 in the inactivated component management table 711 (STEP 2503). Subsequently, the failed component specification unit 713 sets "N" in the access cutoff status entry 7111 of the inactivated component management table 711 (STEP 2504), and then ends this processing.

When it is determined that the error is not in the memory bus 73 at STEP 2502, the failed component specification unit 713 determines the error is in the memory module 72 (STEP 2505). When it is determined that the error is in the memory module 72, the failed component specification unit 713 sets "Y" in the entry of the memory module 72 in the inactivated component management table 711 (STEP 2506). Subsequently, the failed component specification unit 713 sets "N" in the cutoff status entry 7111 of the inactivated component management table 711 (STEP 2507), and then ends this processing.

One the other hand, when it is determined that the error is not in the memory module 80 at STEP 2505, since this means that the failed component could not be specified, this processing is ended directly without canceling the access cutoff.

By way of this, when a error occurs in the cache memory unit 7, it is possible to cut off access to the memory module 72 that could cause a malfunction until the failed component is specified. Further, after the failed component is specified, only the normal memory module 72 will be used.

Figure 26:
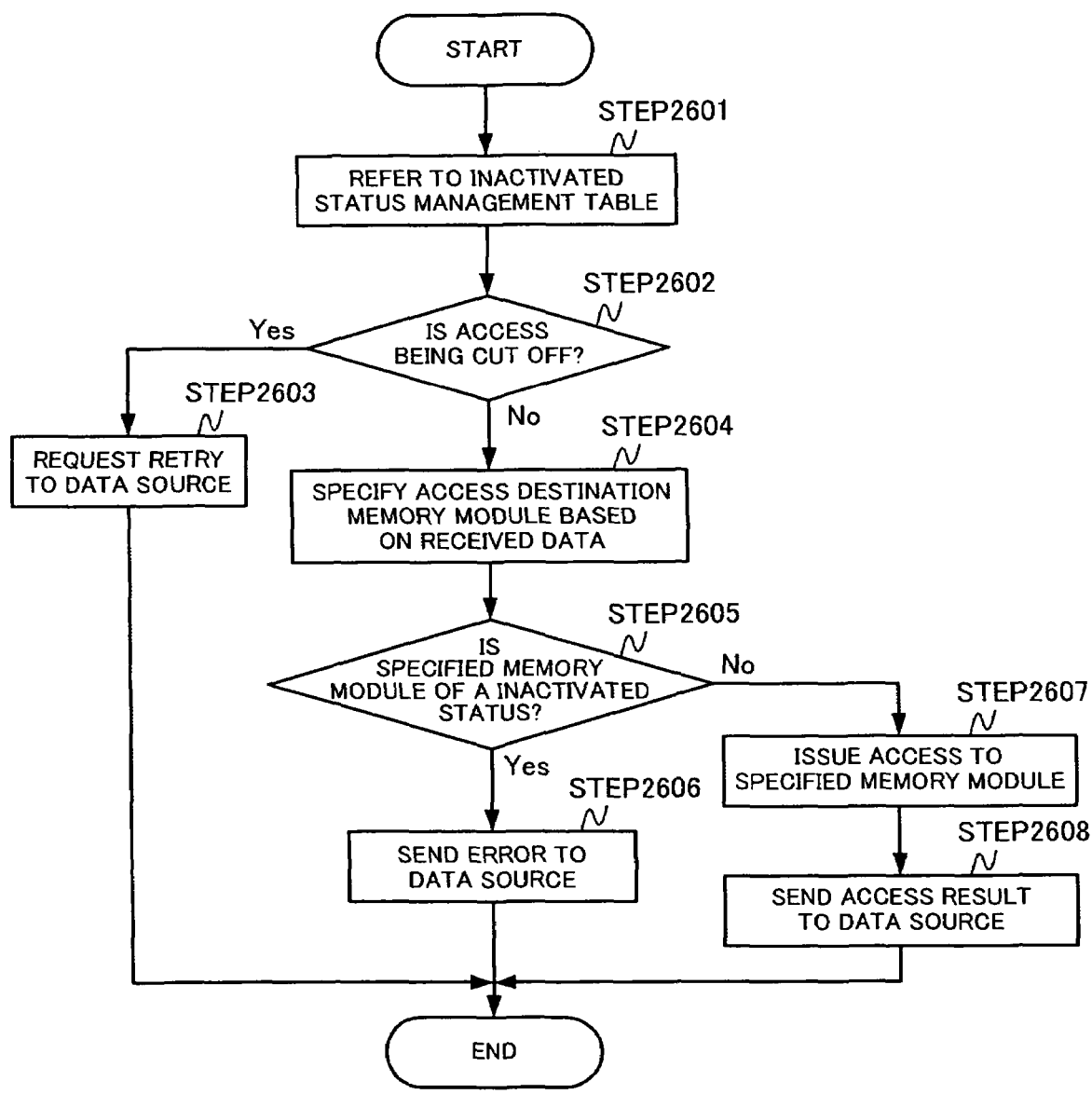
FIG. 26 is a flowchart explaining the operation of a command conversion unit of the cache memory unit according to an embodiment of the present invention.

FIG. 26 is a flowchart explaining the operation of the command conversion unit 714 in the cache memory unit 7 according to an embodiment of the present invention.

As shown in FIG. 26, when the command conversion unit 714 receives a command and user data, it refers to the inactivated component management table 711 (STEP 2601), and determines whether access is being cut off (STEP 2602). Specifically, the command conversion unit 714 determines whether the cutoff status entry 7111 of the inactivated component management table 711 is "Y."

If access is being cut off, the command conversion unit 714 requests retry to the data source (STEP 2603), and then ends this processing.

When it is determined that access is not being cut off, the command conversion unit 714 specifies the memory module 72 of the access destination based on the received command and user data (STEP 2604). Subsequently, the command conversion unit 714 refers to the inactivated component management table 711, and determines whether the specified memory module 72 is of a inactivated status (STEP 2605).

When it is determined that the specified memory module 72 is of a inactivated status (STEP 2605; Yes), the command conversion unit 714 sends an error status to the data source (STEP 2606), and then ends this processing.

Contrarily, when it is determined that the specified memory module 72 is not of a inactivated status (STEP 2605; No), the command conversion unit 714 accesses the specified memory module 72 (STEP 2607), and sends the result to the data source (STEP 2608).

Thus, the cache memory unit 7 can appropriately respond to the data source unit according to the access cutoff status.

As discussed above, when an error occurs in the cache memory unit 7, it is possible to cut off access to the memory module 72 that could cause a malfunction until the failed component is specified. Further, after the failed component is specified, only the normal memory module 72 will be used. Accordingly, the reliability and availability of the data storage service of the storage system 1 can be improved.

As is apparent from this embodiment, not only can the present invention be applied to the error handling of the controller 2 in the storage system 1, for instance, it can also be applied to the cache memory unit 7. Similarly, the present invention can also be applied to the host I/F unit 4 and the disk I/F unit 6.

Third Embodiment

This embodiment the failover/failback mechanism of the controller 2 having a mirrored configuration. Specifically, this embodiment explains the mechanism where, when a error occurs in the one of the controllers 2, another controller 2 takes over the processing during the error handling of such failed controller 2, and the processing taken over by the other controller 2 is returned to the controller 2 when the error handling is complete.

Figure 27:
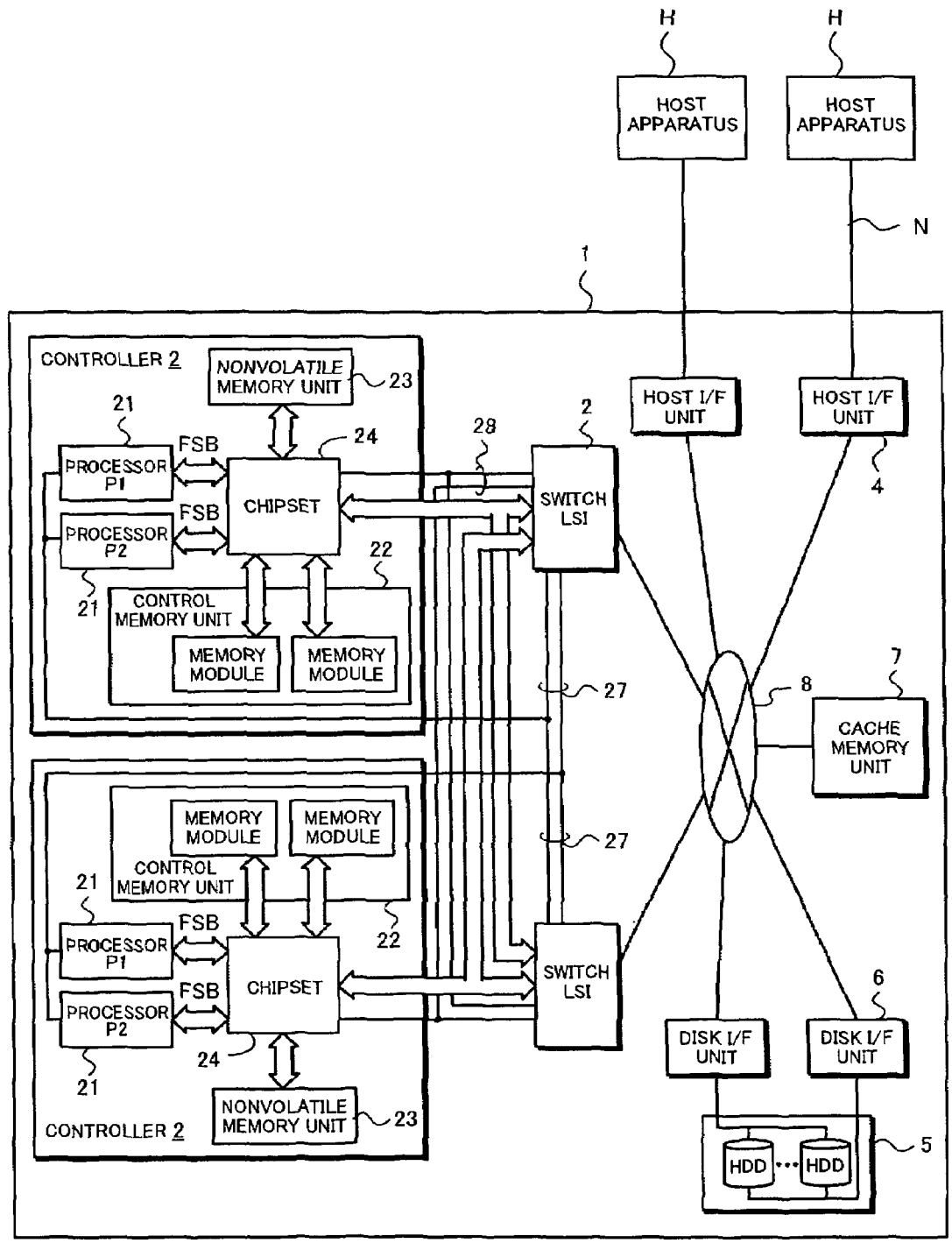
FIG. 27 is a diagram showing the configuration of the storage system according to an embodiment of the present invention.

FIG. 27 is a diagram showing the configuration of the storage system 1 according to an embodiment of the present invention. The storage system 1 shown in FIG. 27 is adopting a mirrored configuration, and, therefore, the controller 2, the switch LSI 3, the host interface (I/F) unit 4, the disk interface (I/F) unit 6, and the cache memory unit 7 are respectively provided in a plurality.

The basic configuration of the controller 2 in this embodiment is the same as the foregoing embodiment. However, since a mirrored configuration is adopted, the address/data signal line 26 of the respective controllers 2 is connected to each of the plurality of switches LSI 3. Further, the first signal line 27 and the second signal line 28 are also respectively connected to the plurality of switches LSI 3. In this embodiment, assume that the controllers 2A and 2B are provided.

Figure 28:
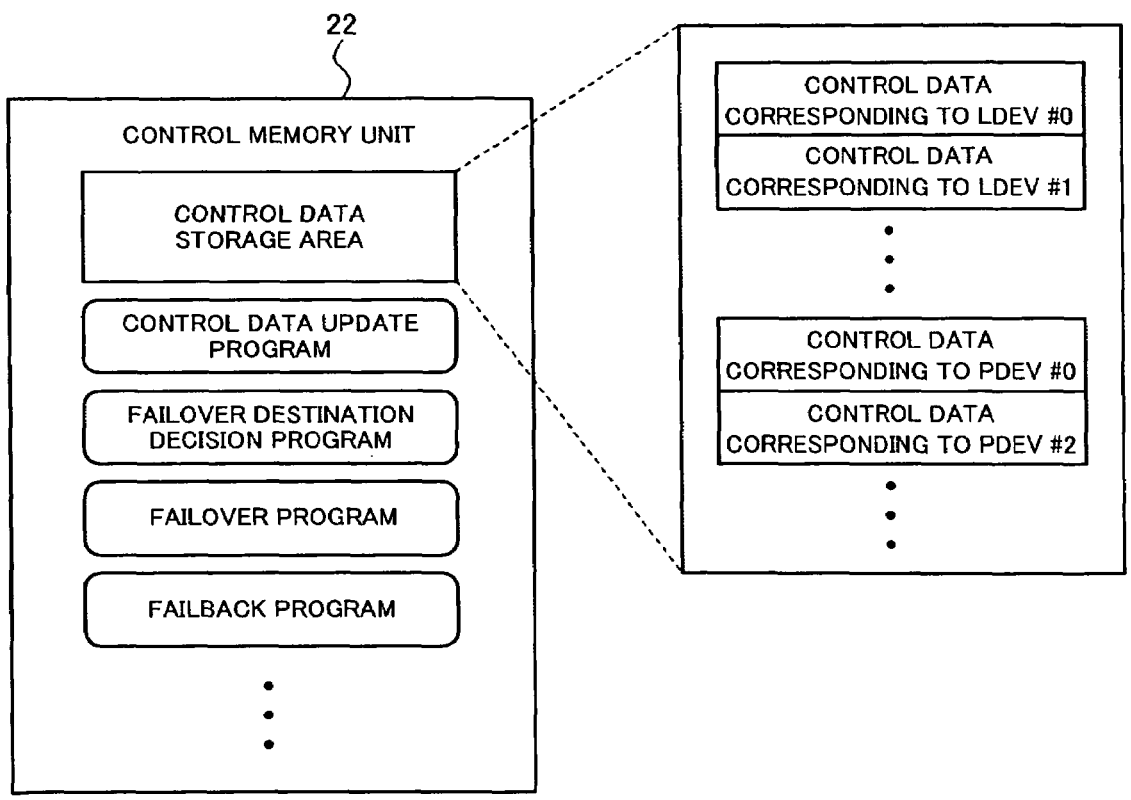
FIG. 28 is a diagram explaining the contents of the control memory unit of the controller according to an embodiment of the present invention.

FIG. 28 is a diagram explaining the contents of the control memory unit 22 in the controller 2 according to an embodiment of the present invention.

The control memory unit 22 has a control data storage area for storing the control data as management information required for the storage system 1 to provide the data storage service.

The control data storage area stores cache directory information for associating user data and the storage location in the cache memory unit 7 in relation to the logical devices and physical devices handled by the controller 2 itself, and the I/O request from the host apparatus H or the progress of processing of the disk array unit 5 in response to such I/O request. The controller 2, as described later, updates the control data, and updates the control data backed up (copied) in the cache memory unit 7.

The logical device (logical volume) is a logical device to be recognized by the host apparatus H. Further, the physical device (physical volume) is a physical device such as a hard disk drive. Although not shown, the logical device and the physical device in the disk array unit 7, for instance, are associated in the logical device/physical device allocation table, and, by referring to this table, the controller 2 is able to convert the address in the logical device designated by the I/O request into an address in the physical device. The logical device and the physical device are sometimes collectively referred to as "volumes" in the ensuing explanation.

In this embodiment, the control memory unit 22 has a program storage area for storing various programs. The program storage area stores a control data update rogram to be called upon the I/O processing program operated by the processor 21 updating the control data, a failover destination decision program for deciding the failover destination when a error occurs in the controller 2, a failover program for performing a failover, and a failback program for performing a failback. Details regarding the processing of these programs will be described later.

Figure 29:
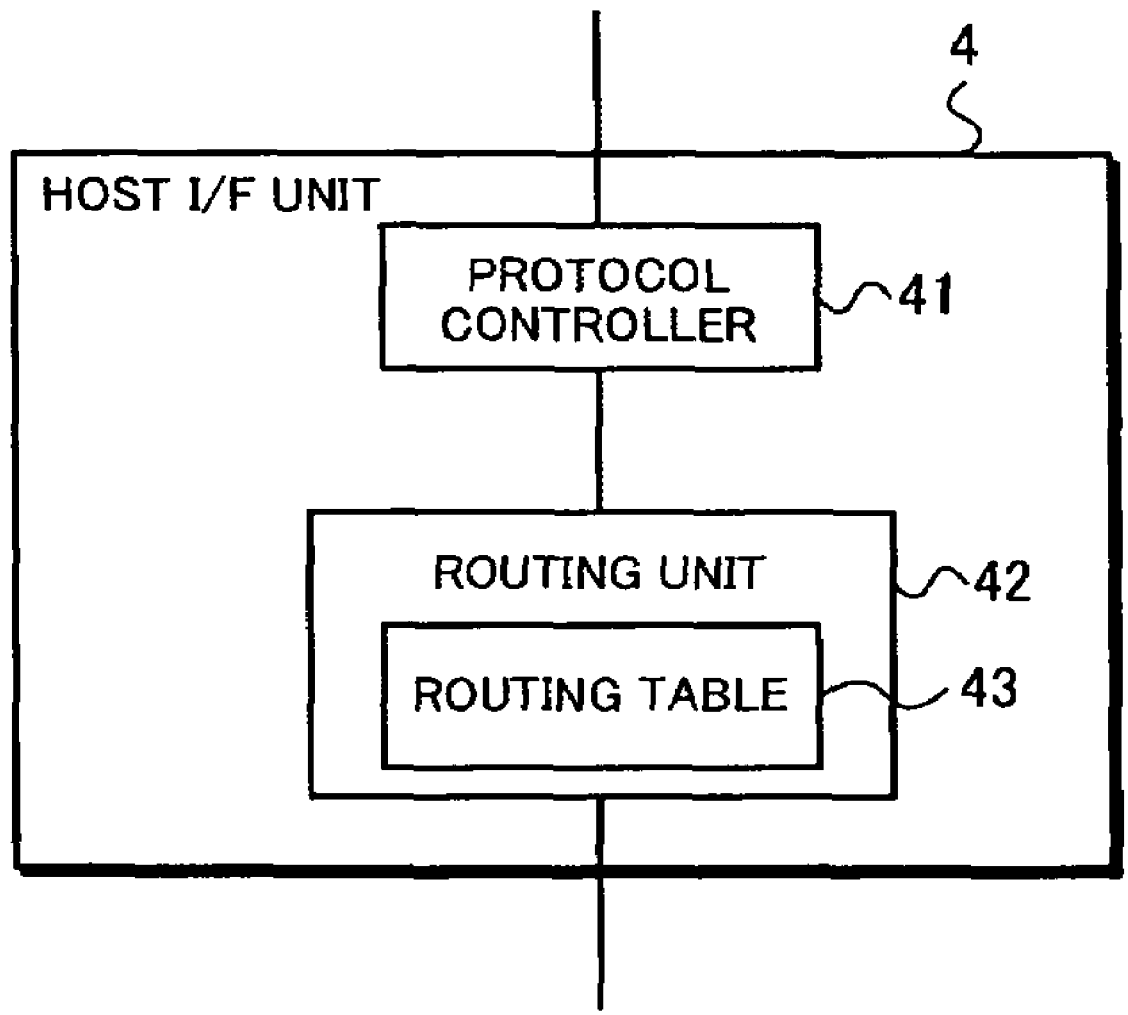
FIG. 29 is a diagram showing the configuration of a host I/F unit of the storage system according to an embodiment of the present invention.

FIG. 29 is a diagram showing the configuration of the host I/F unit 4 of the storage system 1 according to an embodiment of the present invention. As shown in FIG. 29, the host I/F unit 4 includes a protocol controller 41, a routing unit 42, and a routing table 43.

The protocol controller 41 is connected to the host apparatus H via the network N connected to a port not shown. The protocol controller 41 performs protocol conversion of data to be exchanged between the host apparatus H and the storage system 1. In other words, the protocol controller 41 converts the I/O request as external data from the host apparatus H sent via the network N into internal data to be processed in the storage system 1, and converts the internal data to be sent to the host apparatus H in response to the I/O request into external data suitable for transmission over the network N.

The routing unit 42 transfers the I/O request from the host apparatus H protocol-translated by the protocol controller 41 to the appropriate controller 2 according to the routing table 43.

The routing table 43, for instance, is a table associating the logical device number, and the controller identifier for identifying the controller 2. Accordingly, the routing unit 42 sorts the control data based on the I/O request to the controller 2 in charge of accessing the logical device according to the logical device number designated in the I/O request.

Figure 30:
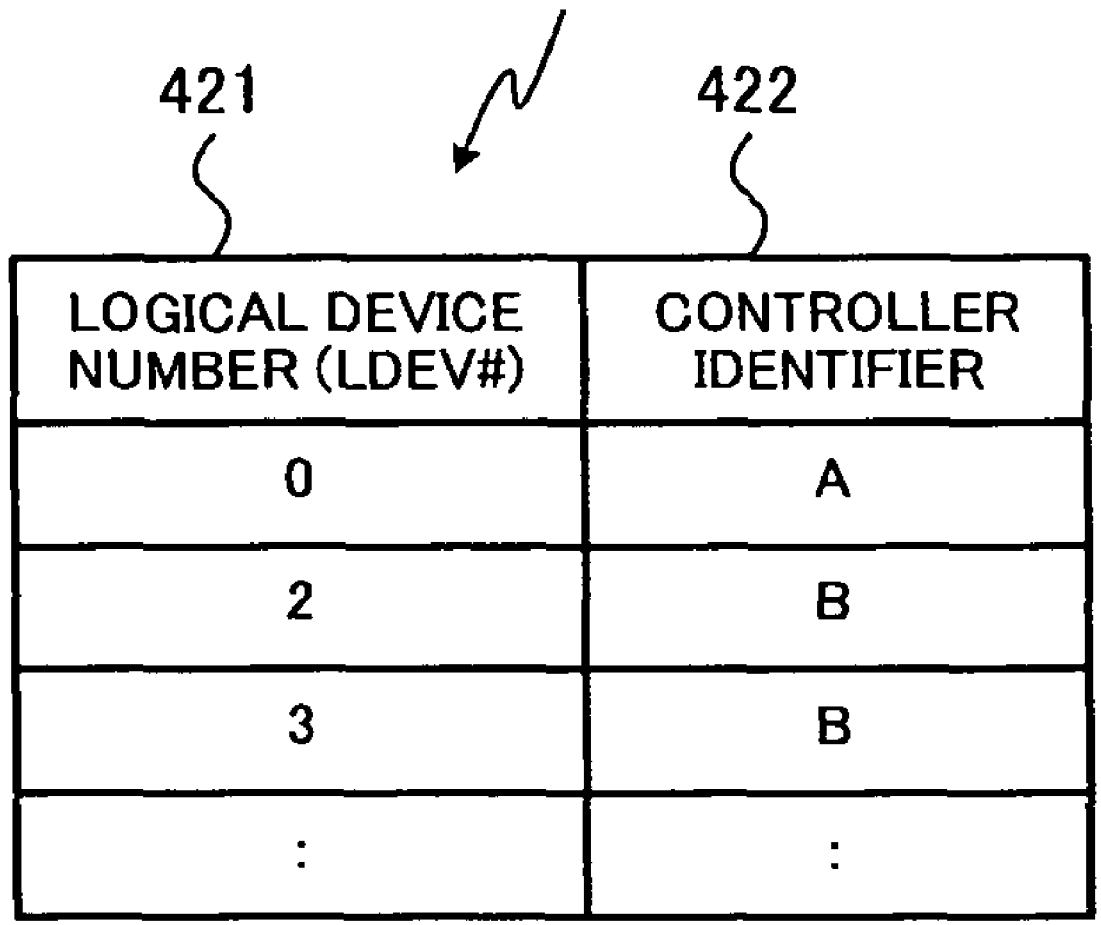
FIG. 30 is a diagram showing an example of a routing table of the host I/F unit according to an embodiment of the present invention.

FIG. 30 is a diagram showing an example of the routing table of the host I/F unit 4 in the storage system 1 according to an embodiment of the present invention.

The routing table 42 of the host I/F unit 4 has a table structure associating the logical device number (LDEV#) 421 for identifying the logical device to be recognized by the host apparatus H, and the controller identifier 422 for identifying the controller 2 in charge of performing the I/O processing to the logical device.

Figure 31:
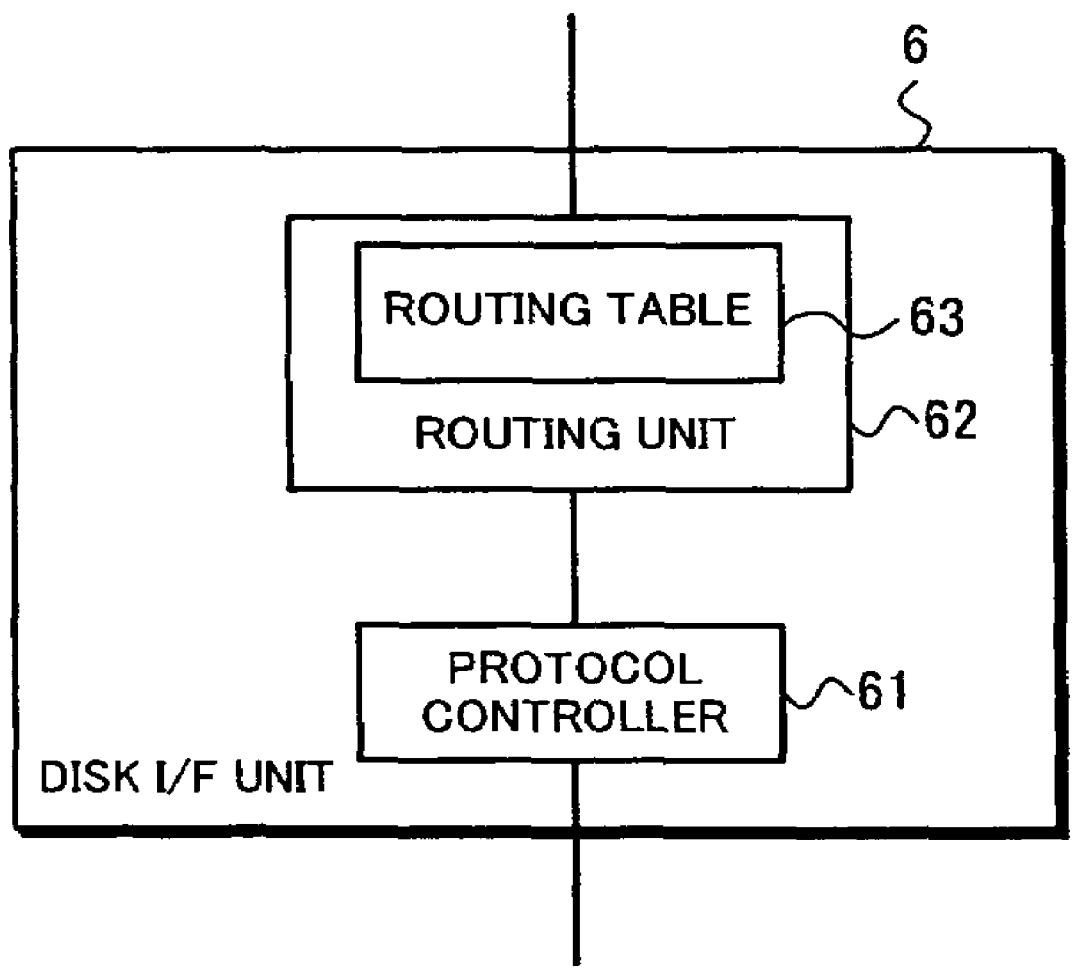
FIG. 31 is a diagram showing the configuration of a disk I/F unit of the storage system according to an embodiment of the present invention.

FIG. 31 is a diagram showing the configuration of the disk I/F unit 6 according to an embodiment of the present invention. The disk I/F unit 6 is configured the same as the host I/F unit 4 in that it performs protocol conversion of data to be exchanged between the devices.

Specifically, the protocol controller 61 is connected to the disk array unit 5 via a channel connected to a port now shown, and performs protocol conversion of data to be exchanged between the other units in the storage system 1 and the disk array unit 5.

The routing unit 62 transfers the control data read from the disk array unit 5 and associated with user data subject to protocol translation by the protocol controller 61 to the appropriate controller according to the routing table 63.

Figure 32:
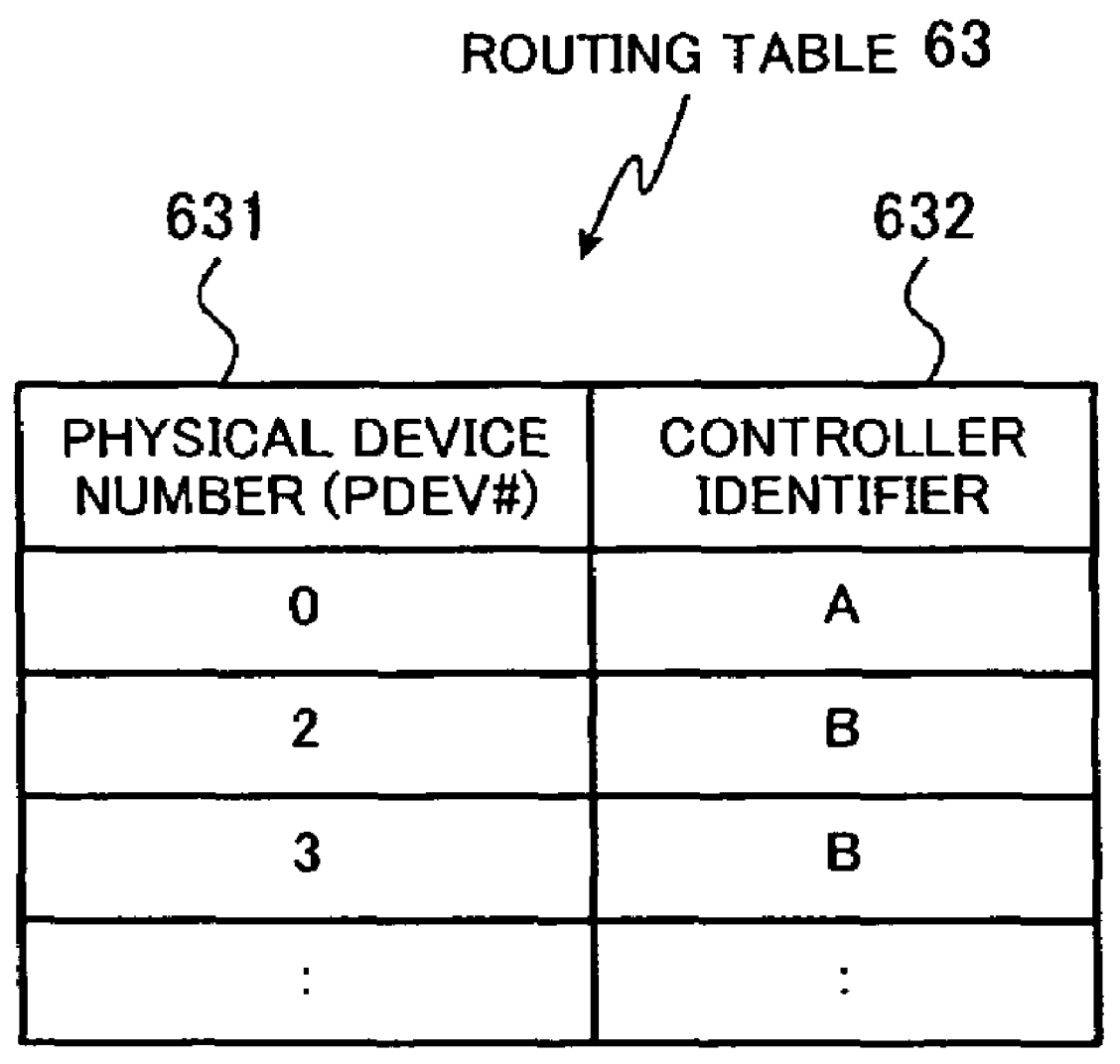

FIG. 32 is a diagram showing an example of the routing table 63 of the disk I/F unit 6 according to an embodiment of the present invention.

The routing table 63 of the disk I/F unit 6 has a table structure associating the physical device number (PDEV#) for identifying the physical device of the disk array unit 7, and the controller identifier 622 for identifying the controller 2 in charge of performing the I/O processing to the physical device.

Figure 33:
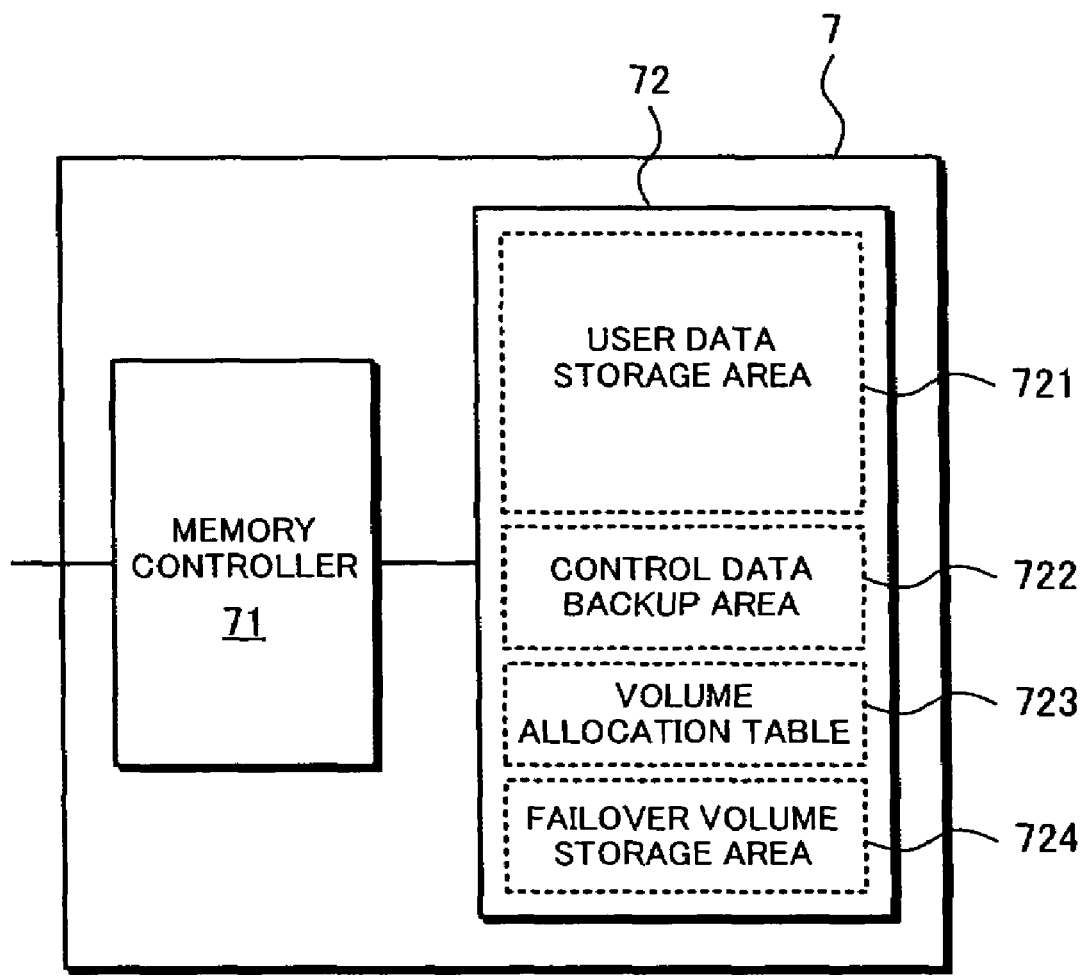
FIG. 33 is a diagram showing the configuration of the cache memory unit of the storage system according to an embodiment of the present invention.

FIG. 33 is a diagram showing the configuration of the cache memory unit 7 in the storage system according to an embodiment of the present invention.

As shown in FIG. 33, the cache memory unit 7 includes a memory controller 71, and a memory module 72. The memory controller 71 receives an access request from another unit in the storage system 1, and performs control for accessing the memory module 72. The memory module 72, as shown in FIG. 21, may be configured from a plurality of memory modules, but they are shown as a single, consecutive storage space in this example. The storage space of the memory module 72 includes a user data storage area 721 for storing user data accompanying the I/O request, a control data backup area 722 for backing up the control data to be handled in the controller 2, a volume allocation table 723 for managing the controller 2 in charge of the volume as a logical device or a physical device, and a failover storage area 724 for storing information concerning from which controller 2 to which controller 2 the volume was failed over.

Figure 34:
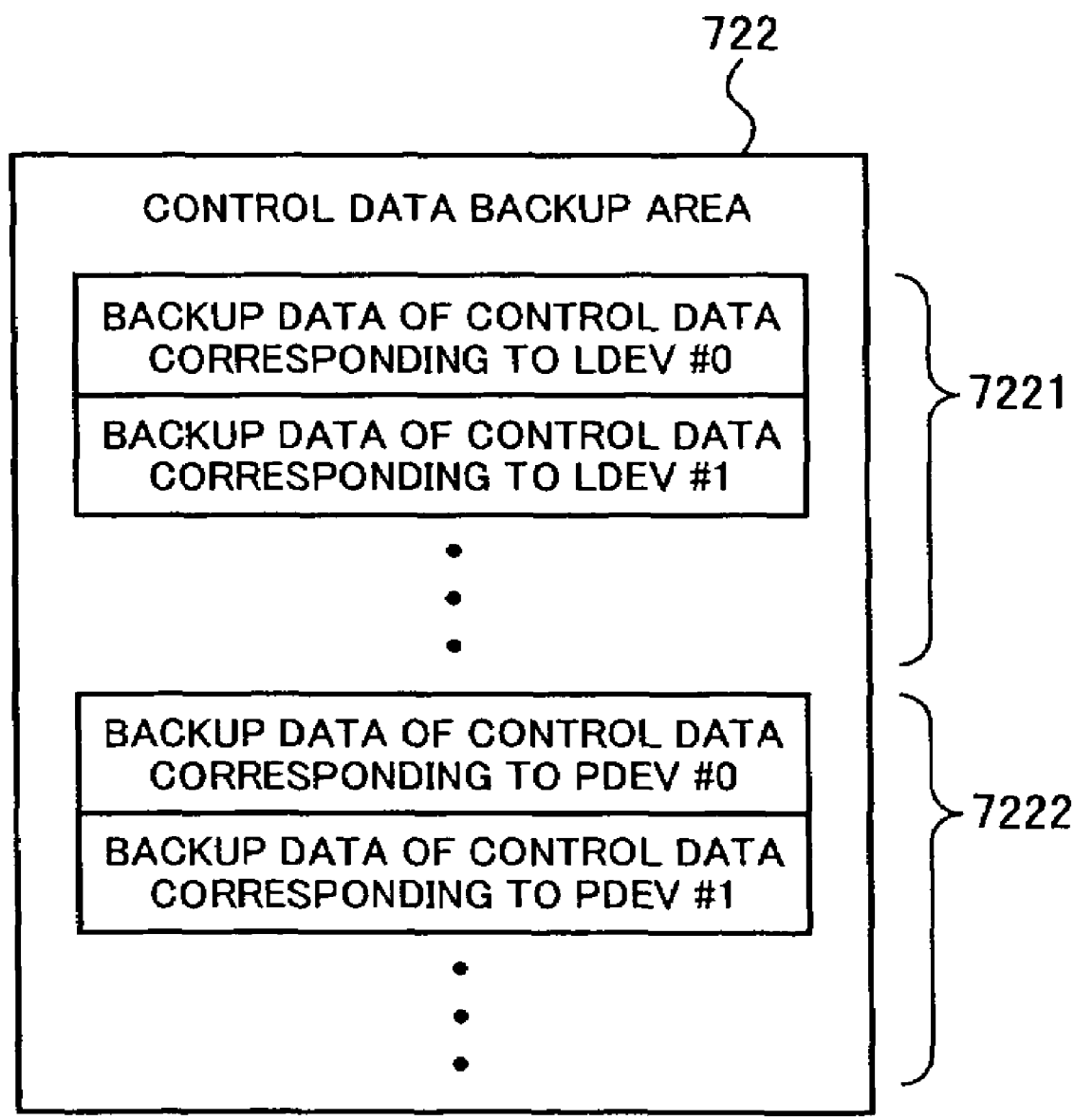
FIG. 34 is a diagram explaining the contents of a control data backup area of the cache memory unit according to an embodiment of the present invention.

FIG. 34 is a diagram explaining the contents of the control data backup area 722 in the cache memory unit 7 according to an embodiment of the present invention.

The control data backup area 722 includes a backup area 7221 for each logical device, and a backup area 7222 for each physical device to be used in the exchange of data with the disk array unit 5. The respective areas 7221 and 7222 store cache directory information associating the user data and the storage location in the cache memory unit 7, and the I/O request from the host apparatus H or the progress of processing of the disk array unit 5 in response to such I/O request.

FIG. 35 is a diagram explaining the contents of the volume allocation table 723 in the cache memory unit 7 according to an embodiment of the present invention.

The volume allocation table 723 is a table for defining in advance which controller 2 will handle which volume (logical device and physical device), and which controller 2 will take over the processing in the case of an error. The volume allocation table 723 has a table structure associating the volume number 7231, the controller identifier 7232 of the controller 2 for managing the volume to be identified by the volume number 7231, and the controller identifier 7233 of the controller 2 to take over the processing in the case of a failover.

FIG. 36 is a diagram explaining the contents of the failover volume storage area 724 in the cache memory unit 7 according to an embodiment of the present invention.

The failover volume storage area 724 records information regarding the failover, which volume will be taken over by which controller 2 from which controller 2. The failover volume storage area 724 has a table structure associating, for each volume number (logical device number or physical device number) 7241, the controller identifier 7242 of the controller 2 of the failover source, and the controller identifier 7243 of the controller 2 of the failover destination.

The operation example in a case when an error occurs in the storage system 1 having the foregoing configuration of this embodiment is now explained.

Figure 37:
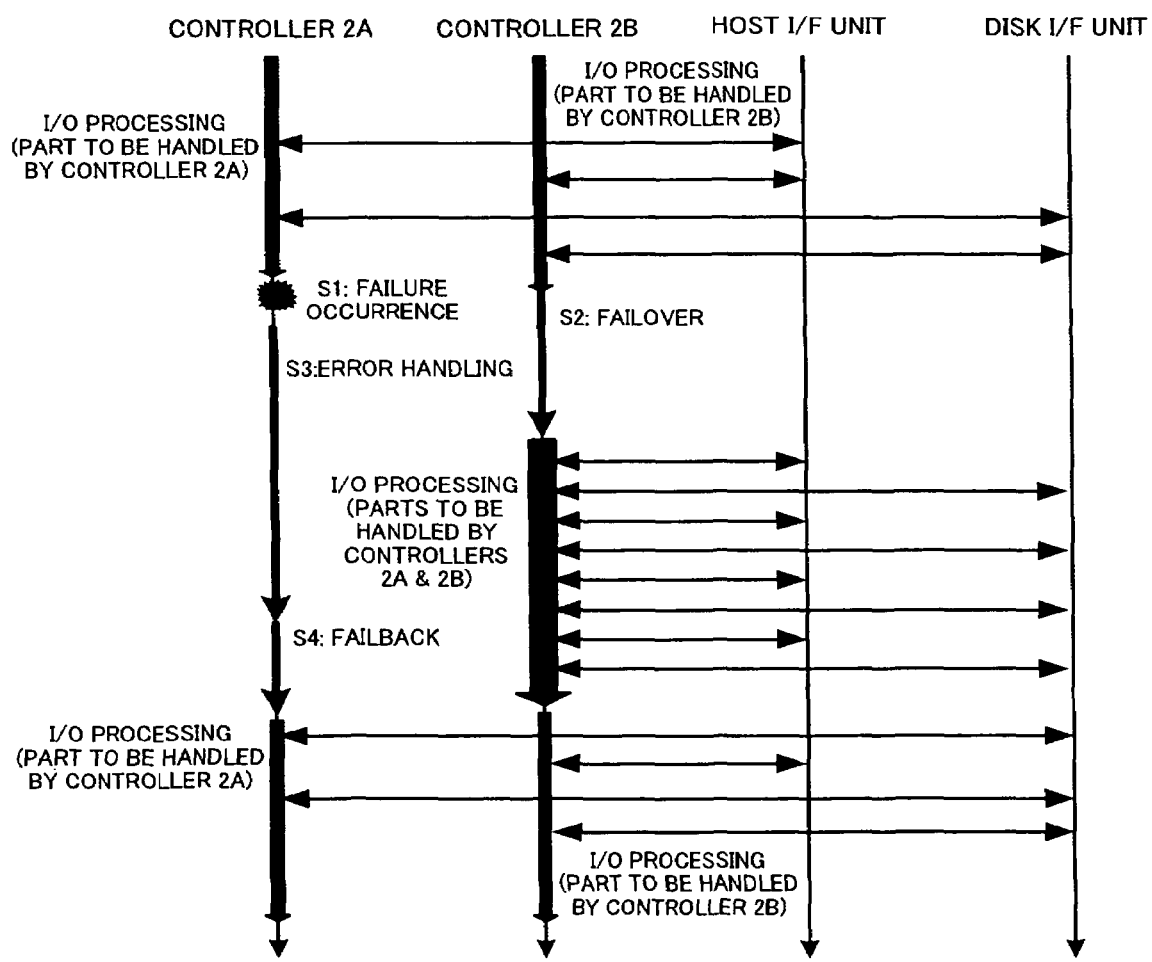
FIG. 37 is a sequence chart explaining the flow of processing when an error occurs in the storage system according to an embodiment of the present invention.

FIG. 37 is a sequence chart explaining the flow of processing when an error occurs in the storage system 1 according to an embodiment of the present invention. More specifically, FIG. 37 explains the flow of processing when an error occurs in either the controllers 2A or 2B having a mirrored configuration.

Each of the controllers 2A and 2B normally is in charge of performing I/O processing to a prescribed volume. In other words, the routing tables 43 and 63 of the host I/F unit 4 and the disk I/F unit 6 define the controller 2 that should transfer the I/O according to the logical device or the physical device designated in the I/O request.

Assume that an error just occurred in the controller 2A (S1). Thereby, although not shown, the switch LSIs 3A and 3B immediately cut off the I/O between the controller 2A and the other unit in the storage system 1 as described in the foregoing embodiment.

When the controller 2B receives an error occurrence notice via the switch LSI 3A or 3B, it performs failover processing for taking over the I/O processing that was being handled by the controller 2A (S2). Thus, the controller 2B that performed the failover processing will perform, in addition to the I/O processing to the volumes in its charge, the I/O processing to the volumes that were in the charge of the controller 2A.

Meanwhile, the controller 2A subject to an error performs error handling to determine whether it is able to continue operating (S3). When the controller 2A determines that it is able to continue operating, it performs failback processing after performing reset processing (S4). By way of this, the I/O processing that was taken over by the controller 2B is returned to the controller 2A, and the data storage service can be continued without interruption by using the two controllers 2A and 2B.

Figure 38:
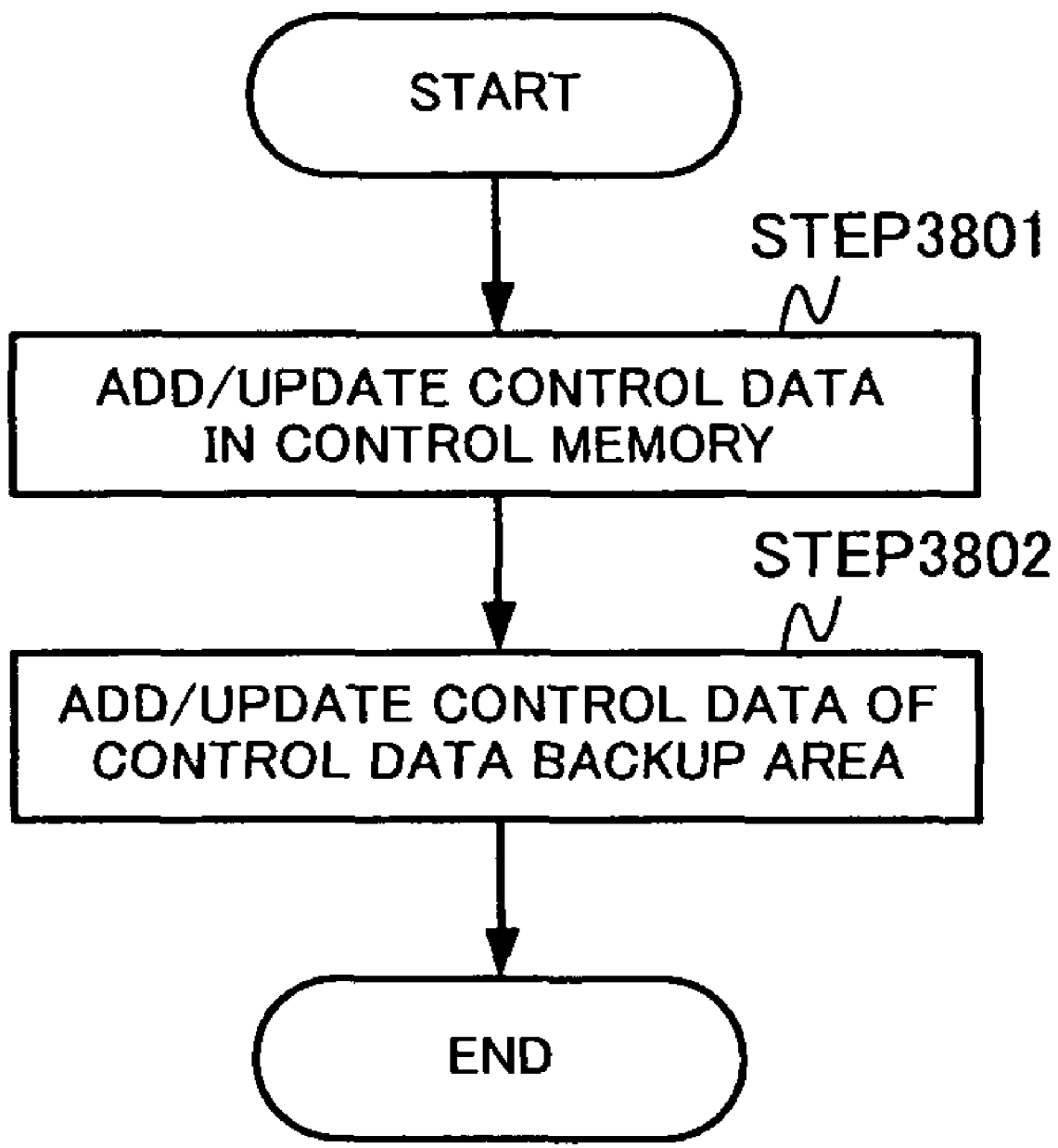
FIG. 38 is a flowchart explaining the operation of a control data update program in the controller according to an embodiment of the present invention.

FIG. 38 is a flowchart explaining the operation of the control data update program in the controller 2 according to an embodiment of the present invention. The control data update program is executed by the processor 21 (processor core 211) in the controller 2 pursuant to the I/O processing.

As shown in FIG. 38, the processor core 211 stores new control data in the control memory unit 22 pursuant to the I/O processing, or updates the control data already stored in the control memory unit 22 (STEP 3801). Subsequently, the processor core 211 adds or updates the control data in the control data backup area 722 of the cache memory unit 7 (STEP 3802).

Accordingly, the latest data stored in the control memory unit 22 will be backed up in the cache memory 81, and, even if an error occurs to any one of the controller 2s, the other controller 2 is able to take over the I/O processing of the failed controller 2.

Figure 39:
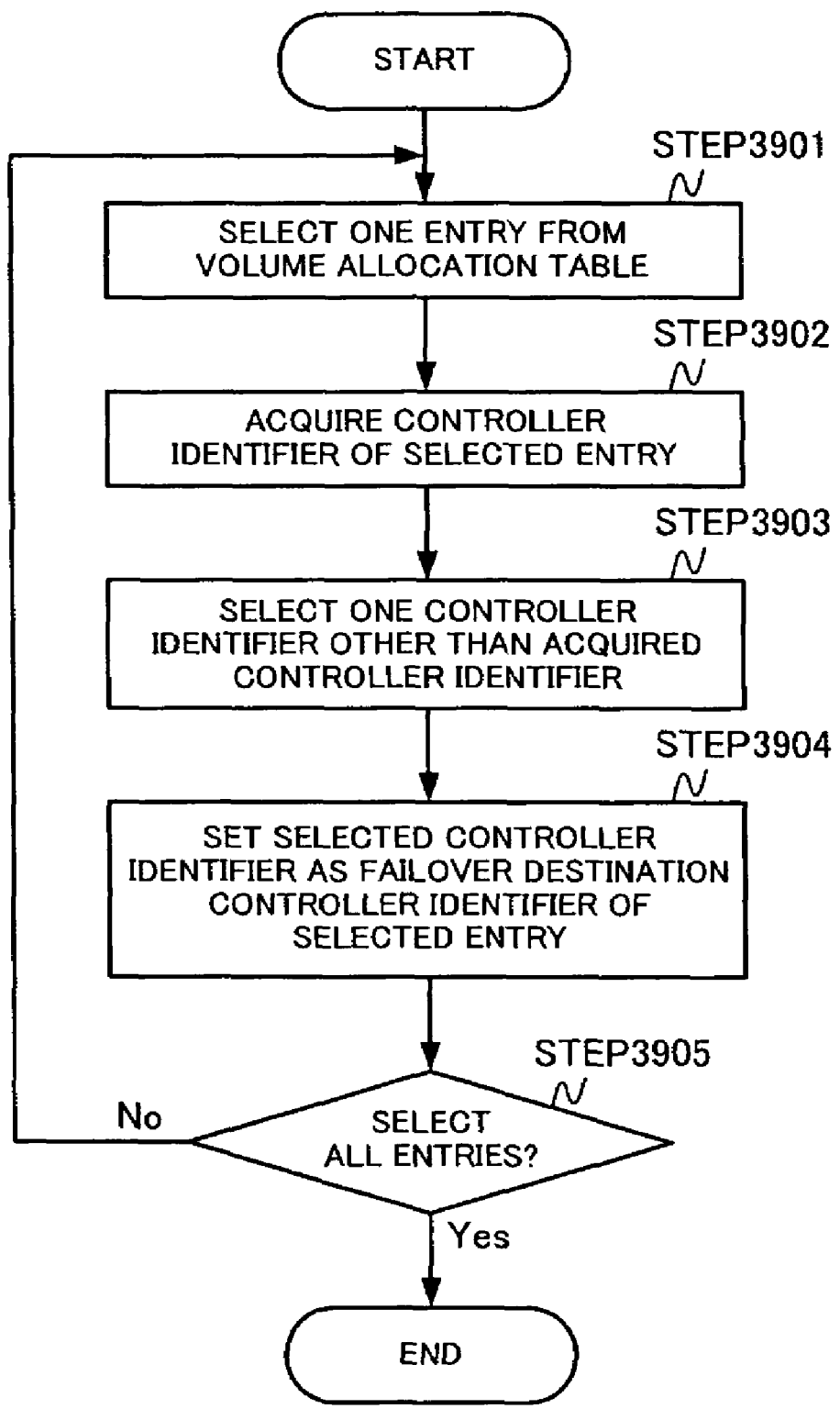
FIG. 39 is a flowchart explaining the operation of a failover destination decision program in the controller according to an embodiment of the present invention.

FIG. 39 is a flowchart explaining the flow of processing of the failover destination decision program in the controller 2 according to an embodiment of the present invention. The failover destination decision program is a program for performing processing to decide the controller 2 to take over the I/O processing based on the failover regarding each of the plurality of controllers 2 provided in the storage system 1, and, for example, is executed by the boot processor core 211 before the data storage service.

Referring to FIG. 39, the processor core 211 selects one entry from the volume allocation table 722 (STEP 3901), and acquires the controller identifier 7232 of the selected entry (STEP 3902). In the volume allocation table 722, the correspondence relation of the volume number 7231 and the controller identifier 7232 is created based on the routing table 43 of the host I/F unit 4 and the routing table 63 of the disk I/F unit 6.

Subsequently, the processor core 211 selects the controller identifier 7232 of the controller 2 provided in the storage system 1 other than the acquired controller identifier 7232 (STEP 3903). The controller identifier 7232 of all controllers 2 in the storage system 1, for instance, is retained as system configuration information in the control memory unit 6. Subsequently, the processor core 211 sets the selected controller identifier 7232 as the failover destination controller identifier 7233 of the selected entry (STEP 3904).

The processor core 211 determines whether all entries in the volume allocation table 722 have been selected for setting the controller identifier 7233 of the failover destination controller (STEP 3905), and repeats the foregoing processing until the processing of all entries is complete.

Accordingly, for instance, in a case when two controllers 2A and 2B are provided in the storage system 1 (controller identifiers are respectively "A" and "B"), the failover destination of the volume handled by the controller 2A will become the controller 2B, and the failover destination of the volume handled by the controller 2B will become controller 2A.

Figure 40:
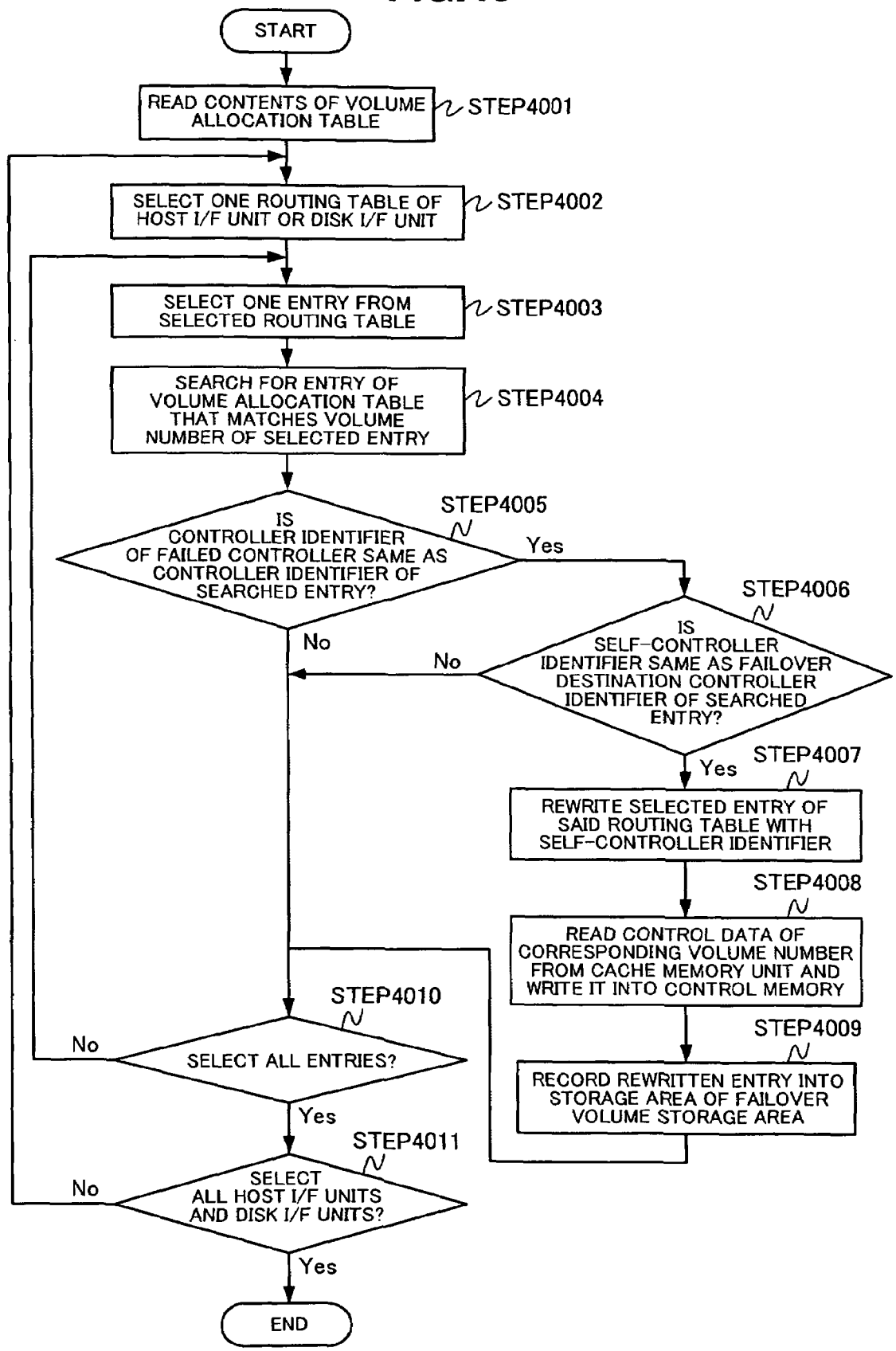
FIG. 40 is a flowchart explaining the flow of processing of a failover program in the controller according to an embodiment of the present invention.

FIG. 40 is a flowchart explaining the flow of processing of the failover program in the controller 2 according to an embodiment of the present invention. The failover program is used for the normal controller 2 to take over the I/O processing when an error occurs in one of the controllers 2, and is executed by the processor core 211 of a controller 2 other than the failed controller 2.

As shown in FIG. 40, the processor core 211 to execute the failover program foremost reads the volume allocation table 722 stored in the cache memory unit 7 (STEP 4001). Subsequently, the processor core 211 selects either the routing table 43 or 63 among all host I/F units 4 and all disk I/F units 6 in the storage system 1 (STEP 4002), and further selects one entry among the selected routing tables (STEP 4003).

The processor core 211 subsequently refers to the volume allocation table 722, and searches for an entry of the volume allocation table 722 in which the volume numbers (in other words, the logical device number 421 and the physical device number 631) of the selected entry coincide (STEP 4004).

Subsequently, the processor core 211 determines whether the controller identifier of the failed controller 2 and the controller identifier 7232 of the searched entry coincide (STEP 4005). This is in order to specify the volume being handled by the failed controller 2. When it is determined that the controller identifier of the failed controller 2 and the controller identifier 7232 of the searched entry do not coincide (STEP 4005; No), the processor core 211 returns to STEP 4003 in order to select an unprocessed entry (STEP 4010; No).

When it is determined that the controller identifier of the failed controller 2 and the controller identifier 7232 of the searched entry coincide (STEP 4005; Yes), the processor core 211 for determines whether the controller identifier of its controller 2 and the failover destination controller identifier 7233 of the searched entry coincide (STEP 4006). This is in order to determine whether its controller 2 is defined as a failover destination. When the processor core 211 is determined that the controller identifier of its controller 2 and the failover destination controller identifier 7233 of the searched entry do not coincide, the processor core 211 returns to STEP 4003 in order to select an unprocessed entry (STEP 4010; No).

When the processor core 211 is determined that the controller identifier of its controller 2 and the failover destination controller identifier 7233 of the searched entry coincide, the processor core 211 rewrites the entry selected in the routing table 43 or 63 with its own controller identifier (STEP 4007). Thereby, the I/O processing of the volume handled by the failed controller 2 will be sorted to its own controller 2. Subsequently, the processor core 211 reads the control data of the volume number of the selected entry from the cache memory unit 7 and writes it into its control memory unit 22 (STEP 4008).

Further, the processor core 211 records the contents of the entry of the rewritten routing table 43 or 63 in the failover volume storage area 724 of the cache memory unit 7 (STEP 4008).

The processor core 211 determines whether all entries of the selected routing table have been selected (STEP 4010). If there is an entry that has not been selected (STEP 4009; No), the processor core 211 repeats the foregoing processing until all entries are processed.

When the processor core 211 is determined that all entries of the selected routing table have been selected (STEP 4010; Yes), the processor core 211 determines whether all host I/F units 4a and disk I/F units 6 have been selected (STEP 4011). When the processor core 211 discovers an unselected host I/F unit 4 or disk I/F unit 6, it repeats the foregoing processing.

Figure 41:
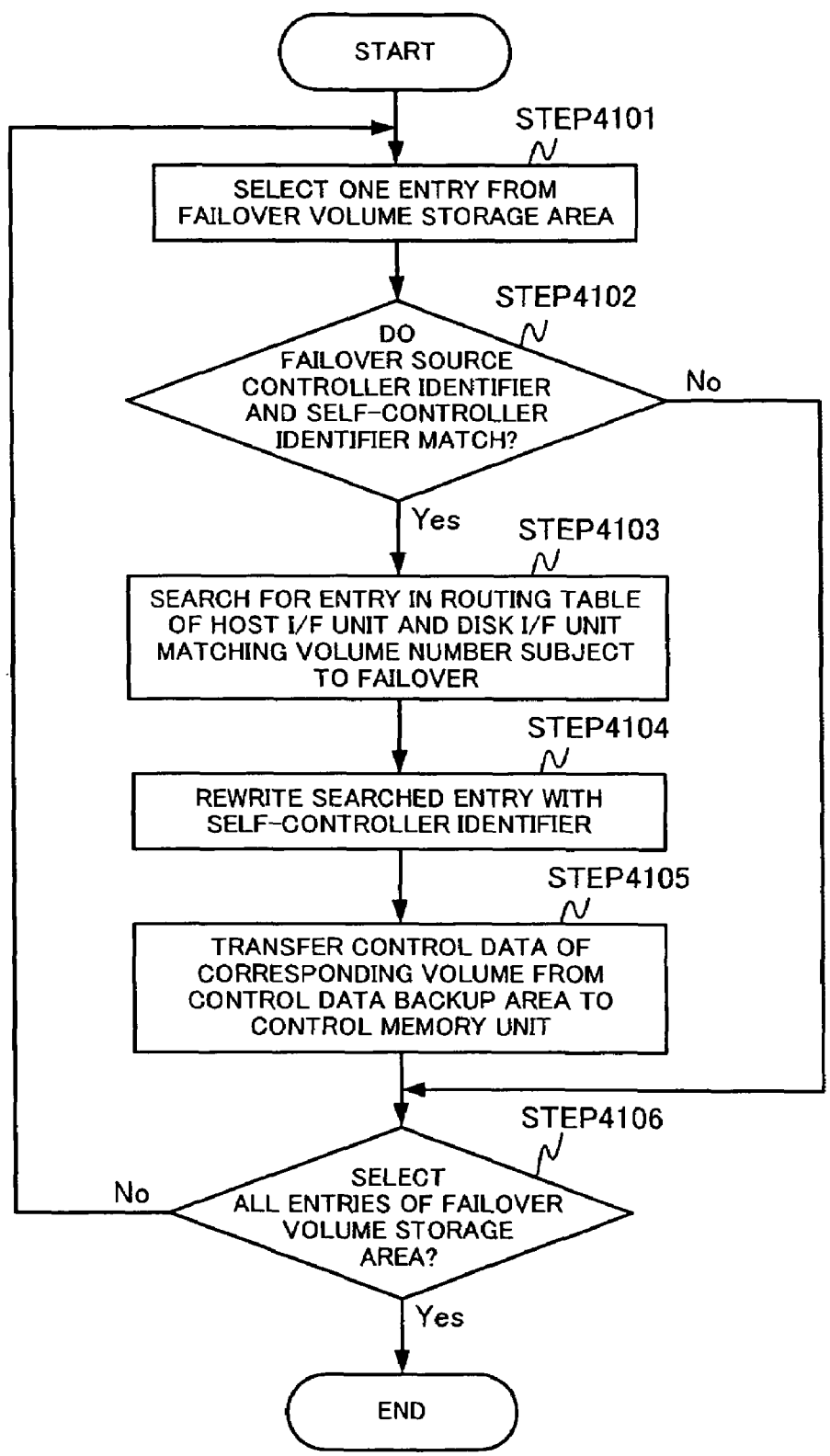
FIG. 41 is a flowchart explaining the flow of processing of a failback program in the controller according to an embodiment of the present invention.

FIG. 41 is a flowchart explaining the operation of the failback program in the controller 2 according to an embodiment of the present invention. The failback program is a program for performing the processing to enable the controller 2, which is able to continue operating as a result of the completion of error handling, take back the I/O processing from the other controller that temporarily took over such I/O processing based on the failover processing. The failback processing program is called from the boot program after the completion of the error handling program.

The processor core 211 to execute the failback program selects one entry form the failover volume storage area 724 stored in the cache memory unit 7 (STEP 4101). The processor core 211 subsequently determines whether the controller identifier 7242 of the failover source controller 2 and its controller identifier coincide (STEP 4102). When the processor core 211 determines that the controller identifier 7242 of the failover source controller 2 and its controller identifier do not coincide (STEP 4102; No), it returns to the processing at STEP 4101 in order to select an unprocessed entry (STEP 4106; No).

When it is determined that f the controller identifier 7242 of the failover source controller 2 and its controller identifier coincide (STEP 4102; Yes), the processor core 211 searches for an entry of the routing table 43 of the host I/F unit 4 and the routing table 63 of the disk interface unit 6 that coincides with the volume number 7241 of the failover volume storage area 724 (STEP 4103), and rewrites the searched entry with its controller identifier (STEP 4104).

The processor core 211 further transfers the control data of the corresponding volume number stored in the control data backup area 722 of the cache memory unit 7 to the control data area of the control memory unit 6 (STEP 4105).

The processor core 211 determines whether all entries of the failover storage area 724 have been selected (STEP 4106), and repeats the foregoing processing until all entries have been selected (STEP 4106; No).

Thereby, the routing table 43 of the host I/F unit 4 and the routing table 63 of the disk interface unit 6 will return to the status before failover processing, and the failed controller 2 that performed error handling will be able to resume the I/O processing.

As described above, according to the present embodiment, even when an error occurs in one of the controllers 2 of a mirrored configuration, the switch LSI 13 that detected this error immediately cuts off the I/O path to the failed controller 2. Thus, it is possible to prevent the influence of a malfunction or the like reaching the other units in the storage system 1.

Further, since the other controller 2 that was not subject to an error takes over the I/O processing that was being handled by the failed controller 2, the data storage system of the overall storage system 1 can be continued without interruption.

Moreover, the failed controller 2 performs error handling while the other controller 2 is taking over the I/O processing, and takes back the I/O processing that was being taken over by the other controller 2 if it is able to continue operating as a result of the error handling. Thus, it is possible to maintain a high level of performance as the overall storage system.

Fourth Embodiment

This embodiment is characterized in balancing the load between the controllers 2 by the controller 2 with low capacity utilization taking over the I/O processing of the controller 2 with high capacity utilization (load) in the storage system 2 including mirrored controllers 2. Accordingly, when a error occurs in a controller 2, the load of the controller 2 that took over the I/O processing of the failed controller 2 based on the failover processing explained in the foregoing embodiment may become temporarily high. Even in this kind of case, it is possible to prevent the load from concentrating on a specific controller 2 by controlling using a controller 2 with a low load to take over the I/O processing based on the failover processing.

Figure 42:
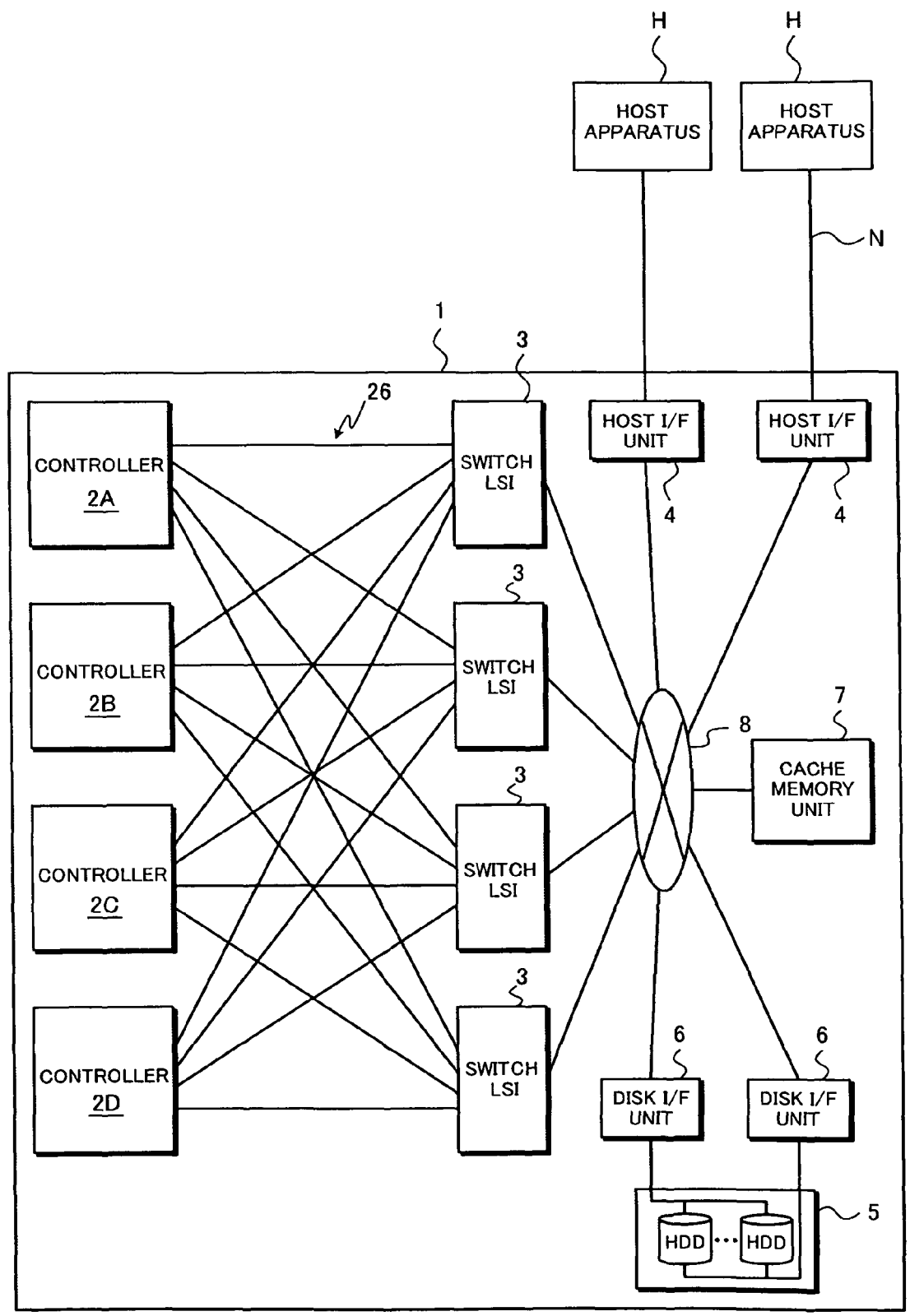
FIG. 42 is a diagram showing the configuration of the storage system according to an embodiment of the present invention.

FIG. 42 is a diagram showing the configuration of the storage system 1 according to an embodiment of the present invention. As shown in FIG. 42, the respective units in the storage system 1 of this embodiment are mirrored. In this example, four controllers 2 and four switch LSIs 3 are provided, and these are mutually connected via the address/data line 26. Further, although omitted for simplifying the drawings, the respective switch LSIs 3 are receiving the first error signal line 27 and the second error signal 28 of the respective controllers 2. When an error occurs, as with the foregoing embodiments, the switch LSI 3 cuts off the I/O path with the failed controller 2, and the failed controller 2 performs error handling and resumes operation. In this case, the I/O processing of the failed controller 2 is temporarily taken over by the other controller 2, and returned to the controller that resumed operation after the completion of error handling.

Although the basic configuration of the respective units of this embodiment is the same as the foregoing embodiments, certain mechanisms or functions for sorting the I/O processing according to the load status of the respective controllers 2 are provided.

Figure 43:
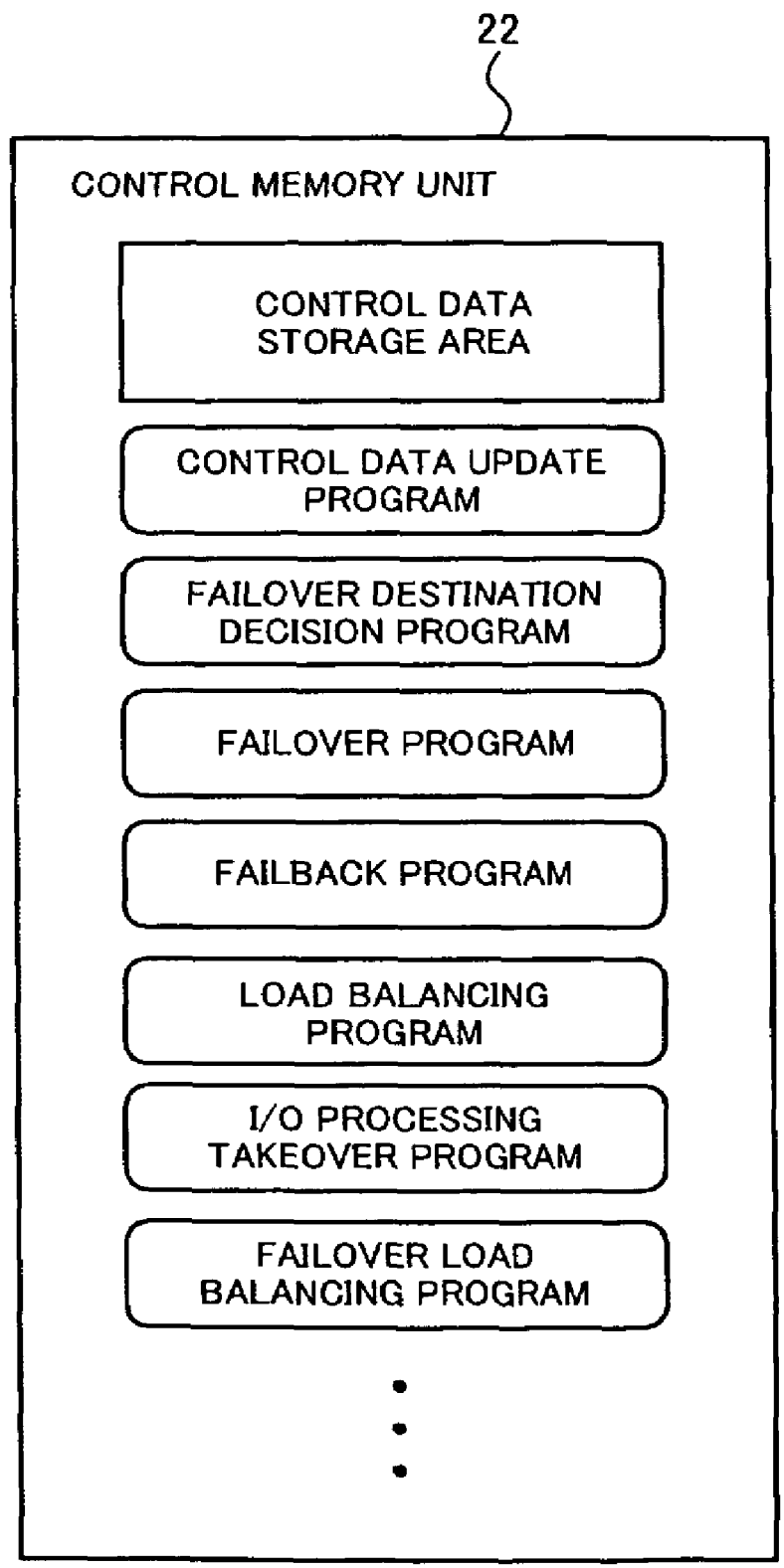
FIG. 43 is a diagram explaining the contents of the control memory unit of the controller according to an embodiment of the present invention.

FIG. 43 is a diagram explaining the contents of the control memory unit 22 of the controller 2 according to an embodiment of the present invention. As shown in FIG. 43, the control memory unit 22 of this embodiment stores, in addition to the contents of the foregoing third embodiment, a load balancing program, an I/O processing takeover program, and a failover load balancing program.

The load balancing program is a program for balancing the load of the I/O processing to be performed by the respective controllers 2 between the two controllers 2 and to prevent the processing performance of a specified controller 2 from reaching its limit. The load balancing program is called and executed by the failover load balancing program, but it may also be executed constantly in a normal status.

The I/O processing takeover program is a program for performing processing to take over a part of the I/O processing between the controllers 2.

The failover load balancing program is a program for sorting the I/O processing and balancing the load so that the load of the controller that temporarily took over the I/O processing based on the failover processing will not become great.

Figure 44:
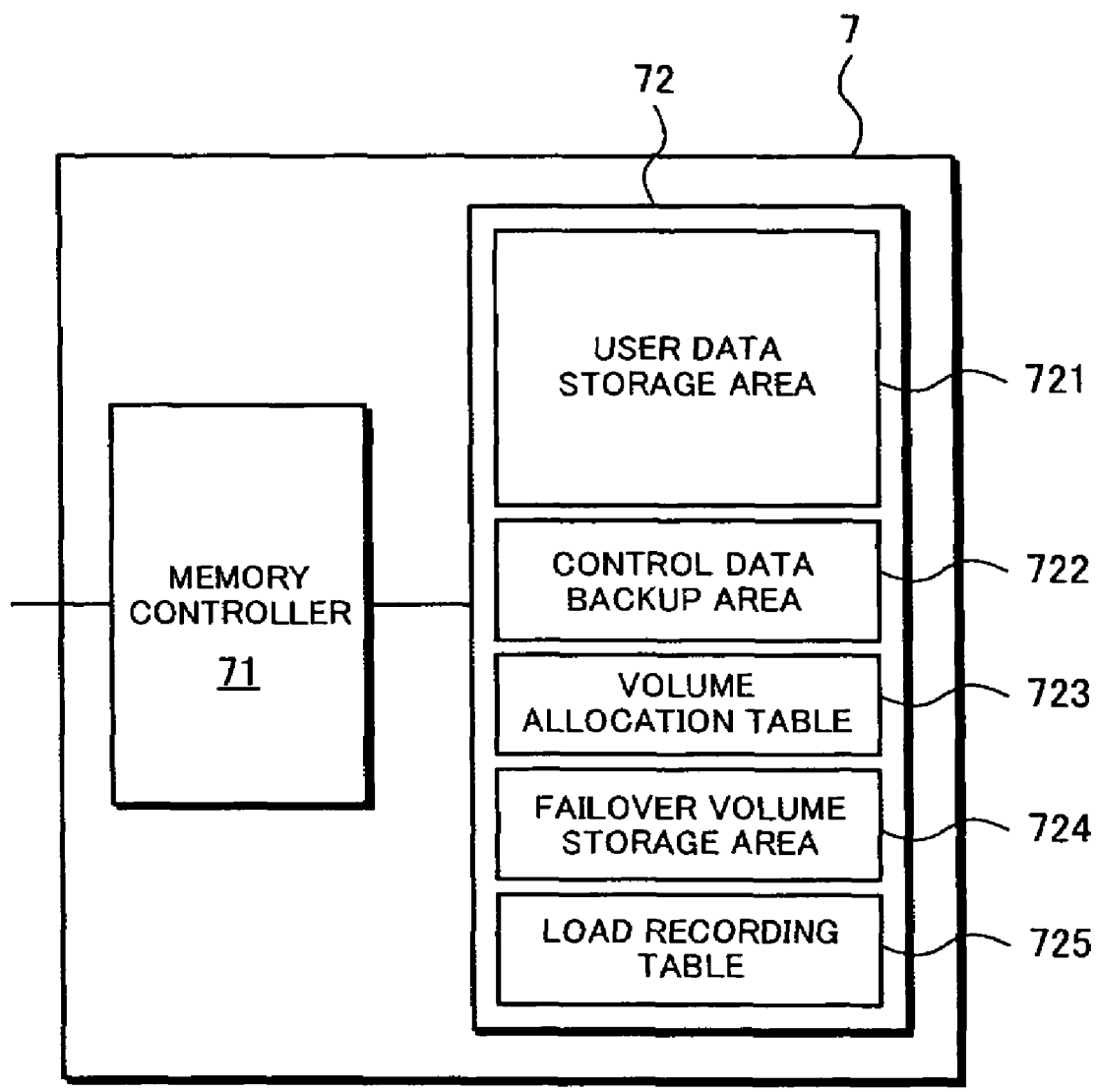
FIG. 44 is a diagram explaining the contents of the cache memory unit according to an embodiment of the present invention.

FIG. 44 is a diagram explaining the contents of the cache memory unit 7 according to an embodiment of the present invention. As shown in FIG. 44, the cache memory unit 7 retains, in addition to the contents described in the foregoing embodiments, a load recording table 725.

FIG. 45 is a diagram showing an example of the load recording table 725 of the cache memory unit 7 according to an embodiment of the present invention. The load recording table 725 shows the capacity utilization regarding the respective controllers 2, and has a table structure associating the controller identifier 7251 and the capacity utilization 7252. The load recording table 725 is updated by the processor core 211 of the controller 2. For example, the processor core 211 in the controller 2 periodically calculates the capacity utilization (CPU load factor) of its processor 21, and writes this into the load recording table 725 of the cache memory unit 7. Or the processor core 211 may calculate the capacity utilization based on the number of I/O requests that the host I/F unit 4 received from the host apparatus H, and write this into the load recording table 725 of the cache memory unit 7.

Figure 46:
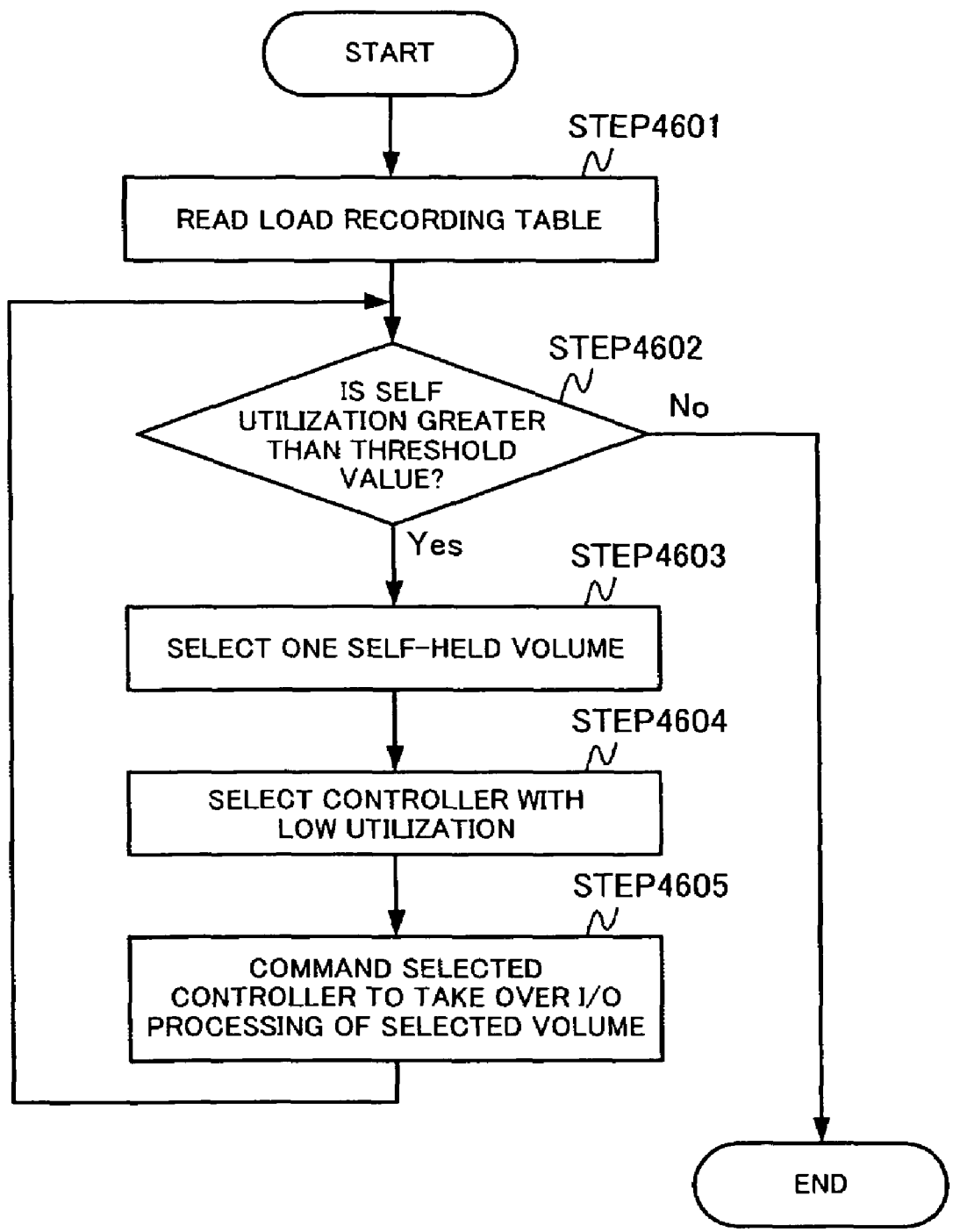
FIG. 46 is a flowchart explaining the operation of a load balancing program in the controller according to an embodiment of the present invention.

FIG. 46 is a flowchart explaining the operation of the load balancing program in the controller 2 according to an embodiment of the present invention. The load balancing program determines whether the amount (load) of I/O processing to be performed by the respective controllers 2 is biased, and, when it is biased, performs control so that a part of the I/O processing is migrated to the other controller 2.

Referring to FIG. 46, the processor core 211 to execute the load balancing program reads the load recording table 725 in the cache memory unit 7 (STEP 4601). The processor core 211 subsequently refers to the read load recording table 725 and determines whether the capacity utilization 7252 of its controller 2 is greater than a prescribed threshold value (STEP 4602). When [the processor core 211] determines that the capacity utilization 7252 of its controller 2 is greater than a prescribed threshold value (STEP 4602; Yes), it refers to the routing table 43 of the host I/F unit 4 and the routing table 63 of the disk I/F unit 6, and selects one volume that it is handling (STEP 4603).

Subsequently, the processor core 211 selects one controller 2 from the load recording table 725 with low capacity utilization 7252 (STEP 4604). Here, it is desirable that the controller 2 with the lowest capacity utilization is selected, and, for instance, one controller 2 may be randomly selected among the controllers 2 with capacity utilization that is below a prescribed lower limit.

Then, the processor core 211 sends a takeover command to the selected controller via the switch LSI 3 so as to take over the I/O processing of the selected volume (STEP 4604). The processor core 21 repeats the foregoing processing until its capacity utilization falls below a prescribed threshold value.

Figure 47:
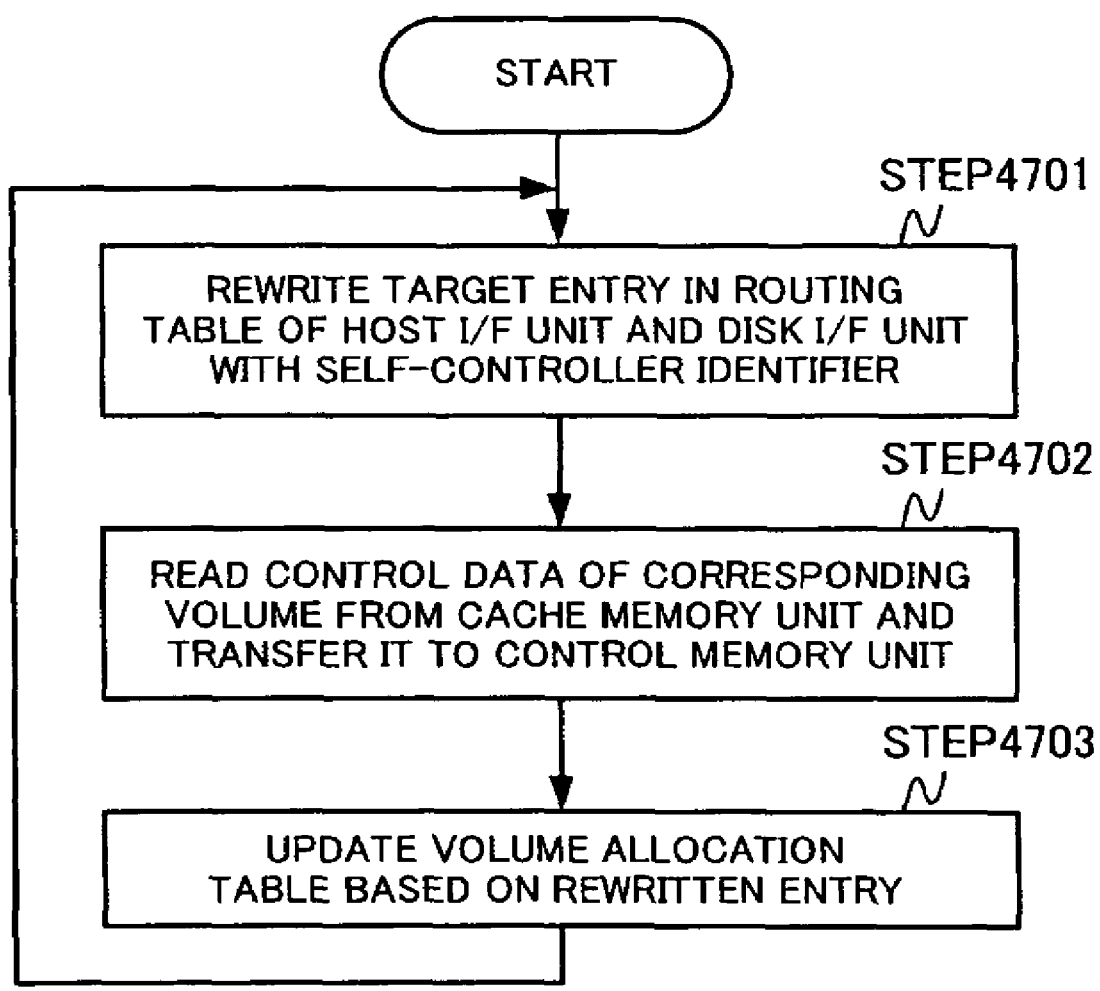
FIG. 47 is a flowchart explaining the operation of an I/O processing takeover program in the controller according to an embodiment of the present invention.

FIG. 47 is a flowchart explaining the operation of the I/O processing takeover program in the controller 2 according to an embodiment of the present invention. The I/O processing takeover program is a program for taking over the I/O processing according to the takeover command from the processor core 211 of the controller 2 with high capacity utilization, and is executed by the processor core 211 of the controller 2 that received the takeover command.

Specifically, as shown in FIG. 47, the processor core 211 of the controller 2 that received the takeover command from the controller 2 to execute the load balancing program rewrites the entries including the volume number of the volumes selected based on the execution of the load balancing program in the routing table 43 of the host I/F unit 4 and the routing table 63 of the disk I/F unit 6 with the controller identifier of its controller 2 (STEP 4701).

Subsequently, the processor core 211 reads the control data of the volume from the cache memory unit 7 and transfers it to the control memory unit 22.

Then, the processor core 211 updates the cache volume allocation table 725 based on the rewritten entries of the routing tables 43 and 64 (STEP 4703).

Figure 48:
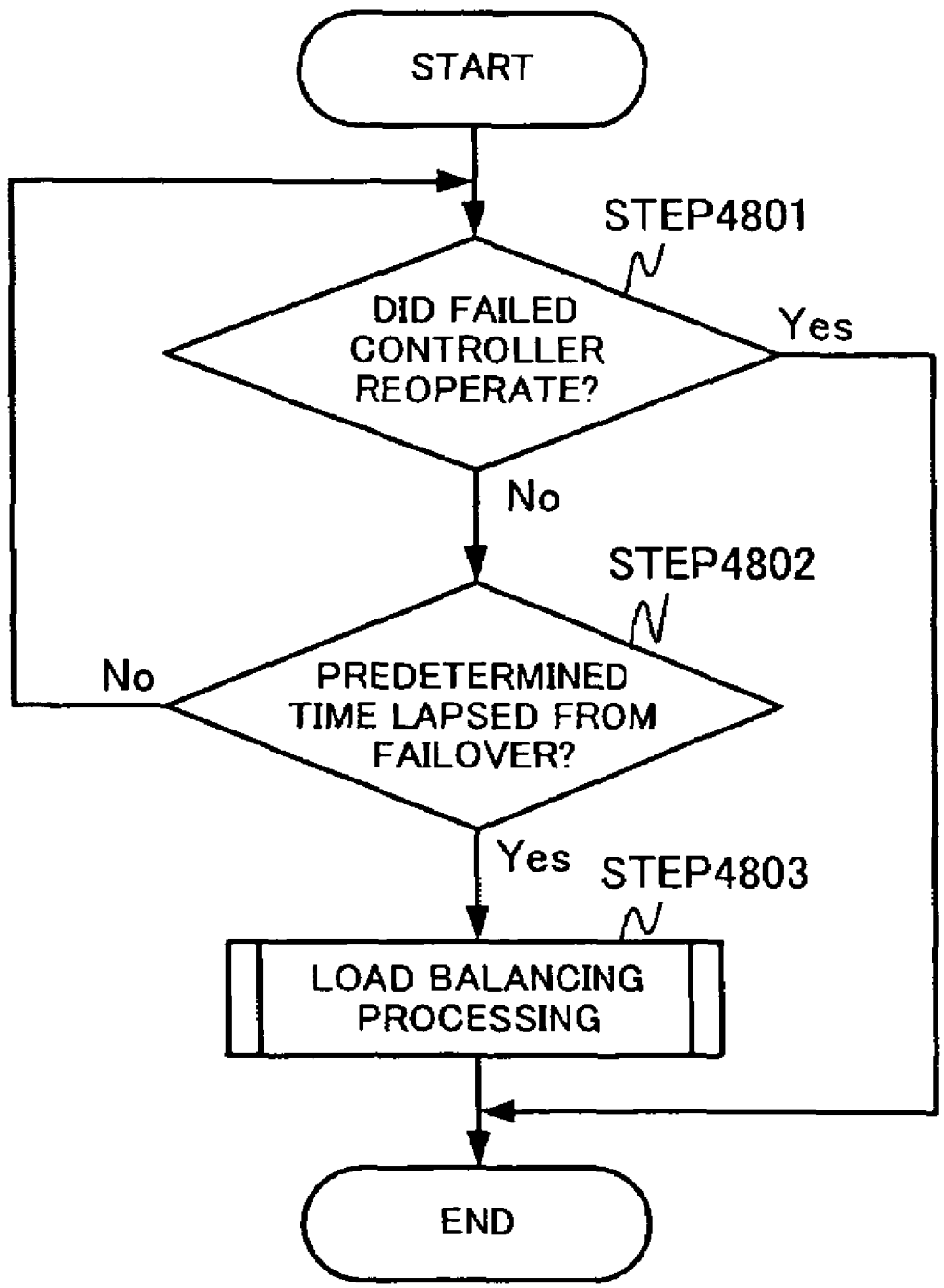
FIG. 48 is a flowchart explaining the operation of a failover load balancing program in the controller [2] according to an embodiment of the present invention.

FIG. 48 is a flowchart explaining the operation of the failover load balancing program in the controller 2 according to an embodiment of the present invention. The failover load balancing program is a program for the controller 2 that took over the I/O processing based on error handling from the failed controller 2 to perform load balancing as necessary.

The controller 2 that took over the I/O processing will be in charge of the I/O processing that it took over in addition to the I/O processing that it originally handled, and it is possible that the capacity utilization will become high, and the response performance will deteriorate. In particular, when the failed controller 2 is not able to resume operation, it is necessary to sort the succeeded 110 processing to another controller 2. Thus, the controller 2 that took over the I/O processing performs load balancing processing under prescribed conditions to balance the I/O processing between the controllers 2.

As shown in FIG. 48, the processor core 211 of the controller 2 that took over the I/O processing determines whether the failed controller 2 performed failback processing and resumed operation (STEP 4801). When it is determined that the failed controller 2 has resumed operation (STEP 4801; Yes), the processor core 211 subsequently determines whether a predetermined period of time has lapsed from the performance of the failover processing (STEP 4802). When it is determined that a predetermined period of time has not lapsed (STEP 4802; No), the processor core 211 waits for the failed controller 2 to resume operation.

In contrast, when a predetermined period of time has lapsed, the failed controller 2 has no operable component, and, since the processor core 211 deems that it is not able to resume operation, the processor core 211 executes load balancing program (STEP 4803).

Thereby, the controller 2 that took over the I/O processing based on the failover processing is able to seek load balancing by allocating the I/O processing of a part of the volumes that it is handling to the other controller 2 if its capacity utilization is greater than a prescribed threshold value.

Accordingly, even when an error occurs in a controller 2 of the storage system 2 comprising a plurality of controllers 2, the data storage service can be continued without interruption by the controller 2 other than the failed controller 2 taking over the I/O processing.

Further, while the controller 2 other than the failed controller 2 is taking over the I/O processing, the failed controller 2 performs error handling to determine whether it is able to resume operation. Here, if the controller 2 is able to resume operation, the failed controller 2 takes back the I/O processing that was taken over by the other controller 2 to contribute to the load balancing. Meanwhile, if the controller 2 is not able to resume operation, the controller 2 that took over the I/O processing performs load balancing processing to seek the load balancing between the controllers 2, and the data storage service can be continued without deteriorating the system performance of the storage system.

The present invention can be broadly applied to storage systems for storing data.

What is claimed is:

1. A storage system for providing data storage service to a host apparatus, comprising:
  a host interface unit configured to be connectable to the host apparatus;
  a disk interface unit configured to be connectable to a disk array unit having a volume storing data formed therein;
  a cache memory unit connected respectively to the host interface unit and the disk interface unit and configured to cache the user data;
  a switch LSI connected respectively to the host interface unit, the disk interface unit, and cache memory unit; and
  a controller having a plurality of processors and connected to the switch LSI,
  wherein the switch LSI cuts off an I/O path with the controller based on an error signal output when an error occurs in one of components in the controller; and
  wherein the controller, after performing prescribed error handling under control of one of the plurality of processors, commands the switch LSI to cancel the cutoff.

2. The storage system according to claim 1,
  wherein each of the plurality of processors determines whether the processor itself is normally operable in response to the error signal, and one processor among the processors that determined itself to be normally operable performs the prescribed error handling.

3. The storage system according to claim 2,
  wherein at least one of the components in the controller has a error status register for recording a error source.

4. The storage system according to claim 3,
  wherein the controller specifies the failed component based on the error status register under the control of the one processor.

5. The storage system according to claim 4,
  wherein the controller sets the specified component to an inactivated status disabling the use of the specified component under the control of the one processor.

6. The storage system according to claim 5,
  wherein the controller determines whether the controller itself is normally operable based on a component or components other than the component set to the inactivated status under the control of the one processor, and, when the controller determines itself to be normally operable, the controller is controlled so as to resume operation in a component other than the component set to the inactivated status.

7. The storage system according to claim 1,
  wherein the storage system comprises a plurality of controllers that take charge of I/O processing to each of a plurality of volumes formed in the disk array unit; and
  when an error occurs in a component in a first controller, a second controller takes over the I/O processing under the charge of the first controller.

8. The storage system according to claim 7,
  wherein the first controller, after performing the prescribed error handling, takes back the I/O processing from the second controller.

9. The storage system according to claim 7,
  wherein, when the second controller determines that its load is higher than a prescribed threshold value as a result of taking over the I/O processing, the second controller performs control so that a part of the I/O processing under its own charge is taken over by a third controller.

10. The storage system according to claim 7,
  wherein the cache memory unit retains backup data of control data retained by each of the plurality of controllers.

11. A method of controlling a storage system for providing data storage service to a host apparatus, comprising:
  performing, under control of each processor of at least one controller, the data storage service;
  detecting, under control of a switch LSI, an error signal output when an error occurs in one of components in the controller;
  cutting off, under control of the switch LSI, an I/O path with the controller based on the detected error;
  performing, under control of the controller, prescribed error handling while the I/O path is being cut off; and
  commanding, under control of the controller, the switch LSI to cancel the cutoff.

12. The method according to claim 11,
  wherein each of the plurality of processors determines whether the processor itself is normally operable based on the error signal, and one processor among the processors that determined itself to be normally operable performs the prescribed error handling.

13. The method according to claim 12,
  wherein at least one component in the controller has an error status register for recording a error status.

14. The method according to claim 13,
  wherein the controller specifies the failed component based on the error status register under the control of the one processor.

15. The method according to claim 14,
  wherein the controller sets the specified component to an inactivated status disabling the use of the specified component under the control of the one processor.

16. The method according to claim 15,
  wherein the controller determines whether the controller itself is normally operable based on a component other than the component set to the inactivated status under the control of the one processor, and, when the controller determines itself to be normally operable, the controller is controlled so as to resume operation in a component other than the component set to the inactivated status.

17. The method according to claim 11, further comprising a step of a second controller takes over the I/O processing under the charge of a first controller when a error occurs in a component in the first controller.

18. The method according to claim 11, further comprising a step of the first controller, after performing the prescribed error handling, taking back the I/O processing from the second controller.

19. The method according to claim 11,
wherein, when the second controller determines that its load is higher than a prescribed threshold value as a result of taking over the I/O processing, the second controller performs control so that a part of the I/O processing under its own charge is taken over by a third controller.

20. A unit having a plurality of components composing a storage system for providing data storage service to a host apparatus, comprising:

an error detection unit configured to detect the occurrence of an error in any one of the plurality of components;

a cutoff processing unit configured to cut off an I/O path with an external unit based on the detected occurrence of error;

an error specification unit configured to specify the failed component while the I/O path is being cut off; and an inactivated status setting unit configured to set the specified component to a inactivated status;

wherein the cutoff processing unit cancels the cutoff after the inactivated status is set.

* * * * *